(12) United States Patent
Triplett

(10) Patent No.: US 10,446,282 B2
(45) Date of Patent: Oct. 15, 2019

(54) METHODS, SYSTEMS, AND COMPUTER PROGRAM PRODUCTS FOR GENERATING FAST NEUTRON SPECTRA

(75) Inventor: Brian S. Triplett, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1088 days.

(21) Appl. No.: 13/336,229

(22) Filed: Dec. 23, 2011

(65) Prior Publication Data
US 2013/0166223 A1 Jun. 27, 2013

(51) Int. Cl.
G21C 17/108 (2006.01)
G21C 17/104 (2006.01)
G21D 3/00 (2006.01)

(52) U.S. Cl.
CPC ......... *G21C 17/108* (2013.01); *G21C 17/104* (2013.01); *G21D 3/001* (2013.01); *G21D 3/002* (2019.01); *Y02E 30/40* (2013.01)

(58) Field of Classification Search
CPC .............................. G21C 17/104; G21C 17/108
See application file for complete search history.

(56) References Cited

U.S. PATENT DOCUMENTS

| | | | |
|---|---|---|---|
| 5,171,516 A | 12/1992 | Iwamoto | |
| 5,267,276 A | 11/1993 | Vujic | |
| 5,638,413 A | 6/1997 | Uematsu et al. | |
| 6,795,801 B1 * | 9/2004 | Watkins | G06F 17/5018 376/207 |
| 7,428,479 B2 | 9/2008 | Böer et al. | |
| 8,081,814 B2 | 12/2011 | Matsushita et al. | |
| 2004/0009455 A1 * | 1/2004 | Chiang et al. | 434/218 |
| 2011/0029294 A1 | 2/2011 | Van Geemert | |
| 2011/0274230 A1 | 11/2011 | Oriol | |

(Continued)

OTHER PUBLICATIONS

Van den Eynde, G. "Neutron Transport with Anisotropic Scattering" Thesis, May 2005.*

(Continued)

*Primary Examiner* — Sharon M Davis
(74) *Attorney, Agent, or Firm* — Harness, Dickey & Pierce, PLC

(57) ABSTRACT

Methods implemented by at least one electronic processor for generating pointwise fast neutron spectra may include receiving composition data; receiving source data or calculating the source data; receiving nuclear data; and calculating the pointwise fast neutron spectrum based on numerical integration using the composition, source, and nuclear data. Systems for generating pointwise fast neutron spectra may include a bus; at least one electronic processor connected to the bus; an input device connected to the bus; and a communication link connected to the bus. The at least one electronic processor may be configured to receive composition data from the input device via the bus, to receive source data from the input device via the bus or to calculate the source data, to receive nuclear data from the communication link via the bus, and to calculate the pointwise fast neutron spectrum based on numerical integration using the composition, source, and nuclear data.

25 Claims, 41 Drawing Sheets

(56) References Cited

U.S. PATENT DOCUMENTS

2012/0257706 A1* 10/2012 Longoni .............. G21C 17/003
376/254

OTHER PUBLICATIONS

Ochotta, T., et al., "Adaptive thinning of atmospheric observations in data assimilation with vector quantization and filtering methods" Q. J. R. Meteorolo. Soc. (2005), 131, pp. 3427-3437.*

"Error Bounds for Numerical Integration".*

Maslov, V.M., 239-Pu Prompt Fission Neutron Spectra, Atomic Energy, vol. 103, No. 2, 2007, pp. 633-640. (Year: 2007).*

Nereson, N. Fission Neutron Spectrum of Pu-239, Physical Review, vol. 88, No. 4, 1952, pp. 823-824. (Year: 1952).*

Brian Scott Triplett: "Generation of Fast Netruon Spectra Using an Adaptive Gauss-Kronrod Quadrature Algorithm", Nov. 2011 (Nov. 2011), XP055080520, Retrieved from the Internet: URL:http://etd.fcla.edu/UF/UFE0042859/trip lett_b.pdf [retrieved on Sep. 23, 2013] the whole document.

Mark D Dehart et al: "Reactor Physics Methods and Analysis Capabilities in SCALE", Nuclear Technology, American Nuclear Society, Chicago, IL, US, vol. 174, No. 2, May 1, 2011 (May 1, 2011), pp. 196-213, XP009172826,ISSN: 0029-5450 abstract; figures 1-7sections I-III.

Brian Scott Triplett: "Generation of Fast Neutron Spectra using an Adaptive Gauss-Kronrod Quadrature Algorithm (bibliographic data)", University of Florida Digital Collection, XP055080878, Retrieved from the Internet: URL:http://ufdc.ufl.edu/UFE0042859/00001 [retrieved on Sep. 25, 2013] p. 2, line "Electronic Access".

PCT Search Report issued in connection with corresponding WO Patent Application No. US2012/068667 dated Oct. 14, 2013.

'Fast Reactor Neutronics Overview—Module 2—GEH-NPP-0124,' presented by Eric Loewen, Jun. 2008.

* cited by examiner

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

| Order | Nodes | Weights |
|---|---|---|
| 2 | ±0.577350269 | 1.0000000 |
| 3 | ±0.774596669 | 0.5555556 |
|   | 0.000000000 | 0.8888889 |
| 4 | ±0.861136312 | 0.3478548 |
|   | ±0.339981044 | 0.6521452 |
| 5 | ±0.906179846 | 0.2369269 |
|   | ±0.538469310 | 0.4786287 |
|   | 0.000000000 | 0.5688889 |
| 6 | ±0.932469514 | 0.1713245 |
|   | ±0.661209386 | 0.3607616 |
|   | ±0.238619186 | 0.4679139 |

FIG. 7

| Set | Nodes | Weights |
|---|---|---|
| 7-point Gauss | ±0.9491079123 | 0.1294849662 |
| | ±0.7415311856 | 0.2797053915 |
| | ±0.4058451514 | 0.3818300505 |
| | 0.0000000000 | 0.4179591837 |
| 15-Point Kronrod | ±0.9915453711 | 0.0229353220 |
| | ±0.9491079123 | 0.0630920926 |
| | ±0.8648644234 | 0.1047900103 |
| | ±0.7415311856 | 0.1690047266 |
| | ±0.5860672355 | 0.1903505781 |
| | ±0.4058451514 | 0.2044329401 |
| | 0.0000000000 | 0.2094821411 |

FIG. 8

© 2011 Brian Scott Triplett, 17 U.S.C. § 401

© 2011 Brian Scott Triplett, 17 U.S.C. § 401

| Case | PWFSG Execution Time (minutes) | CENTRM Execution Time (minutes) | MCNP Execution Time (hours) |
|---|---|---|---|
| U-238 Infinite Medium | 3.5 | <1.0 | 47 |
| SFR Fuel Cell | 12.0 | 12.4 | 154 |
| UNF Fuel Cell | 17.7 | 19.3 | 227 |

FIG. 14

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

| Program | Standard Deviation of Residuals | $r^2$ | $1-r^2$ |
|---|---|---|---|
| PWFSG | 0.3257 | 99.95% | 0.0550% |
| CENTRM | 0.8240 | 99.65% | 0.3518% |

FIG. 19

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

© 2011 Brian Scott Triplett, 17 U.S.C. § 401

| Program | Standard Deviation of Residuals | $r^2$ | $1-r^2$ |
|---|---|---|---|
| PWFSG | 0.3347 | 99.94% | 0.0596% |
| CENTRM | 0.7621 | 99.69% | 0.3087% |

FIG. 25

© 2011 Brian Scott Triplett, 17 U.S.C. § 401

© 2011 Brian Scott Triplett, 17 U.S.C. § 401

© 2011 Brian Scott Triplett, 17 U.S.C. § 401

| Isotope | Number Density (atoms/b-cm) |
|---|---|
| U-235 | $1.8858619 \times 10^{-3}$ |
| U-238 | $1.0551567 \times 10^{-2}$ |
| Zr-90 | $1.8518384 \times 10^{-3}$ |
| Zr-91 | $4.0384114 \times 10^{-4}$ |
| Zr-92 | $6.1727947 \times 10^{-4}$ |
| Zr-94 | $6.2555785 \times 10^{-4}$ |
| Zr-96 | $1.0078032 \times 10^{-4}$ |
| Fe-54 | $7.5240415 \times 10^{-4}$ |
| Fe-56 | $1.1811136 \times 10^{-2}$ |
| Fe-57 | $2.7277064 \times 10^{-4}$ |
| Fe-58 | $3.6300765 \times 10^{-5}$ |
| Cr-50 | $8.2857689 \times 10^{-5}$ |
| Cr-52 | $1.5978281 \times 10^{-3}$ |
| Cr-53 | $1.8118088 \times 10^{-4}$ |
| Cr-54 | $4.5099755 \times 10^{-5}$ |
| Mo-92 | $1.2782226 \times 10^{-5}$ |
| Mo-94 | $7.9673577 \times 10^{-6}$ |
| Mo-95 | $1.3712469 \times 10^{-5}$ |
| Mo-96 | $1.4367084 \times 10^{-5}$ |
| Mo-97 | $8.2257585 \times 10^{-6}$ |
| Mo-98 | $2.0784037 \times 10^{-5}$ |
| Mo-100 | $8.2946654 \times 10^{-6}$ |
| Na-23 | $8.4013761 \times 10^{-3}$ |

FIG. 29

© 2011 Brian Scott Triplett, 17 U.S.C. § 401

© 2011 Brian Scott Triplett, 17 U.S.C. § 401

| Program | Standard Deviation of Residuals | $r^2$ | $1-r^2$ |
|---|---|---|---|
| PWFSG | 2.9460 | 98.41% | 1.59% |
| CENTRM | 8.2412 | 87.54% | 12.46% |

FIG. 33

© 2011 Brian Scott Triplett, 17 U.S.C. § 401

| Isotope | Number Density (atoms/b-cm) |
|---|---|
| U-235 | $1.9614993 \times 10^{-5}$ |
| U-238 | $9.6642491 \times 10^{-3}$ |
| Am-241 | $1.3566604 \times 10^{-4}$ |
| Am-243 | $3.4663778 \times 10^{-5}$ |
| Cm-244 | $8.2528486 \times 10^{-6}$ |
| Cm-245 | $4.6175738 \times 10^{-7}$ |
| Np-237 | $1.5733084 \times 10^{-4}$ |
| Pu-238 | $5.5200518 \times 10^{-5}$ |
| Pu-239 | $1.3077054 \times 10^{-3}$ |
| Pu-240 | $6.5959724 \times 10^{-4}$ |
| Pu-241 | $2.3354193 \times 10^{-4}$ |
| Pu-242 | $1.5570373 \times 10^{-4}$ |
| Zr-90 | $1.8573215 \times 10^{-3}$ |
| Zr-91 | $4.0503688 \times 10^{-4}$ |
| Zr-92 | $6.1910718 \times 10^{-4}$ |
| Zr-94 | $6.2741007 \times 10^{-4}$ |
| Zr-96 | $1.0107872 \times 10^{-4}$ |
| Fe-54 | $7.5240415 \times 10^{-4}$ |
| Fe-56 | $1.1811136 \times 10^{-2}$ |
| Fe-57 | $2.7277064 \times 10^{-4}$ |
| Fe-58 | $3.6300765 \times 10^{-5}$ |
| Cr-50 | $8.2857689 \times 10^{-5}$ |
| Cr-52 | $1.5978281 \times 10^{-3}$ |
| Cr-53 | $1.8118088 \times 10^{-4}$ |
| Cr-54 | $4.5099755 \times 10^{-5}$ |
| Mo-92 | $1.2782226 \times 10^{-5}$ |
| Mo-94 | $7.9673577 \times 10^{-6}$ |
| Mo-95 | $1.3712469 \times 10^{-5}$ |
| Mo-96 | $1.4367084 \times 10^{-5}$ |
| Mo-97 | $8.2257585 \times 10^{-6}$ |
| Mo-98 | $2.0784037 \times 10^{-5}$ |
| Mo-100 | $8.2946654 \times 10^{-6}$ |
| Na-23 | $8.4013761 \times 10^{-3}$ |

FIG. 35

© 2011 Brian Scott Triplett, 17 U.S.C. § 401

© 2011 Brian Scott Triplett, 17 U.S.C. § 401

© 2011 Brian Scott Triplett, 17 U.S.C. § 401

| Program | Standard Deviation of Residuals | $r^2$ | $1-r^2$ |
|---|---|---|---|
| PWFSG | 2.9204 | 98.24% | 1.76% |
| CENTRM | 7.9724 | 87.07% | 12.93% |

FIG. 39

© 2011 Brian Scott Triplett, 17 U.S.C. § 401

© 2011 Brian Scott Triplett, 17 U.S.C. § 401

| Case | Improvement Factor, $F$ |
|---|---|
| U-238 Infinite Medium | 6.4 |
| SFR Fuel Cell | 7.8 |
| UNF Fuel Cell | 7.4 |

FIG. 41

© 2011 Brian Scott Triplett, 17 U.S.C. § 401

METHODS, SYSTEMS, AND COMPUTER PROGRAM PRODUCTS FOR GENERATING FAST NEUTRON SPECTRA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

Example embodiments generally relate to methods, systems, and/or computer program products for generating pointwise fast neutron spectra. The pointwise fast neutron spectra may be used, for example, in analyzing nuclear reactors.

2. Description of Related Art

A complete description of the neutron population in the reactor may be necessary to accurately model a nuclear reactor. The neutron population determines the distribution of the nuclear reactions in the reactor. These reactions govern the distribution of power, the utilization of fuel, and/or the safety margins in a nuclear system.

It may be impractical to completely model the neutron population within a nuclear reactor as a function of time, space, direction, fuel exposure, temperature, etc., but a coarser calculation may be performed. The coarser calculation may discretizes one or more of the aforementioned variables. This process may require system parameters that have been properly averaged over one or more of the neutron population's governing variables (e.g., space, energy). This averaging process may be referred to as a lattice calculation or lattice physics because it involves performing high-fidelity calculations on a small unit of a nuclear reactor, such as a single fuel pin or assembly. The average parameters resulting from a lattice physics calculation are then used for core-wide calculations in a broader time and space domain. Lattice physics computer programs include, for example, LANCER02 used by GE-Hitachi Nuclear Energy, CASMO from Studsvik Scandpower AB (e.g., CASMO-5), and the Continuous Energy Transport Module (CENTRM)/Produce Multigroup Converter (PMC) from Oak Ridge National Laboratory (ORNL).

Since a lattice physics calculation often may be the first step in reactor analysis, errors in lattice physics may propagate into further core-wide calculations. This may lead to misprediction of important reactor parameters such as neutron balance and reactor power distribution. A great effort has been made over the past few decades to improve multidimensional transport methods for core-wide solutions; however, much less progress has been made on the lattice physics methods that inform these transport methods. Recent efforts at ORNL have sought to increase the fidelity of lattice physics methods beyond the current state-of-the-art.

SUMMARY

Example embodiments may provide methods, implemented by at least one electronic processor, for generating a pointwise fast neutron spectrum. Example embodiments also may provide systems for generating a pointwise fast neutron spectrum. Additionally, example embodiments may include computer program products, including non-transitory computer readable mediums having recorded thereon instructions, executable by at least one electronic processor, for generating a pointwise fast neutron spectrum.

In example embodiments, fast neutrons are those neutrons whose kinetic energy is greater than or equal to 1 eV.

In an example embodiment, a method, implemented by at least one electronic processor for generating a pointwise fast neutron spectrum, may include: receiving, via the at least one electronic processor, composition data; receiving, via the at least one electronic processor, source data or calculating, via the at least one electronic processor, the source data; receiving, via the at least one electronic processor, nuclear data; and/or calculating, via the at least one electronic processor, the pointwise fast neutron spectrum based on numerical integration using the composition data, the source data, and the nuclear data.

In the example embodiment, the composition data may include information related to geometry of a nuclear reactor.

In the example embodiment, the composition data may include information related to isotopes in a nuclear reactor.

In the example embodiment, the composition data may allow calculation of number densities of isotopes in a nuclear reactor.

In the example embodiment, the composition data may be input by one or more users.

In the example embodiment, the received source data may be input by one or more users.

In the example embodiment, the received source data may include one or more sources with at least one value determined by a function.

In the example embodiment, the source data may include one or more sources with at least one unknown value that is calculated via the at least one electronic processor.

In the example embodiment, the nuclear data may include data from at least one data library.

In the example embodiment, the at least one data library may include one or more of the Evaluated Nuclear Data Files of Brookhaven National Laboratory, the Japanese Evaluated Nuclear Data Library, the Joint Evaluated Fission and Fusion File, the Russian Evaluated Neutron Data Library, the Russian File of Evaluated Neutron Data, the Chinese Evaluated Nuclear Data Library, and the International Neutron Cross Section Standards.

In the example embodiment, calculating the pointwise fast neutron spectrum may include interpolating the nuclear data.

In the example embodiment, calculating the pointwise fast neutron spectrum may include generating an energy mesh that includes a finite number of energy points for the fast neutron spectrum.

In the example embodiment, calculating the pointwise fast neutron spectrum at one or more of the energy points may further include adapting the numerical integration until an error associated with the numerical integration is below a limit value.

In the example embodiment, calculating the pointwise fast neutron spectrum may be complete when the fast neutron spectrum has been calculated for each of the energy points in the energy mesh.

In the example embodiment, calculating the pointwise fast neutron spectrum may further include thinning the energy mesh to remove some of the finite number of energy points.

In the example embodiment, calculating the pointwise fast neutron spectrum may further include adding additional energy points to the energy mesh in order to bound error associated with the calculation of the pointwise fast neutron spectrum.

In the example embodiment, the calculation of the pointwise fast neutron spectrum may start at a highest energy of the received source data.

In the example embodiment, the calculation of the pointwise fast neutron spectrum may continue from the highest energy of the received source data to successively lower energies.

In the example embodiment, the calculation of the pointwise fast neutron spectrum may start at a highest energy of the calculated source data.

In the example embodiment, the calculation of the pointwise fast neutron spectrum may continue from the highest energy of the calculated source data to successively lower energies.

In the example embodiment, the numerical integration may use an adaptive algorithm.

In the example embodiment, the adaptive algorithm may use an interval subdividing technique.

In the example embodiment, the numerical integration may be based on a quadrature rule.

In the example embodiment, the quadrature rule may be a nested quadrature rule.

In the example embodiment, the nested quadrature rule may be a Gauss-Kronrod Quadrature (GKQ) rule.

In another example embodiment, a system for generating a pointwise fast neutron spectrum may include: a bus; at least one electronic processor connected to the bus; an input device connected to the bus; and/or a communication link connected to the bus. The at least one electronic processor may be configured to receive composition data from the input device via the bus. The at least one electronic processor may be configured to receive source data from the input device via the bus or may be configured to calculate the source data. The at least one electronic processor may be configured to receive nuclear data from the communication link via the bus. The at least one electronic processor may be configured to calculate the pointwise fast neutron spectrum based on numerical integration using the composition data, the source data, and the nuclear data.

In yet another example embodiment, a computer program product may include a non-transitory computer readable medium having recorded thereon instructions, executable by at least one electronic processor, for generating a pointwise fast neutron spectrum. The pointwise fast neutron spectrum may be generated by: receiving, via the at least one electronic processor, composition data; receiving, via the at least one electronic processor, source data or calculating, via the at least one electronic processor, the source data; receiving, via the at least one electronic processor, nuclear data; and/or calculating, via the at least one electronic processor, the pointwise fast neutron spectrum based on numerical integration using the composition data, the source data, and the nuclear data.

These and other features and advantages are described in, or are apparent from, the following detailed description of various example embodiments of methods, systems, and computer program products.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 7 is a table showing nodes and weights for Gauss-Legendre Quadrature (GLQ) of orders 2 thru 6;

FIG. 8 is a table showing nodes and weights for the ($G_7$, $K_{15}$) Gauss-Kronrod pair;

FIG. 14 is a table showing required execution times for three programs corresponding to the U-238 infinite medium case;

FIG. 19 is a table showing the standard deviation of the residuals, the $r^2$ values, and the corresponding $1-r^2$ values (error statistics) for the U-238 infinite medium case;

FIG. 25 is a table showing the standard deviation of the residuals, the $r^2$ values, and the corresponding $1-r^2$ values (error statistics) that summarize the results of FIG. 24 for the U-238 infinite medium case;

FIG. 29 is a table showing homogenized number densities of the isotopes in the SFR fuel cell;

FIG. 33 is a table showing the standard deviation of the residuals, the $r^2$ values, and the corresponding $1-r^2$ values (error statistics) for the SFR fuel cell case;

FIG. 35 is a table showing homogenized number densities of the isotopes in the used nuclear fuel (UNF) cell case;

FIG. 39 is a table showing the standard deviation of the residuals, the $r^2$ values, and the corresponding $1-r^2$ values (error statistics) for the UNF fuel cell case;

FIG. 41 is a table showing improvement factors, which are a measure of the residual error decrease in PWFSG when compared to CENTRM.

DETAILED DESCRIPTION OF EXAMPLE EMBODIMENTS

Figure 1:
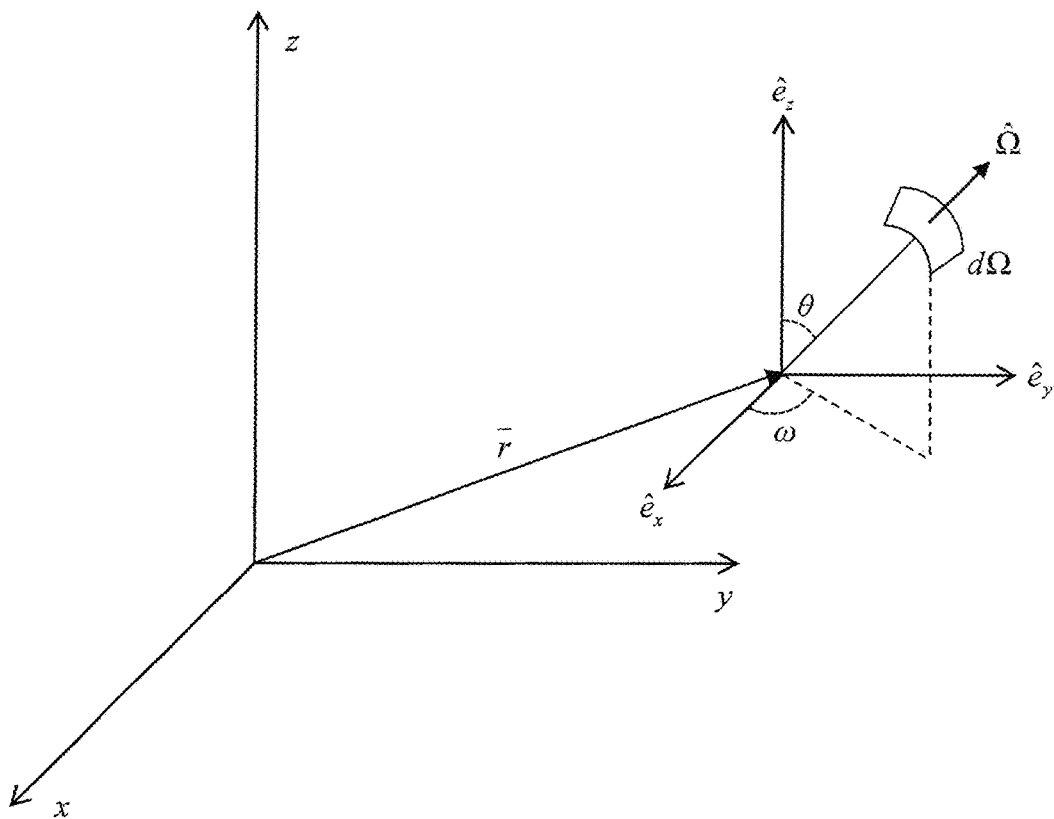
FIG. 1 is a diagram of neutron flux in space and angle.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

I. Nuclear Cross-Sections

A. Overview

The distribution of neutrons inside a reactor core may be the underlying driver for many of the behaviors observed at a macroscopic scale. A complete description of this population may require complete knowledge of the every neutrons' position, energy (i.e., speed), and direction as a function of time. Such comprehensive knowledge of the neutron population may be impractical to obtain; therefore, a number of assumptions may be made about one or more of these independent variables to efficiently arrive at a solution.

Although the underlying behavior of a reactor may be governed by the neutron distribution, the final reactor performance may depend on the rate of the reactions occurring inside of the reactor core. A reaction rate is a product of the neutron flux and the probability of a specific interaction occurring. It may be possible to have a large number of neutrons with a specific position, energy, and direction that are not reacting with the medium and, thus, not impacting reactor behavior.

The neutron angular flux ψ is given in Equation (1) as a function of position, $\bar{r}$; energy, E; direction, $\hat{\Omega}$; and/or time, t. As shown in Equation (1), neutron speed v may be a function of energy, E. As also shown in Equation (1), neutron distribution n may be a function of position, $\bar{r}$; energy, E; direction, $\hat{\Omega}$; and/or time, t.

$$\psi(\bar{r},E,\hat{\Omega},t)=v(E)n(\bar{r},E,\hat{\Omega},t) \quad (1)$$

FIG. 1 is a diagram of neutron flux in space and angle. At energies between a few eV and 20 MeV, for example, nuclear reaction rates may be independent of the incident neutron direction. This may make the directionally-independent scalar flux an important quantity in reactor calculations. The definition of scalar flux φ is given in Equation (2) as a function of position, $\bar{r}$; energy, E; and/or time, t.

$$\phi(\bar{r}, E, t) = \int_{4\pi} d\Omega \psi(\bar{r}, E, \hat{\Omega}, t) \quad (2)$$

The differential solid angle, dΩ, in Equation (2) may be expanded in Equation (3), where ω is the azimuthal angle with respect to the x-axis and θ is the polar angle with respect to the z-axis (see FIG. 1).

$$d\Omega = d\omega \sin(\theta) d\theta \quad (3)$$

As shown in Equation (4) and Equation (5), the differential polar angle may be condensed into the parameter, μ.

$$d\mu = \sin\theta d\theta \quad (4)$$

$$d\Omega = d\omega d\mu \quad (5)$$

The reaction rate for a specific reaction is a product of the scalar flux, the atomic number density, and the reaction's microscopic cross-section. This microscopic cross-section is the effective area presented by a nucleus to a neutron for a given reaction. The microscopic cross-section may be given in barns (1 b=$10^{-24}$ cm$^2$). The relationship for reaction rate, $R_x$, is shown for nuclear reaction x in Equation (6), where $N(\bar{r},t)$ is the atomic number density at position $\bar{r}$ and time t and $\tilde{\sigma}_x(E)$ is the microscopic cross-section for reaction x at energy, E.

$$R_x(\bar{r},E,t) = N(\bar{r},t)\tilde{\sigma}_x(E)\phi(\bar{r},E,t) \quad (6)$$

The product of the microscopic cross-section and number density may be combined into a single parameter known as the macroscopic cross-section as shown in Equation (7). The units of macroscopic cross-section are area per volume (i.e., inverse length).

$$\sigma_x(\bar{r},E,t) = N(\bar{r},t)\tilde{\sigma}_x(E) \quad (7)$$

The use of the macroscopic cross-section leads to the definition of the reaction rate given in Equation (8).

$$R_x(\bar{r},E,t) = \sigma_x(\bar{r},E,t)\phi(\bar{r},E,t) \quad (8)$$

Cross-sections may be estimated by a combination of experimentation and modeling. The cross-section may not be a smooth function of energy that is easily described by analytical functions. For example, in a total cross-section (i.e., sum of all reactions) for U-238 below about 4 eV and above about 20 keV, the cross-section may be relatively smooth; however, sharp peaks (resonances) in the cross-section may occur between these energies. These cross-section resonances may occur at locations where the additional binding energy added to the nucleus by the neutron plus the neutron kinetic energy corresponds to an excitation level in the resulting compound nucleus (i.e., the combination of the nucleus plus the captured neutron, U-239). This may cause the probability of neutron interaction at these resonance energies to significantly increase.

At higher energies, these resonances may become more closely spaced, eventually reaching a continuum. This behavior does not imply an absence of resonances but simply that the resonances may no longer be resolvable. Hence, this region may be termed the "unresolved resonance region." For the U-238 total cross-section discussed above, this region may be between about 20 keV and about 149 keV.

The cross-section may also exhibit complicated behavior at much lower (<0.01 eV) or much higher (>20 MeV) energies. These energies may be extremely rare in fission reactor analysis.

While not shown explicitly, the reaction rate of Equation (8) may also be a function of temperature. This temperature dependence may be introduced by a Doppler-broadening phenomenon that may cause the cross-section resonances to broaden and flatten at higher temperatures due to random atomic thermal motion. Cross-section data may be presented unbroadened, for example, at a temperature of 0 K. Prior to use, the cross-section data should be broadened to the appropriate temperature.

Cross-section data may be collected from experiments and/or models into libraries for use in nuclear physics calculations. These libraries may be promulgated by laboratories and/or government organizations that produced them. Examples of cross-section libraries include the Evaluated Nuclear Data Files (ENDF) of Brookhaven National Laboratory (e.g., ENDF/B series) from the United States, the Joint Evaluated Fission and Fusion File (JEFF) library from the European Union, and the Japanese Evaluated Nuclear Data Library (JENDL). These libraries may focus on different isotopes and applications, but may share many original experimental evaluations. These libraries may follow a standard ENDF-6 format that may allow processing programs to manipulate any set of library data, regardless of the source.

B. Cross-Section Usage in Reactor Calculations

To determine the reaction rates in a reactor system, the flux (i.e., neutron population) and cross-sections (i.e., interaction probabilities) should be known. As the cross-sections may be known via experiment, the flux, with respect to all of its independent variables, may be the parameter of interest. The equation for describing neutron behavior in a medium is the neutron transport equation. This equation may describe the neutron balance over differential position, energy, and/or angle.

The neutron transport equation is given in Equation (9).

$$\frac{1}{v(E)}\frac{\partial \Psi}{\partial t} = -\hat{\Omega}\cdot\nabla\Psi - \sigma_t(\bar{r}, E, t)\Psi(\bar{r}, E, \hat{\Omega}, t) + \int_0^\infty dE'\left[\int_{4\pi}d\Omega'\sigma_s(\bar{r}, E' \to E, \hat{\Omega}' \to \hat{\Omega}, t)\psi(\bar{r}, E', \hat{\Omega}', t)\right] + S(\bar{r}, E, \hat{\Omega}, t) \quad (9)$$

The negative terms on the right hand side (RHS) may represent loss by streaming to another location in space ($1^{st}$ term) and/or loss by absorption and/or scatter out of the current phase space ($2^{nd}$ term). The two positive terms may represent transfer into the phase space of interest from other phase spaces ($3^{rd}$ term) and/or neutron sources within the current phase space (4$^{th}$ term). This source term may be a fixed neutron source or sources due to reactions such as fission or (n, xn).

The cross-section in the 3$^{rd}$ term is not a cross-section in the sense described in the previous section, but a differential cross-section. In this case, the cross-section is a double-differential scattering cross-section in energy and solid angle, with units of inverse length, energy, and angle (e.g., 1/cm-eV-sr). This cross-section describes the probability per unit length of neutron transfer from a specific energy E' to a new energy E and from a direction $\hat{\Omega}'$ to a new direction $\hat{\Omega}$ following a scattering event. When integrated over all possible resulting energies and angles, this parameter reduces to the scattering cross-section at E'.

Direct solution of the neutron transport equation in its full form may not be possible analytically; however, this may not be necessary for most reactor applications. A number of simplifications may be applied to the neutron transport equation to arrive at a form that may be implemented in a computer program. The neutron transport equation may be solved at a steady-state conditions (i.e., ∂/∂t=0) as in Equation (10).

$$\hat{\Omega}\cdot\nabla\Psi+\sigma_t(\vec{r},E)\Psi(\vec{r},E,\hat{\Omega})=\int_0^\infty dE\int_{4\pi}d\Omega'\sigma_s(\vec{r},E'\to E,\hat{\Omega}'\to\hat{\Omega})\psi(\vec{r},E',\hat{\Omega}')+S(\vec{r},E,\hat{\Omega}) \quad (10)$$

Discretization of space, energy, and/or angle may be performed as well. In the case of Diffusion Theory, the angular dependence may be removed through use of a diffusion coefficient applied to the streaming term. Diffusion Theory may be applicable when the angular dependence of the neutron flux in the system may be weak. This condition may be met in the interior of many nuclear reactors. In regions of strong angular dependence (e.g., near reactor boundaries, areas of strong absorption), the diffusion assumption may yield inaccurate results. Diffusion Theory has found wide application in many core simulation programs such as DIF3D from Argonne National Laboratory (e.g., DIF3D 10.0), AETNA, and SIMULATE.

C. Asymptotic Flux Solution in Energy

A description of the asymptotic form of the neutron flux in energy may aid in determining the expected form of the neutron energy behavior in a simplified case. The knowledge of this asymptotic solution may inform future solutions and/or may form a first estimate of the flux profile with respect to the energy variable.

A first step in reducing the steady-state neutron transport equation to its asymptotic form may be to assume that the neutrons are present in an infinite medium. As shown in Equation (11), this may remove any spatial dependence of the neutron flux and/or may eliminate the streaming term (i.e., ∇=0).

$$\sigma_t(E)\psi(E,\overline{\Omega})=\int_0^\infty dE\int_{4\pi}d\Omega'\sigma_s(E'\to E,\overline{\Omega}'\to\overline{\Omega})\psi(E',\overline{\Omega}')+S(E,\overline{\Omega}) \quad (11)$$

Equation (11) may be integrated over dΩ to yield Equation (12).

$$\sigma_t(E)\int_{4\pi}d\Omega\psi(E,\hat{\Omega})=\int_0^\infty dE\int_{4\pi}d\Omega'\psi(E,\hat{\Omega}')[\int_{4\pi}d\Omega\sigma_s(E'\to E,\hat{\Omega}'\to\hat{\Omega})]+\int_{4\pi}d\Omega S(E,\Omega) \quad (12)$$

A next step may be to remove the angular dependence by integration over dΩ. The differential scattering cross-section may depend on the change in angle and not the specific incoming and outgoing neutron angles. This may alter the scattering term to the form shown in Equation (13).

$$\int_{4\pi}d\Omega\sigma_s(E'\to E,\hat{\Omega}'\to\hat{\Omega})=\int_{2\pi}d\omega\int_{-1}^{+1}d\mu_0\sigma_s(E'\to E,\mu_0) \quad (13)$$

The cosine of the scattering angle, $\mu_0$, may be given by the relationship shown in Equation (14).

$$\mu_0=\hat{\Omega}\cdot\hat{\Omega}'=\cos(\theta_0) \quad (14)$$

The angular dependence of the double-differential scattering cross-section may be removed because of the integration over all possible cosines from −1 to +1. This may yield a single-differential scattering cross-section in energy as shown in Equation (15).

$$2\pi\int_{-1}^{+1}d\lambda_0\sigma_s(E'\to E,\mu_0)=\sigma_s(E'\to E) \quad (15)$$

Substitution of Equation (15) into Equation (12) may give the infinite medium transport equation shown in Equation (16).

$$\sigma_t(E)\phi(E)=\int_0^\infty dE'\sigma_s(E'\to E)\phi(E')+S(E) \quad (16)$$

The neutron transport equation has now been simplified to an integral equation in terms of energy only. If neutrons only lose energy in collisions, as may be the case above thermal energies, the lower limit of integration of the scattering term may be restricted to the current energy. This may lead to the Neutron Slowing-Down Equation of Equation (17).

$$\sigma_t(E)\phi(E)=\int_E^\infty dE'\sigma_s(E'\to E)\phi(E')+S(E) \quad (17)$$

In treating neutron slowing-down, the flux may be given in terms of the independent variable of lethargy. Lethargy is a measure of neutron slow-down relative to a reference energy. As the neutron slows down, its lethargy increases, as defined in Equation (18). Differential lethargy is defined in Equation (19).

$$u=\ln\left(\frac{E_o}{E}\right) \quad (18)$$

$$du=-\frac{1}{E}dE \quad (19)$$

The parameter $E_0$ is a specified reference energy, which may be a source energy or maximum reachable energy in the model. The neutron flux function in energy may be given in terms of lethargy, u, as in Equation (20) and Equation (21).

$$\phi(u)du=-\phi(E)dE \quad (20)$$

$$\phi(u)=E\phi(E) \quad (21)$$

The solution to the slowing-down equation with isotropic scattering and no absorption in the COM frame of reference may take the form given in Equation (22).

$$\phi(E)=\frac{C}{E} \quad (22)$$

The parameter C may be a constant representing the source strength or a normalization factor. If Equation (22) is given with lethargy as the independent variable, then Equation (22) may reduce to the form of Equation (23).

$$\phi(u)=C \quad (23)$$

This constant flux in lethargy may be an asymptotic form of the flux that may serve as the starting point for more complicated spectrum calculations.

II. Group Constants

A. Overview

Spatial and energy dependence are often treated in a discrete fashion in the neutron transport equation. Without discretization of the neutron transport equation, the time and computational resources required to arrive at a solution would be impractical for engineering design and analysis. Discretization allows for a reactor system to be described by a few spatial nodes or zones and energy to be defined by a few groups. A trade-off of this approach is that the flux dependence within the node, zone, or group may be lost in the final solution.

Reactor spatial dependence will often be discretized by homogenizing material properties over a volume and calculating an average flux in this volume. This volume may be a repeating structure, such as a fuel pin or fuel assembly. Care must be taken to preserve any important flux variation in energy or space within this volume if it will affect the final system solution.

A similar discretization procedure may be performed for energy by calculating the average flux in an energy group. These groups may be sections of the neutron energy spectrum with similar properties. For example, in light water reactor (LWR) analysis it is common to have an energy group below a 1 eV assigned to the thermal group, neutrons in the resonance energy range (e.g., 1 eV to 100 keV) assigned to a slowing-down group, and neutrons above 100 keV assigned to a fast group. Since the energy dependence of the flux within the group is lost during discretization, corresponding average cross-sections in energy must be developed for each group to be used with the energy-averaged flux. These average cross-sections are known as group constants.

The averaging of group constants may not be as simple as weighting the cross-section value in space and energy. Instead, the flux at the specific energy and point in space must be used to weight a cross-section at a given location and energy to preserve reaction rates.

The flux weighted averaging of cross-sections is complicated by self-shielding, which is where a large cross-section depresses the flux at that specific energy and location. The energy self-shielding effect is often the result of strong resonances in the cross-section. As the neutron population approaches the resonance energy, the number of neutrons available for interaction decreases due to neutron absorption or transfer away from the resonance energy. Therefore, the sharp resonance peak shields itself from the neutron interaction at the resonance energy. The result is a lower overall reaction rate at the resonance energy than if the neutron population remained unshielded.

Figure 2:
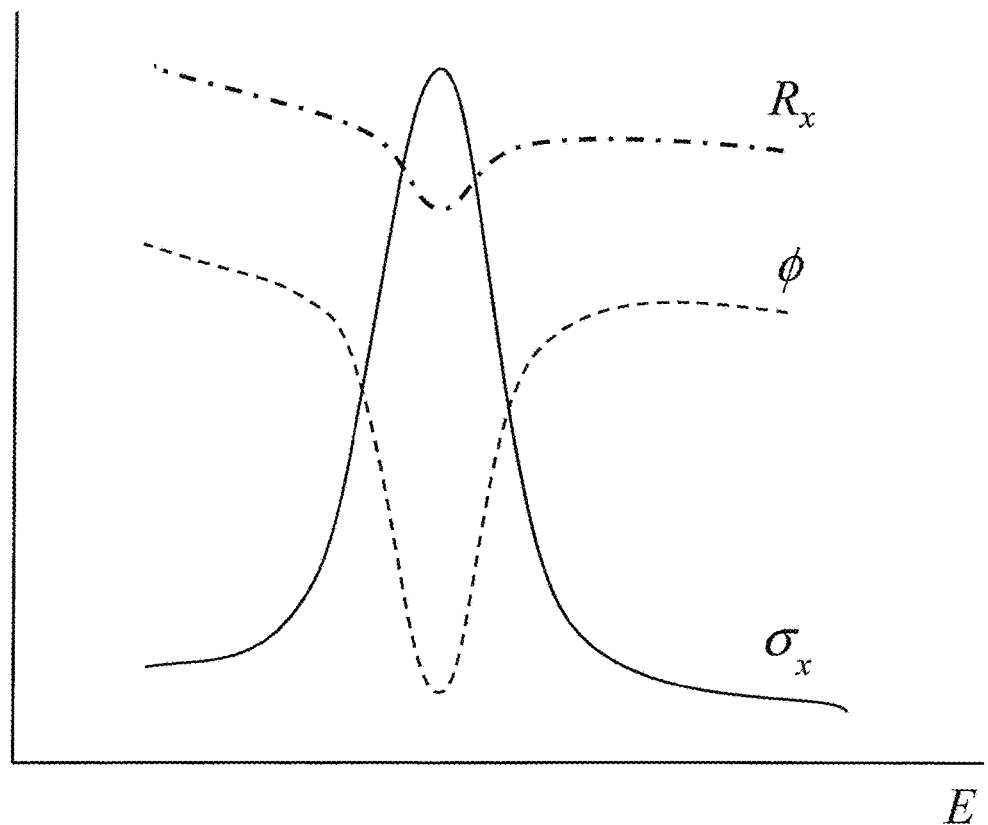
FIG. 2 is a diagram showing the flux self-shielding effect.

FIG. 2 is a diagram showing the flux self-shielding effect (e.g., how flux may be depressed in the vicinity of a resonance). The sharp resonance of the cross section, $\sigma_x$, may shield the neutron flux, $\phi$, by removing neutrons from near resonance energies, so that the resulting reaction rate, $R_x$, may be less than it would be if the flux had remained unshielded.

The self-shielding effect also may have spatial dependence, such as in a heterogeneous zone with both a resonant absorber and non-resonant material. The non-resonant material would be shielded from the resonant neutron energy because of the resonant absorber. Any spatial homogenization of this zone requires consideration of this effect to product accurate group constants. This effect is of particular importance in LWRs, where neutrons are born in fuel material, slow-down in moderator material, and then return to fuel material for reabsorption.

Figure 3:
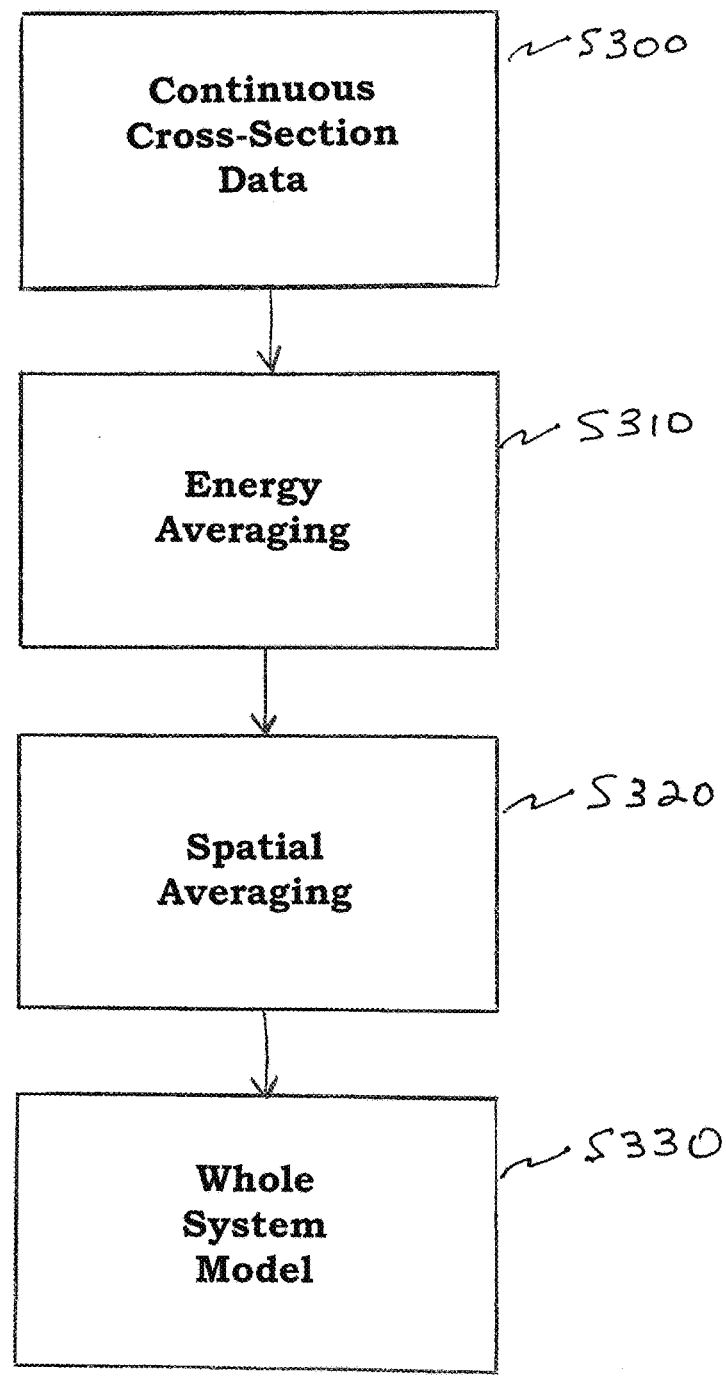
FIG. 3 is a flowchart of a group constant generation process.

FIG. 3 is a flowchart of a group constant generation process (e.g., a method for deterministically modeling reactor systems). In step S300, continuous cross-section data is obtained, including starting with an evaluated nuclear data library, reconstructing unresolved and resolved resonance parameters into continuous cross-sections, and/or Doppler broadening the continuous cross-sections to a specific temperature. In step S310, the continuous cross-section data is energy averaged, including simplifying geometry (e.g., infinite medium, one-dimensional), detailing treatment of energy (e.g., fine group or pointwise), accounting for energy self-shielding, and/or determining fine group constants (e.g., hundreds of groups). In step S320, the energy averaged continuous cross-section data is spatially averaged, including using the fine group constants to solve for spatial flux within a unit cell, accounting for spatial self-shielding within the cell, detailing flux calculations (e.g., discrete ordinates, integral transport), and/or using the detailed flux in space to collapse the fine group constants to coarse group constants for specific cells at specific conditions (e.g., tens or fewer of groups). In step S330, the energy and spatially averaged continuous cross-section data is used in a whole system model, including modeling the whole system in space and time with appropriate coarse group constants for each cell and/or selecting pre-computed coarse group constants for each cell based on reactor conditions in that cell.

The energy self-shielding calculation may be performed first on a unit cell of the reactor. A simplified geometric model, such as one-dimension or infinite medium, is applied to the unit cell. During this step, the continuous cross-section data is processed into to a set of fine group constants, that may include tens, hundreds, or possibly thousands of energy groups. This work focuses on the process of generating the weighting spectrum for fine group constant generation. A method for using continuous nuclear data to generate a pointwise flux solution for use in group constant generation is discussed below.

The next step in reactor modeling is applying the fine group constants to a detailed cell calculation. This cell flux is then used to generate a few broad group constants for use in the full-core simulation. This cell calculation may be repeated for different operating conditions (e.g., temperature, void, composition) resulting in a set of cell-averaged group constants as a function of energy and operating conditions. The result may be a set of coarse group constants (e.g., fewer than 10) at a specific operating condition for each cell.

The final coarse group constants generated from the cell calculation are then applied to a full-core reactor simulation with the appropriate average values used for each unit cell and energy group.

The entire exercise of group constant generation would be trivial if the flux were known continuously as a function of space, energy, angle, and time. If the flux were known in perfect detail, the cross-sections could be averaged with zero bias. However, as knowledge of the flux profile is the goal of solving the neutron transport equation, it will not be known beforehand. Even if the flux were known completely in a reactor system, any perturbation (e.g., temperature change, control rod insertion, flow or power change) could alter the flux profile and invalidate the current set of group constants. Therefore, the difficulty of creating group constants arises from the requirement of the flux to be known for all potential operating conditions before the flux is actually known. Some common approaches to handling the problem of group constant generation for both thermal and fast spectrum systems are discussed below.

B. Group Constant Calculations

The average value of a function over an interval may be calculated as shown in Equation (24) and Equation (25), where x(t) is the function to be averaged over an independent variable t and w(t) is the weighting function for averaging.

$$\int_a^b dt x(t) w(t) = \bar{x} \int_a^b dt w(t) \tag{24}$$

$$\bar{x} = \frac{\int_a^b dt x(t) w(t)}{\int_a^b dt w(t)} \tag{25}$$

In the simple case of determining the mean value of a function, the weighting function of Equation (26) may be equal to one. In the case of group constant generation where the reaction rates must be preserved, the weighting function may be the scalar flux.

$$\bar{\sigma}_x(\vec{r}) = \frac{\int_{E_a}^{E_b} dE \sigma_x(\vec{r}, E) \phi(\vec{r}, E)}{\int_{E_a}^{E_b} dE \phi(\vec{r}, E)} \tag{26}$$

The difficulty arising from solution of Equation (26) is the requirement that flux is known as a function of energy at a specific location in space. The most straightforward approach to solving Equation (26) may be to assume an approximate energy dependence of the flux. This may require experiential basis of the reactor system in question. This method also may assume that the net errors associated with this approach would be acceptable. Some common weighting spectrum methods are discussed below.

III. Weighting Spectrum Methods

A. Bondarenko Method

An original work on group constants, *Group Constants for Nuclear Reactor Calculations*, by Bondarenko, Consultants Bureau, New York (1964), proposed flux spectrum of the form of Equation (27) where $\phi_0(u)$ is a smoothed flux spectrum without perturbation given in terms of lethargy.

$$\phi(u) - \frac{\phi_0(u)}{\sigma_t(u)} \tag{27}$$

Bondarenko proposed using the asymptotic flux solution as described in Equation (23) where $\phi_0(u)$ may be assumed constant. This may reduce Equation (26) to the form of Equation (28).

$$\bar{\sigma}_x = \frac{\int_{u_a}^{u_b} du \frac{\sigma_x(u)}{\sigma_t(u)}}{\int_{u_a}^{u_b} du \frac{1}{\sigma_t(u)}} \tag{28}$$

Variations of Equation (28) may be made for the transport and elastic cross-section, but this basic form is the basis of the group constant generation method proposed by Bondarenko.

While the Bondarenko method is valid for a wide range of energies, the assumption of asymptotic flux is invalid near neutron sources, where neutrons have not yet reached asymptotic behavior. It may also be invalid at energies where neutrons have thermalized with the medium. In the group constant set presented by Bondarenko, the asymptotic flux spectrum was used for all groups lower than 2.5 MeV. For the highest energy groups an analytic expression representing the neutron fission spectrum was used.

The group constant method of Bondarenko is an example of how to apply knowledge of the system through different forms of the flux spectrum. For LWRs, the unperturbed flux profile is often a combination of a fission energy distribution at high energies, the asymptotic form at slowing-down energies, and a Maxwellian distribution at thermal energies.

A noted weakness of a straightforward application of Equation (28) is that it considers a medium containing only a single resonance absorber. As is often the case of nuclear reactors, the medium in question could be a mixture of different resonant materials (e.g., fuel isotopes) with non-resonant materials (e.g., structure and coolant isotopes). Bondarenko proposed a correction to Equation (27) by including a background cross-section, $\sigma_0$.

$$\phi(u) = \frac{\phi_0(u)}{\sigma_i(u) + \sigma_0} \tag{29}$$

The $\sigma_0$ term represents the constant background section from non-resonant isotopes. Spatial effects (leakage) also may be accounted for through $\sigma_0$.

Inclusion of the background cross-section dilutes the effect of the resonance on the flux. As $\sigma_0$ goes to infinity, the flux perturbation goes to zero. This condition is known as infinite dilution. If this condition, coupled with the asymptotic form, is substituted into Equation (26) the group constant is simply the mean value of the cross-section over the interval. This may be interpreted as no self-shielding taking place.

$$\bar{\sigma}_x = \frac{\int_{u_a}^{u_b} du \sigma_x(u)}{u_b - u_a} \tag{30}$$

Recall from Equation (27) that the slowing-down form assumes that the total neutron interaction rate, $\sigma(u)\phi(u)$, is relatively constant. This condition is true if a collision within a resonant material removes the neutron from the resonance either by absorption or by scatter out of the resonance. This condition is given in Equation (31) where $\Gamma$ is the practical width of the resonance and $\xi$ is the average fractional energy loss per scatter in the absorber.

$$\Gamma \ll \xi E \tag{31}$$

The Bondarenko method is based upon this Narrow Resonance Approximation. If collisions occur inside a resonance and the neutron fails to leave the resonance, then the condition of Equation (31) may no longer hold.

The constraint of a narrow resonance may be met if the scattering band (i.e., range of resultant energies) is wide compared to the resonance width. At high energies, a large scattering band and/or narrower resonances may lead to the satisfaction of Equation (31) and/or validity of the Narrow Resonance Approximation.

At lower energies, the scattering band may become logarithmically smaller and the resonances may widen. These factors may create difficulties for the Narrow Resonance Approach. At these energies the Wide or Intermediate Resonance Approximations may be more appropriate.

The Wide Resonance Approximation starts with the same fundamental equations as the Narrow Resonance method but assumes that a neutron does not leave a resonance upon collision. This condition is also expressed by the assumption that resonant isotope is infinitely absorbing (i.e., always absorbs neutrons which interact in the resonance rather than transfer them). Therefore this approximation is also called the Wide Resonance Infinite Absorber Approximation. The Wide Resonance Approximation arrives at the flux spectrum of Equation (32).

$$\phi(u) = \frac{\phi_0(u)}{\sigma_a(u) + \sigma_0} \quad (32)$$

The only difference between Equation (29) and Equation (32) is the use of the absorption cross-section of the resonant isotope in the denominator rather than the total cross-section.

The Intermediate Resonance Approximation is a combination of the Narrow and Wide Resonant approximations. The narrow and wide resonance expressions are combined and weighted with the parameters $\lambda$ and $(1-\lambda)$, respectively. This approximation may be used for energies where neither the assumptions of the narrow or wide resonance approximations are valid.

The Bondarenko method based on the Narrow Resonance Approximation has been a standard approach for generation of group constants for three decades. The GROUPR module of the NJOY computer program (e.g., NJOY 2010) is commonly used to produce group constants with the Narrow Resonance approach. The fundamental formula used in GROUPR is given in Equation (33), where i is the isotope index, l is the Legendre component of the angular flux (l=0 for scalar flux), and C(E) is an input weighting spectrum.

$$\phi_l^i(E) = \frac{C(E)}{[\sigma_t^i(E) + \sigma_0^i]^{l+1}} \quad (33)$$

In the GROUPR module, C(E) and $\sigma_0$ are input from the user resulting in cross-sections at a set of temperatures and $\sigma_0$ values. A similar methodology is employed in the Bondarenko AMPX Interpolator (BONAMI) module of the Standardized Computer Analyses for Licensing Evaluation (SCALE) computer package.

The strength of the Narrow Resonance approach is its simplicity and ability to generate reusable group constants. A library of group constants may be generated as a function of temperature and background cross-section. Examples of such group constant libraries include the VITAMIN-B6 library processed by NJOY into the AMPX format used by SCALE. These group constant libraries are pseudo problem-independent because they have been processed with variable temperatures and background cross-sections but a fixed weighting spectrum. These group constant libraries may be the starting point for the generation of problem-specific libraries. For example, the 199 group VITAMIN-B6 library was collapsed with a specific pressurized water reactor (PWR) and boiling water reactor (BWR) flux spectrum to create the 47 group BUGLE-96 library for pressure vessel shielding calculations.

The Bondarenko method is often used in conjunction with an f-factor approach. In this approach a set of group constants are generated at zero temperature (no Doppler broadening) and infinite dilution conditions. This zero-temperature, infinite dilute set are scaled by an f-factor.

$$\sigma(T,\sigma_0) = f(T,\sigma_0)\sigma(0,\infty) \quad (34)$$

In this scenario, a table of f-factors is generated for scaling of the zero-temperature, infinite dilute group constants. The LANCER02 lattice physics generates f-factors via NJOY from a set of infinitely dilute cross-sections at 0 K and cross-sections at other values of temperature and background cross-section. During LANCER02 execution, a logarithmic interpolation is performed on the background cross-section and a quadratic interpolation is performed on the square root of the fuel temperature. This allows the LANCER02 program to obtain group constants for a specific amount of moderation and reactor temperature conditions without the need for recalculation of the group constants.

The weakness of the Bondarenko method is the assumption of narrow, widely-spaced resonances. Resonance overlap, either within or between resonant materials, will introduce error because the flux will not be shielded as $1/\sigma_t$. Areas of particular concern are wide resonances at lower energies of fuel materials (e.g., U-235, Pu-239) and the closely-spaced, overlapping resonance region of fuel materials. The former issue may be treated by direct flux calculation in the thermal region (as in GROUPR) or by a wide or intermediate resonance approximations. The latter issue is of great importance in fast reactor analysis and often leads to the need to solve the flux with a higher degree of energy resolution.

B. Subgroup Method

The Subgroup method has found use in LWR lattice physics applications such as CASMO from Studsvik Scandpower AB (e.g., CASMO-5), APOLLO2 from Commissariat à l'Energie Atomique et aux Energies Alternatives (e.g., APOLLO2-A), and HELIOS from Studsvik Scandpower AB (e.g., HELIOS-2). In newer lattice physics programs, it has replaced the Bondarenko method because of its ability to create accurate group constants without resorting to direct solution of the transport equation. The Subgroup method offers improved accuracy over the Bondarenko method with similar computational requirements.

The Subgroup method, also known as the Multiband method or Probability Table method, was originally proposed as a method of self-shielding by L. Levitt and M. N. Nikolaev then advanced in the works of D. E. Cullen in the 1970s. The Subgroup method has been further refined in the works of A. Hébert and incorporated into many modern lattice physics programs such as APOLLO2.

The Subgroup method is based upon subdivision of the total cross-section into subgroups, also called bands, within an energy group. A probability density function may be developed for the total cross-section within the group. The translation of a cross-section versus lethargy or energy to a probability table may be performed by taking a Riemann integral of the cross-section and replacing it with an equivalent Lebesgue integral as in Equation (35).

$$\frac{1}{\Delta u_q} \int_{u_{g-1}}^{u_g} du f[\sigma(u)] = \int_0^{max(\sigma)} d\sigma \prod(\sigma) f(\sigma) \quad (35)$$

The left-hand side (LHS) of Equation (35) is the common definition of a cross-section perturbed flux profile as in the Bondarenko approach. The right-hand side (RHS) of Equation (35) contains the probability density function of $\sigma$ where $\Pi(\sigma)d\sigma$ is the probability that the cross-section value with lie between $\sigma$ and $\sigma+d\sigma$. This probability density function is then represented by a finite, weighted set of Dirac distributions at discrete values of the cross-section, $\delta(\sigma-\sigma_k)$.

$$\Pi(\sigma) = \sum_{k=1}^{K} \delta(\sigma - \sigma_k) w_k \tag{36}$$

Substituting Equation (36) into Equation (35) yields the relationship of Equation (37) that forms the basis for Subgroup programs.

$$\frac{1}{\Delta u_g} \int_{u_{g-1}}^{u_g} du f[\sigma(u)] = \sum_{k=1}^{K} w_k f(\sigma_k) \tag{37}$$

The weights and $\sigma_k$ values in Equation (37) may be determined by a number of methods known to a person having ordinary skill in the art (PHOSITA).

The Subgroup method is an improvement of the Bondarenko method for resonance self-shielding. Instead of adding a finer group structure, the Subgroup method adds a dimension of variation on the total cross-section via probability tables. Some of the works of Cullen demonstrate that a 175 group, 2 band calculation (350 equations) may yield reaction rates with equal or less error than a 2020 group calculation for U-235 critical spheres. This improved efficiency has made the Subgroup method a popular choice for many LWR lattice applications.

One drawback of the Subgroup approach is the lack of resonance interference treatment. An example of this interference effect may be observed in LWRs between the 20.9 eV resonance of U-238 and the 20.45 eV resonance of Pu-240. When resonances of multiple materials (e.g., a mixture of actinides in a fuel assembly) interfere with each other, the assumed shape function may be invalidated. Any calculation where the flux within a region of the problem is assumed to follow a prescribed shape dependent on the total cross-section may be limited by this problem.

IV. Direct Solution Methods

A. Fine Group Method

The fine group approach involves the solution of the discretized neutron transport equation with energy groups selected at energy (or lethargy) widths fine enough that the intra-group flux will be slowly varying (i.e., a linear variation or constant). The flux is then solved for directly, typically in simplified infinite medium or one-dimensional geometry. The resulting flux energy spectrum is then used as the weighting spectrum for group constant generation via Equation (26).

The multigroup (MG) form of the transport equation is obtained by integrating the transport equation over discrete energy ranges. The MG form of the steady-state, angularly-independent neutron transport equation is shown in Equation (38) for the energy range $E_g$ to $E_{g-1}$.

$$\int_{E_g}^{E_{g-1}} dE \hat{\Omega} \cdot \nabla \Psi + \int_{E_g}^{E_{g-1}} dE \sigma_t(\vec{r}, E) \Psi(\vec{r}, E, \hat{\Omega}) = \tag{38}$$
$$\int_{E_g}^{E_{g-1}} dE \int_{-1}^{+1} d\mu_0 \int_0^{\infty} dE' \sigma_s(\vec{r}, E' \to E, \mu_0) \psi(\vec{r}, E', \hat{\Omega}') +$$
$$\int_{E_g}^{E_{g-1}} dE S(\vec{r}, E, \hat{\Omega})$$

To simplify Equation (38), group flux, group constants, and group source are defined in Equation (39), Equation (40), and Equation (41), respectively.

$$\psi_g(\vec{r}, \hat{\Omega}) = \int_{E_g}^{E_{g-1}} dE \psi(\vec{r}, E, \hat{\Omega}) \tag{39}$$

$$\sigma_{x,g}(\vec{r}) = \frac{\int_{E_g}^{E_{g-1}} dE \sigma_x(\vec{r}, E) \psi(\vec{r}, E, \hat{\Omega})}{\int_{E_g}^{E_{g-1}} dE \psi(\vec{r}, E, \hat{\Omega})} \tag{40}$$

$$S_g(\vec{r}, \hat{\Omega}) = \int_{E_g}^{E_{g-1}} dE S(\vec{r}, E, \hat{\Omega}) \tag{41}$$

With the definitions above, Equation (38) may be reduced to Equation (42).

$$\hat{\Omega} \cdot \nabla \Psi_g + \sigma_{t,g}(\vec{r}) \Psi_g(\vec{r}, \hat{\Omega}) = \tag{42}$$
$$\int_{E_g}^{E_{g-1}} dE \int_{-1}^{+1} d\mu_0 \int_0^{\infty} dE' \sigma_s(\vec{r}, E' \to E, \sigma_0) \psi(\vec{r}, E', \hat{\Omega}') +$$
$$S_g(\vec{r}, \hat{\Omega})$$

To accommodate the scattering term of Equation (42), the total energy range considered is broken into G subintervals (i.e., energy groups) as shown in Equation (43). A group to group transfer cross-section is then defined in Equation (44).

$$\hat{\Omega} \cdot \nabla \Psi_g + \sigma_{t,g}(\vec{r}) \Psi_g(\vec{r}, \hat{\Omega}) = \tag{43}$$
$$\sum_{g'=1}^{G} \int_{E_g}^{E_{g-1}} dE \int_{-1}^{+1} d\mu_0 \int_{E_{g'}}^{E_{g'-1}} dE' \sigma_s(\vec{r}, E' \to E, \mu_0) \psi(\vec{r}, E', \hat{\Omega}') +$$
$$S_g(\vec{r})$$

$$\sigma_{s,g' \to g}(\vec{r}, \mu_0) = \frac{\int_{E_g}^{E_{g-1}} dE \int_{E_{g'}}^{E_{g'-1}} dE' \sigma_s(\vec{r}, E' \to E, \mu_0) \psi(\vec{r}, E', \hat{\Omega}')}{\int_{E_{g'}}^{E_{g'-1}} dE' \psi(\vec{r}, E', \hat{\Omega}')} \tag{44}$$

Equation (43) may now be reduced to the final MG form of the transport equation shown in Equation (45).

$$\hat{\Omega} \cdot \nabla \Psi_g + \sigma_{t,g}(\vec{r}) \Psi_g(\vec{r}, \hat{\Omega}) = \tag{45}$$
$$\sum_{g'=1}^{G} \int_{-1}^{+1} d\mu_0 \sigma_{s,g' \to g}(\vec{r}, \mu_0) \psi_{g'}(\vec{r}, \hat{\Omega}) S_g(\vec{r}, \hat{\Omega})$$

The group fluxes in Equation (45) may be coupled via the scattering transfer term. This may become problematic as finer group structures are employed because the probability of transfer from every group to every other group must be calculated. In the worst case, this would require $G^2$ calculations.

Approximations may be made to Equation (45) to reduce the computational burden of group-to-group scatter. A common approximation in fast neutron systems is to assume neutrons only down-scatter. This allows the scattering term of Equation (45) to be summed from the current group to the highest energy group, ignoring all lower energy groups. Another approximation is to space groups such that scatter will only occur to the next lowest group. This approximation is of great utility in coarse-group, whole-core simulations because there is a fixed input to the lower groups and no summation loop required.

Group constants must still be determined for application of the MG methods (see Equation (40) and Equation (44)). The difference with the fine group approach is that the impact of the assumed weighting spectrum is minimized because the energy group size is relatively fine. With the fine-group approach, the Bondarenko method may be used to develop initial group constants for the MG solution. These group constants then may be updated with the resulting flux from the fine group solution if desired.

In the fine group approach the spatial dependence is often treated with a course approximation. Infinite medium calculations are common when spatial dependence is of secondary importance, a zero-dimensional correction may be used to account for the leakage effect on the energy spectrum. In this zero-dimensional approach the spatial dependence of the flux approximated via a geometric buckling factor, $\overline{B}$.

$$\Psi(\vec{r}, E, \hat{\Omega}) = \Psi(E, \hat{\Omega})e^{i\vec{B}\cdot\vec{r}} \qquad (46)$$

The lumped buckling parameter describes the loss of neutrons by leakage and may be given on a group-wise basis if necessary.

The zero-dimensional transport equation may be derived by substitution of Equation (46) into the neutron transport equation.

$$[\sigma_t(E) + i\overline{B}\cdot\overline{\Omega}]\Psi(E,\overline{\Omega}) = \int_E^\infty dE \int_{-1}^{+1} d\mu_0 \sigma_s(E' \to E, \mu_0)\psi(E', \overline{\Omega}') + S(E,\overline{\Omega}) \qquad (47)$$

If the angular component of the flux and scattering cross-section are expanded into spherical harmonics the following relationship is obtained for planar geometry.

$$[\Sigma_t(E) + iB\mu]\psi(E, \mu) = \int_E^\infty dE \sum_{l=0}^\infty \frac{(2l+1)}{2} \Sigma_{sl}(E' \to E)\phi_l(E)P_l(\mu) + S_l(E) \qquad (48)$$

The zero-dimensional transport equation may be simplified through the recursion relationship for Legendre Polynomials given by Equation (49) and the application of the orthogonality property of Legendre Polynomials.

$$(l+1)P_{l+1}(x) - (2l+1)xP_l(x) + lP_l(x) = 0 \qquad (49)$$

Use of these Legendre Polynomial properties results in Equation (50), where $l$ is the Legendre order of the flux or differential cross-section.

$$\frac{l+1}{2l+1}iB\phi_{l+1}(E) + \frac{l}{2l+1}iB\phi_{l-1}(E) + \sigma_t(E)\phi_l(E) = \int_E^\infty dE' \sigma_{sl}(E' \to E)\phi_l(E') + S_l(E) \qquad (50)$$

The fast reactor group constant program $MC^2$ may solve Equation (50) using a number of transport methods including ultra and/or hyper fine MG.

B. Pointwise Method

Another direct approach to developing problem dependent group constants is a PW method. In this approach, the flux is solved at a set of energy points that are spaced such that the flux variation between points may be assumed to be linear. The resulting PW flux is then a linear-interpolatable function in energy. At resonance energies this continuous energy, PW solution may be useful as it represents one of the highest fidelity methods currently available. This PW method was first introduced by Williams and has been implemented in the CENTRM module of the SCALE analysis package from ORNL.

The CENTRM method combines a classic MG approach with a PW flux solution. CENTRM applies a high-fidelity, PW solution where the flux has strong energy dependence (e.g., resonance energies) and a traditional MG solution where the flux is slowly varying (e.g., high energies).

Going from higher energies down to lower energies, regions of solution for CENTRM may fall into an Upper Multigroup Range (UMR), a Pointwise Range (PR), and/or Lower Multigroup Range (LMR). The UMR may lie above a DEMAX value of energy. In the UMR, elastic and/or inelastic scattering may occur. The PR may lie between the DEMAX value of energy and a DEMIN value of energy. In the PR, elastic, discrete inelastic, and/or thermal scattering may occur. The LMR may lie below the DEMIN value of energy. In the LMR, elastic and/or thermal scattering may occur.

Within the UMR, scattering may be MG to MG downscatter. From the UMR to the PR, scattering may be MG to PW downscatter. Within the PR, scattering may be PW to PW downscatter. From the PR to the LMR, scattering may be PW to MG downscatter. Within the LMR, scattering may be MG to MG upscatter and/or downscatter.

In the MG regions, the group constants may be self-shielded by the Bondarenko method; the MG fluxes solved by the aforementioned MG solution methods. In the PW range the transport equation is written as Equation (51), where n is the energy point where the flux will be balanced.

$$\hat{\Omega}\cdot\nabla\Psi_n(\vec{r}, \hat{\Omega}) + \sigma_{t,n}(\vec{r})\Psi_n(\vec{r}, \hat{\Omega}) = \int_{-1}^{+1} d\mu_0 \int_E^\infty dE' \sigma_s(\vec{r}, E' \to E, \mu_0)\psi(\vec{r}, E', \hat{\Omega}') + S_n(\vec{r}, \hat{\Omega}) \qquad (51)$$

Note that the form of the equation in Equation (51) may be very similar to the MG form of Equation (45) with the exception of the cross-section definitions and the scattering source. The CENTRM program uses the same subroutines to solve the transport equation in the PW region as it does in the MG region.

CENTRM uses sub-moment expansion to separate the final energy dependence, E, out of the transfer source integrand of Equation (51) and into a series of sub-moments. The removal of the final energy dependence from the integrand allows for a continuous summation of the transfer source over initial energy, E', as the calculation progresses from high energy to low energy. This avoids the recomputing of the transfer source at each energy point and, therefore, makes the PW solution method in CENTRM more efficient.

The primary difference between the PW and MG solutions is the definition of the resulting flux. The PW formula of Equation (51) describes neutron balance at a specific energy, while the MG form describes neutron balance over an energy interval. The units of flux in the PW solution are 1/eV-cm²-s and the MG solution flux has the normal scalar flux units of 1/cm²-s. Conversion between the two quantities may be performed by dividing the MG flux by ΔE or Δu. This assumes the PW flux is an accurate representation of the average flux over the entire interval.

The PW method does not conserve reaction rates over an energy interval. By using a PW solution, the overall particle balance on an energy interval is not maintained. However, for the purposes of obtaining a weighting spectrum, a PW solution may be acceptable because the overall flux shape is of primary importance and not the actual reaction rates occurring in the system. This effect may be further mitigated by using a larger number of energy points. CENTRM uses enough points to assume linear flux dependence between the energy points. A PW solution for CENTRM may include, for example, 10,000 to 70,000 points, depending on the isotopes present.

The inclusion of spatial dependence in a PW solution is dependent on the degree of fidelity desired. CENTRM contains options ranging from infinite medium to one-dimensional geometry. Often in lattice physics methods for LWRs, the flux spectrum variation in a unit cell, particularly a large unit cell like a fuel assembly, may be significant enough to warrant inclusion of detailed spatial treatment. The PW solution may be solved in two- or three-dimensional space using the Discrete Ordinates (i.e., SN) method or the Method of Characteristics.

An example of spatial and PW coupling is the Group and Energy-Pointwise Methodology Implemented in NEWT for Resonance Neutronics (GEMINEWTRN) module of SCALE. GEMINENTRN couples a two-dimensional Discrete Ordinates method with the CENTRM PW flux module. This may yield highly accurate results for highly heterogeneous fuel designs such as mixed oxide (MOX)-bearing BWR lattices.

The strength of the fine group or PW approach is its high degree of fidelity. The neutron transport equation is solved directly for the material and temperature of interest instead of using an assumed weighting spectrum perturbed by a function of the cross-section or other factors. The drawback of this approach is that the resulting group constants are not reusable, because the detail of the system has been captured in the higher accuracy group constants. Application of these group constants to temperatures and compositions different from the original basis would introduce error. There is no straightforward means of scaling the group constants to a different application with the fine-group approach.

The PW solution method represents one of the highest accuracy methods for calculating the neutron energy spectrum. The work presented here is based on the work of the PW solution method, particularly the methods employed in the CENTRM computer package.

V. Neutron Energy Transfer Mechanisms

A. Overview

The generation of accurate group constants is highly dependent on adequately describing the energy dependence of the neutron flux. Collisions with nuclei in a system transfer neutrons from source energies to lower energies. In a thermal reactor, such as an LWR, these neutrons slow down until they thermalize (reach energies comparable with the thermal motion of the reactor medium). In a fast reactor, the neutrons are usually absorbed or leak from the system before thermalizing and thus remain in the slowing-down mode for their entire lifetime.

The primary mode of neutron energy transfer within a nuclear reactor is scattering. Neutron scattering occurs when neutrons collide with the nucleus of an atom and impart some of their kinetic energy to the nucleus. If the nucleus is left in an excited state after the collision, the kinetic energy of the reaction is not conserved and this reaction is inelastic. In this scenario, the nucleus de-excites via some subsequent nuclear decay mechanism such as gamma ray emission. Otherwise, the scattering reaction is a two-body collision where kinetic energy is conserved and is considered elastic.

As the scattering energy transfer mechanism is important to describing the neutron energy dependence and, by extension, determining the group constants, it is important to briefly describe the relationships that govern energy transfer in scattering reactions.

B. Scattering Kinematics

Figure 4:
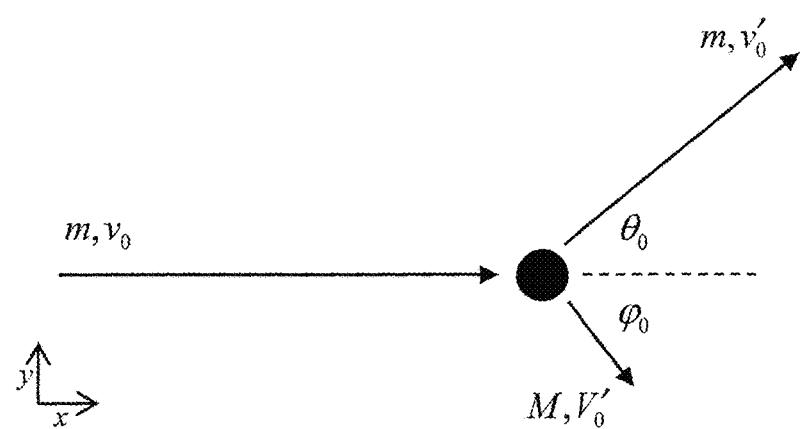
FIG. 4 is a diagram showing scattering kinematics vectors in a laboratory system.

FIG. 4 is a diagram showing scattering kinematics vectors in a laboratory system (e.g., a neutron-nucleus interaction before and after a scattering event in the laboratory system). A neutron with mass, m, and velocity, $v_0$, strikes a nucleus, assumed to be at rest, scatters into a new angle, $\theta_0$, and imparts some of its kinetic energy to the nucleus. This assumption of the nucleus at rest is valid when the neutron energy is well above kT, where k is Boltzmann's constant of $8.617 \times 10^{-5}$ eV/K and T is the temperature of the medium in K.

The conservation of energy before and after collision is given in Equation (52) where Q is the excitation energy of the nucleus if the reaction is inelastic. For an elastic collision, Q is equal to zero.

$$\tfrac{1}{2}mv'^2_0 = \tfrac{1}{2}mv_0^2 + \tfrac{1}{2}MV_0^2 - Q \qquad (52)$$

The conservation of momentum before and after collision is given in the x and y direction by Equation (53) and Equation (54), respectively.

$$mv'_0 = mv_0 \cos(\theta_0) + MV_0 \cos(\varphi_0) \qquad (53)$$

$$0 = mv_0 \sin(\theta_0) + MV_0 \sin(\varphi_0) \qquad (54)$$

Figure 5:
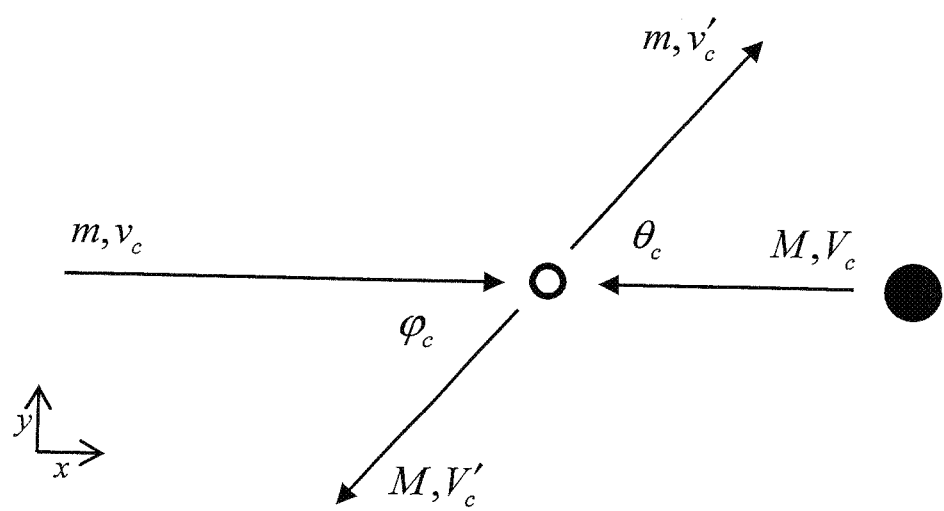
FIG. 5 is a diagram showing scattering kinematics vectors in a center-of-mass (COM) system.

This system of coordinates is referred to as the laboratory system. To facilitate a full description of this scattering event, the system will be cast into a new frame of reference. In this new frame of reference, the entire system is moving at the same velocity as the center of mass of the neutron-nucleus pair. Therefore this system is referred to as the COM system. FIG. 5 is a diagram showing scattering kinematics vectors in a COM system (e.g., a neutron-nucleus interaction before and after a scattering event in the COM system).

Solution of the neutron energy and momentum equations in the COM system enables solution of the scattering angle in the laboratory system. As known to a PHOSITA, details of this procedure may be found, for example, in *Nuclear Reactor Analysis* by Duderstadt and Hamilton, John Wiley and Sons (1976), pp. 39-45. Following this procedure and converting velocity to kinetic energy provides the following relationship for scattering angle in the laboratory system.

$$\cos(\theta_0) = \left(\frac{A+1}{2} - \frac{QA}{2E}\right)\sqrt{\frac{E}{E'}} - \frac{A-1}{2}\sqrt{\frac{E'}{E}} \quad (55)$$

The variable E' is used to denote initial energy and E to denote final energy. This convention is used to maintain consistency with the differential scattering cross-section in the neutron transport equation.

The cosine of the scattering angle on the LHS of Equation (55) may be condensed into a single parameter, $\mu_0$. The formulation for the scattering energy transfer in the lab system may then given by Equation (56).

$$\mu_0(E, E') = \alpha_1 \sqrt{\frac{E}{E'}} - \alpha_2 \sqrt{\frac{E'}{E}} \quad (56)$$

The parameters $a_1$ and $a_2$ may be defined in Equation (57) and Equation (58), respectively.

$$\alpha_1 = \frac{A+1}{2} - \frac{QA}{2E} \quad (57)$$

$$\alpha_2 = \frac{A-1}{2} \quad (58)$$

The above scattering angle formulation may be used in many nuclear simulation programs such as CENTRM.

Figure 6:
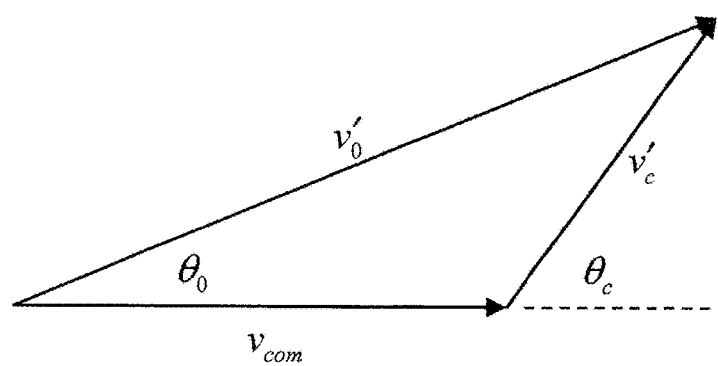
FIG. 6 is a diagram showing velocity vectors (resultant velocities and COM velocity)

Also, it may be useful to describe the energy transfer in terms of the COM scattering angle. FIG. 6 is a diagram showing velocity vectors (resultant velocities and a COM velocity). The energy-angle relationship in the COM system may be developed using the velocity vectors (resultant velocities and COM velocity) as shown in FIG. 6 and the Law of Cosines. The result of this procedure is the following energy-angle relationship in the COM system.

$$\mu_c(E, E') = \frac{1}{2}\left[\frac{\frac{E}{E'}(A+1)^2 - 1}{\gamma(E')} - \gamma(E')\right] \quad (59)$$

$$\gamma(E') = A\sqrt{1 + \frac{A+1}{A}\frac{Q}{E'}} \quad (60)$$

Again the convention is used where E' is the initial neutron energy before scatter and E is the final energy after scatter.

C. Scattering Kernel

The neutron scattering kernel describes the probability of neutron energy transfer between two energies. The scattering kernel appears in the neutron transport equation as a double-differential cross-section, $\mu_s(E' \to E, \mu_0)dE\,d\mu_0$. This parameter gives the probability that a neutron will scatter from an energy, E', to a new energy interval dE about E with a change of direction within $d\mu_0$ about $\mu_0$.

The value of $d\mu_0$ varies between $-1$ (full backscatter) to $+1$ (glancing collision). This allows the angular dependence of the scattering kernel to be represented by an infinite series of Legendre Polynomials. Legendre Polynomials exist in the domain of [$-1$, $+1$] and may be expanded to the necessary order to describe the angular dependence of the scattering kernel. Application of these Legendre Polynomials to the double-differential scattering cross-section yields the relationship in Equation (61), where $P_l(\mu_0)$ is a Legendre Polynomial of order l' and $\sigma_{sl'}(E' \to E)$ is the associated polynomial coefficient.

$$\sigma_s(E' \to E, \mu_0) = \sum_{l'=0}^{\infty} \frac{(2l'+1)}{2} \sigma_{sl'}(E' \to E) P_{l'}(\mu_0) \quad (61)$$

Both sides of Equation (61) may be multiplied by another Legendre Polynomial of order l and integrated over the entire range of $\mu_0$, resulting in Equation (62).

$$\int_{-1}^{+1} d\mu_0 \sigma_s(E' \to E, \mu_0) P_l(\mu_0) = \quad (62)$$

$$\int_{-1}^{+1} d\mu_0 \sum_{l'=0}^{\infty} \frac{(2l+1)}{2} \sigma_{sl'}(E' \to E) P_{l'}(\mu_0) P_l(\mu_0)$$

Legendre Polynomials are orthogonal functions. As such, Legendre Polynomials with the normalization of $(2m+1)/2$ have the property of Equation (63), where $\delta_{mn}$ is the Kronecker delta function given in Equation (64).

$$\int_{-1}^{+1} dx P_m(x) P_n(x) = \frac{2\delta_{mn}}{2m+1} \quad (63)$$

$$\delta_{mn} = \begin{cases} 1 & \text{if } m = n \\ 0 & \text{if } m \neq n \end{cases} \quad (64)$$

Using the orthogonality property of Legendre Polynomials, Equation (62) reduces to Equation (65).

$$\int_{-1}^{+1} d\mu_0 \sigma_s(E' \to E, \mu_0) P_l(\mu_0) = \sigma_{sl}(E' \to E) \quad (65)$$

To determine the RHS of Equation (65), another form of the scattering kernel may be necessary. The scattering kernel may be separated into components and/or expressions may be developed for each.

$$\sigma_s(E' \to E, \mu_0)dE\,d\mu_0 = \sigma_s(E')p_0(E', \mu_0)d\mu_0 g(\mu_0, E' \to E)dE \quad (66)$$

The variable $\sigma_s(E')$ is the total probability of scattering at E', while $p_0(E', \mu_0)$ is the probability that, if scattered at E', the neutron will scatter within the angle $d\mu_0$ about $\mu_0$. Finally, $g(\mu_0, E' \to E)$ is the probability that, once a neutron scatters through $\mu_0$, the resulting energy will be within dE about E.

In both elastic and discrete inelastic scattering, the energy transfer is directly related to angle. These relationships are given via Equation (56) in the lab system or Equation (59) in the COM system. This leads to the expression for $g(\mu_0, E' \to E)$ given in Equation (67) where the RHS is the Dirac delta function defined in Equation (68).

$$g(\mu_0, E' \to E)dE = \delta[\mu_0 - \mu_0(E, E')]d\mu_0 \quad (67)$$

$$\int_{-\infty}^{\infty} dx f(x)\delta(x - x_0) = f(x_0) \quad (68)$$

The usage of the Dirac delta function restricts the energy probability density function to the specific energy resulting from the scatter. An alternate form of the scattering kernel is now given in Equation (69).

$$\sigma_s(E' \rightarrow E, \mu_0) = \sigma_s(E')p_0(E', \mu_0)\delta[\mu_0 - \mu_0(E, E')]\frac{d\mu_0}{dE} \quad (69)$$

The form of the scattering kernel in Equation (69) may be inserted into Equation (65), yielding Equation (70).

$$\sigma_{sl}(E' \rightarrow E) = \int_{-1}^{+1} d\mu_0 \sigma_s(E')p_0(E', \mu_0)\delta[\mu_0 - \mu_0(E, E')]\frac{d\mu_0}{dE} P_l(\mu_0) \quad (70)$$

The Dirac delta function property in Equation (68) may be used to reduce Equation (70) to Equation (71).

$$\sigma_{sl}(E' \rightarrow E) = \sigma_s(E')p_0[E', \mu_0(E, E')]\frac{d\mu_0(E, E')}{dE} P_l[\mu_0(E, E')] \quad (71)$$

The result in Equation (71) may be substituted back into Equation (61) to yield an expression for the coefficient l of the scattering kernel, where $\mu_0$ is the specific scattering angle in the given coordinate system that results from an energy transfer of E' to E.

$$\sigma_s(E' \rightarrow E, \mu_0) = \sum_{l'=0}^{\infty} \frac{2l'+1}{2}\sigma_s(E')p_0(E', \mu_0)\frac{d\mu_0}{dE} P_l(\mu_0)P_{l'}(\mu_0) \quad (72)$$

The primary focus of a slowing-down calculation may be the scalar neutron flux energy dependence; therefore, the angular dependence of Equation (72) may be removed via integration. Equation (73) may be obtained by integrating Equation (72) over angle and/or using the property of Legendre Polynomials given in Equation (63).

$$\sigma_s(E' \rightarrow E) = \sigma_s(E')p_0(E', \mu_0)\frac{d\mu_0}{dE} \quad (73)$$

The Jacobian in Equation (73) accounts for the change in variable from a per unit energy to a per unit cosine basis. The Jacobian may be determined by taking the derivative of Equation (56). This derivative is given for the laboratory system in Equation (74).

$$\frac{d\mu_0}{dE} = \frac{1}{4}(EE')^{-1/2}\left[A + 1 + \frac{QA + (A-1)E'}{E}\right] \quad (74)$$

If a probability density function is directly supplied via experiment or model, all terms of Equation (73) may be known and/or the scattering kernel may be fully described. In some ENDF evaluations, the function $p_0(E', \mu_0)$ is given as a tabulated function of probability versus cosine at a number of energies for a given isotope and/or reaction.

Often the ENDF representation of the probability density function is an expansion of Legendre Polynomials. The probability density function in this form would be given by a Legendre Polynomial expansion with N+1 terms as in Equation (75) where the ENDF libraries supply the Legendre coefficients, $a_n(E')$.

$$\sigma_s(E' \rightarrow E) = \sigma_s(E')\left[\sum_{n=0}^{N} \frac{2n+1}{2}a_n(E')P_n(\mu_0)\right]\frac{d\mu_0}{dE} \quad (75)$$

Elastic scattering is often isotropic, or nearly isotropic, in the COM frame of reference. The closer the scattering is to isotropic, the fewer terms may be required in the expansion of Equation (75). For the latest ENDF/B library release, ENDF/B-VII.0, all elastic scattering may be represented entirely in the COM system.

A transition from the lab representation of Equation (73) and Equation (75) to the COM system may be performed by a change of variables for the probability density function of Equation (73).

$$p_c(E',\mu_c)d\mu_c = p_0(E',\mu_0)d\mu_0 \quad (76)$$

Substitution of Equation (76) into Equation (73) may yield the following result.

$$\sigma_s(E' \rightarrow E) = \sigma_s(E')p_c(E', \mu_c)\frac{d\mu_c}{dE} \quad (77)$$

The form of Equation (77) is the same as the lab representation of Equation (73). The probability density function is altered to a COM system representation and the Jacobian is that of COM angle to energy. This Jacobian may be determined by taking the derivative of Equation (59), yielding Equation (78).

$$\frac{d\mu_c}{dE} = \frac{1}{2}\left[\frac{(A+1)^2}{E'\gamma(E')}\right] \quad (78)$$

As with the lab system, it is common to represent the probability density function of Equation (77) in the ENDF libraries as a finite series of Legendre Polynomials as demonstrated in Equation (79), where the coefficients, $a_n(E')$, are provided in the data libraries in the COM system.

$$\sigma_s(E' \rightarrow E) = \sigma_s(E')\left[\sum_{n=0}^{N} \frac{2n+1}{2}a_n(E')P(\mu_c)\right]\frac{d\mu_c}{dE} \quad (79)$$

Equation (73), Equation (75), Equation (77), and Equation (79) represent all the possible angular descriptions of scattering energy transfer in the lab and COM frames of reference present in File 4 of the current ENDF-6 standard. These equations may be used to describe the slowing-down of neutrons within a reactor system via elastic and inelastic scatter.

D. Uncorrelated Energy-Angle Distributions

In elastic scatter, the neutron scattering angle may have a unique value for a given incoming and outgoing energy. The same is true with discrete inelastic scatter (i.e., a scatter that leaves the nucleus at a specific excitation energy). For other reactions, this correspondence does not exist and a full description of both the angular distribution, $p_0(E',\mu_0)d\mu_0$, and resulting energy distribution, $g(\mu_0, E' \rightarrow E)dE$, may be required.

Two important examples of uncorrelated reactions are continuum inelastic and (n,xn) reactions. Continuum inelastic scatter may occur at energies where the discrete nuclear excitation levels of an isotope reach a continuum and are no longer resolvable. A (n,xn) reaction may occur when a neutron strikes a nucleus, freeing x−1 additional bound neutrons, that may result in x neutrons from the scatter event.

The ENDF-6 standard may combine the energy and angle dependence into one distribution as described in Equation (80), where m(E) is the multiplicity of the reaction at E. The multiplicity is the number of neutrons that result from the reaction (e.g., 2 for (n,2n), ν for fission).

$$\sigma(\mu,E,E')=\sigma(E')m(E')f(\mu,E,E') \qquad (80)$$

This differential cross-section may be given in units of barns per unit cosine.

The ENDF-6 standard includes a number of ways for describing the energy-angle distribution following a reaction for different types of incident and resultant particles. These data are included in File 6 of an ENDF library for a given isotope. Below are two of the most common representations for neutron-nucleus reactions.

E. Legendre Coefficients Representation

A common representation for energy-angle distributions of neutrons in the ENDF-6 standard is via Legendre Polynomials.

$$f(\mu, E, E') = \sum_{l=0}^{NA} \frac{2l+1}{2} f_l(E, E')P_l(\mu) \qquad (81)$$

In this representation the angular component of the distribution is represented by an expansion of Legendre Polynomials, where the $f_l(E,E')$ terms are the Legendre coefficients given for NA number of terms in the ENDF data files. The value of NA is dependent on the angular distribution at a given energy. If the angular distribution is complicated, more polynomial terms are necessary to describe the resulting angular distribution.

If only the total neutron energy transfer is desired, both sides of Equation (81) may be multiplied by another Legendre Polynomial and integrated over angle as shown in Equation (82).

$$f_l(E, E') = \int_{-1}^{+1} d\mu f_l(\mu, E, E')P_l(\mu) \qquad (82)$$

The zero-order Legendre Polynomial coefficient, $f_0(E, E')$, is the total probability of scattering from E' to E. The $f_0(E, E')$ values would be equivalent to the energy distribution data given in File 5 of the ENDF data.

When determining only the probability of energy transfer from one energy to another, a full description of the resulting angular distribution is not necessary. Therefore the value of $f_0(E,E')$ is sufficient for determining the probability of transfer from E' to E.

F. Kalbach-Mann Systematics Representation

Another means of describing an energy-angle distribution is through Kalbach-Mann Systematics. Kalbach and Mann proposed a generalized means of representing the energy-angle distribution of an incident particle on a nucleus with the function shown in Equation (83), where the parameters $f_0(E,E')$, a(E, E'), and/or r(E, E') may be stored in the ENDF data.

$$f(\mu,E,E')=a(E,E')f_0(E,E')/2 \sinh(a(E,E'))[\cosh(a(E,E')\mu)+r(E,E')\sinh(a(E,E')\mu)] \qquad (83)$$

As with the Legendre representation, the energy transfer probability may be desired, rather than the angular distribution. If Equation (83) is integrated over all possible values of μ, Equation (83) may reduce to $f_0(E, E')$. This parameter may be obtained from the ENDF tapes.

VI. Quadrature Integration of the Transfer Source

A. Overview

One of the difficulties of representing the flux with a fine group structure is characterizing the group to group transfer cross-sections. To obtain the flux in a specific group, the contribution from all other possible groups must be calculated. This requirement makes a fine group approach increasingly computationally expensive as the number of groups and reaction types is increased. Methods such as sub-moment expansion in CENTRM or the RABANL module in $MC^2$ have been developed to mitigate the issue of transfer source calculation. Discussed below is an alternate form of accounting for the transfer source via numerical approximation.

The transfer source term may be represented, for example, by the integral of Equation (73) or Equation (77) over all possible neutron energies. Because the transfer source may be given as a definite integral of continuous functions, numerical integration may be used to obtain the value of the scattering source at a given energy. One possible technique for numerically integrating a function is the Gauss Quadrature (GQ) method. The GQ method is briefly discussed below, along with refinements from a general form of the GQ method to application to the neutron transfer source given in the neutron transport equation.

Given a general function, f (x), to be integrated over an independent variable x, the integrand may be expressed by Equation (84).

$$I = \int_a^b dx f(x) \qquad (84)$$

The GQ method seeks to numerically obtain an accurate estimate of the integral by selecting the optimum points (i.e., nodes) and evaluating the weighted sum of the function values at these points.

The Gauss Quadrature Theorem states that "[the nodes] of the n-point Gaussian quadrature formula are precisely the roots of the orthogonal polynomial for the same interval and weighting function." This condition may be stated in Equation (85). Here, $P_n(x)$ is the function to be integrated represented in polynomial form, $P_m(x)$ is a polynomial that may be orthogonal to the function on the interval [a,b], and w(x) is a weighting function.

$$\int_a^b dx P_n(x)P_m(x)w(x) = \delta_{nm} \qquad (85)$$

If the condition of Equation (85) is met, then Equation (86) is true according to the Gaussian Quadrature Theorem.

$$I = \sum_{i=1}^{n} w_i f(x_i) \tag{86}$$

The values of $x_i$ are the roots of the orthogonal polynomial and the values of $w_i$ are determined by assuming the function may be represented by a polynomial of order $2n-1$ and solving for the undetermined coefficients. As known to a PHOSITA, one example of this procedure for a $2^{nd}$ order GQ estimate using Legendre Polynomials may be found, for example, in *Numerical Methods for Engineers*, by Chapra and Canale, $5^{th}$ Ed., McGraw-Hill (2006), pp. 620-627.

The utility of this numerical approximation is that it allows accurate estimation of complicated functions via a minimum number of function evaluations. Other numerical integration schemes, such as the Trapezoid Rule or Simpson's Rule, may require a greater number of function evaluations to obtain a similar accuracy.

B. Limitations of Gauss Quadrature Integration

One potential drawback of GQ is the irregular spacing of the nodes in the interval of [a,b]. This makes implementation of GQ for evenly spaced tabular data less straightforward. If the data is given in tabular form, interpolation also may need to be performed.

For a GQ estimate using n nodes (i.e., of order n), the GQ method may exactly estimate a function of order $2n-1$. If a function requires a very high order polynomial to be represented accurately, the benefit of the GQ method may be diminished because more function evaluations may be required. In some exceptional cases, the trapezoid rule, with fine enough spacing, may be less expensive than the GQ method for a similar accuracy.

The GQ method also may require integration over a finite interval. The GQ method may not be applied to functions with singularities or integrals with infinite or semi-infinite bounds.

C. Gauss-Legendre Quadrature

The GQ method relies on the appropriate selection of weights and nodes. These values may be tied to the choice of orthogonal polynomial in Equation (85). The use of Legendre Polynomials with $w(x)=1$ is a common polynomial selection. Legendre Polynomials are orthogonal on the interval $[-1,+1]$ and/or follow simple recursion relationships that facilitate implementation in a computer program.

In an order n GLQ approach, the nodes may be determined from the roots of the order n Legendre Polynomial. The corresponding weights may be determined by the properties of Legendre Polynomials at a given order by the method described by Hildebrand. Using this method, the weight for order n and node $x_i$ may be calculated via Equation (87).

$$w_i = 2(1-x_i^2)/(n+1)^2[P_{n+1}(x_i)]^2 \tag{87}$$

The nodes and weights do not change based on the function to be integrated. Therefore, the node-weight pairs for a given GLQ order may be stored in a computer program without need for recalculation during each execution. FIG. 7 is a table showing nodes and weights for GLQ of orders 2 thru 6.

D. Adjustment of Integration Limits

For GLQ integration to be practical, the restriction of integration only over the interval $[-1,+1]$ must be removed by a change in variable such that the new variable is equal to $-1$ at the lower limit of a and $+1$ at the upper limit of b as shown in Equation (88).

$$\int_a^b dx f(x) = \int_{-1}^{+1} dt f(t) \tag{88}$$

The substitution variable and differential is defined in Equation (89) and Equation (90), respectively.

$$t = \frac{b-a}{2}x + \frac{b+a}{2} \tag{89}$$

$$dt = \frac{b-a}{2}dx \tag{90}$$

The GLQ formulation now may be applied to the definite integration of any function that satisfies the aforementioned restrictions by changing the independent variable and adjusting the value of dx.

E. Gauss-Kronrod Error Estimation

Since the GLQ method is accurate to order $2n-1$, any integral estimate of a function of greater than order $2n-1$ will retain some numerical error. One way to estimate this error is to compare a higher-order estimate to current estimate. Necessary adjustments then may be made to step size, number of points, etc., to reduce numerical error to acceptable levels.

Kronrod proposed a method for estimating the error in GLQ, known as GKQ, also known as Gauss-Legendre-Kronrod Quadrature. Kronrod started with an order n Gauss Estimate as given in Equation (91) and inserted n+1 additional nodes to obtain the higher-order Kronrod estimate of Equation (92).

$$G_n = \sum_{i=1}^{n} w_i f(x_i) \tag{91}$$

$$K_{2n+1} = \sum_{i=1}^{n} a_i f(x_i) + \sum_{j=1}^{n+1} b_j f(y_j) \tag{92}$$

Kronrod determined the additional weights, $b_j$, and nodes, $y_j$, which would yield an estimate that is order $3n+1$ accurate by inserting n+1 additional nodes. The low-order, high-order estimate used in a GKQ estimate is known as a Gauss-Kronrod pair. FIG. 8 is a table showing nodes and weights for the ($G_7$, $K_{15}$) Gauss-Kronrod pair.

The GKQ method reuses the nodes from the GLQ estimate. This makes the GKQ more efficient than comparing a high-order and low-order GLQ estimate, where the nodes may not be reused due to the irregular spacing. For a GKQ estimate, a total of 2n+1 function evaluations would yield a 3n+1 order integral estimate and an error estimate. The same number of function evaluations with GLQ integration would yield the more accurate 4n+1 order integral estimate but without any error estimate.

The error estimate from GKQ may be used to create adaptive algorithms, which reduce error below a limiting value. An error estimate is necessary for the numerical algorithm to adapt to the input functions and maintain error below acceptable levels.

VII. Neutron Transfer Source Calculation Using GKQ

A. Overview

The Neutron Slowing-Down Equation in an infinite medium is given in Equation (93).

$$\sigma_t(E)\phi(E) = \int_E^\infty dE' \sigma_s(E' \to E)\phi(E') + S(E) \tag{93}$$

The scattering source term on the RHS of Equation (93) is a candidate for a GKQ integration treatment.

While scattering may be the largest contribution to energy transfer, the scattering source term may be generalized into a transfer kernel for any reaction causing an energy transfer. A general form of Equation (93) may be given in Equation (94) where the transfer source is generalized to any reaction, x, with a multiplicity of m.

$$\sigma_i(E)\phi(E) = \sum_{all\ x} \int_0^\infty dE'\, m(E')\sigma_x(E' \to E)\phi(E') + S(E) \quad (94)$$

All non-flux terms in Equation (93) may be determined from ENDF data based on given data and scattering kinematics. These data may be in the lab or COM frame of reference and given as Legendre expansion coefficients, as tabulated probability density functions, or in Kalbach-Mann Systematics. The transfer kernel in this general form may include many types of energy transfer reactions, including elastic scattering, inelastic scattering, or (n,xn).

At the highest possible energy in the system, there is no transfer contribution from higher energies. Therefore the initial value of the flux may be determined from Equation (95).

$$\phi(E_{max}) = \frac{S(E_{max})}{\sigma_i(E_{max})} \quad (95)$$

From this point the calculation may sweep down to lower energies using the higher energy flux values in the transfer source.

An exception to this general slowing-down treatment is fission. Fission reactions occurring at low energies yield neutrons at higher energies. Implementation of a source and eigenvalue iteration procedure may be necessary to describe the system. Therefore, the source term in Equation (94) is left as a general source term that may be either a fixed source, fission source, or a combination of both.

B. Bounds of Integration for Neutron Transfer

The appropriate bounds of integration must be determined to calculate an accurate transfer source for a given reaction. These bounds may be input based on the kinematics of the reaction or the input ENDF data. For all slowing-down reactions, the bounds of integration will be from the present energy, at a minimum, to the highest possible energy based on the reaction.

For the case of elastic scattering, the minimum energy occurs during a glancing collision with no energy transfer; therefore, the minimum energy would be the present neutron energy. In a glancing collision, the scattering cosine in both the laboratory and COM systems is +1. For the opposite case of maximum energy transfer (i.e., full backscatter), the scattering cosine is −1. For the case of elastic (i.e., Q=0) scattering, inserting a scattering cosine of −1 into Equation (56) or Equation (59) yields Equation (96) and Equation (97).

$$E_{max} = \frac{E}{\alpha} \quad (96)$$

$$\alpha = \left(\frac{A-1}{A+1}\right)^2 \quad (97)$$

The case of inelastic scattering may follow the same procedure. Again the minimum and maximum energies may be obtained by substitution of −1 and +1 into the kinematic equations. In this case the result is Equation (98) and Equation (99).

$$E_{max} = \frac{E}{(A-1)^2}\left[A^2 + 1 + 2A\sqrt{1 - \frac{Q(A-1)}{AE}}\right] - \frac{QA}{(A-1)} \quad (98)$$

$$E_{min} = \frac{E}{(A-1)^2}\left[A^2 + 1 - 2A\sqrt{1 - \frac{Q(A-1)}{AE}}\right] - \frac{QA}{(A-1)} \quad (99)$$

For reactions where the kinematics are not easily described (e.g., continuum inelastic and (n,xn)), the available ENDF data may be used to determine the bounds of integration. In these cases, the ENDF evaluations may include a secondary energy distribution that may either be tabulated, given as parameters of a Legendre expansion, or as Kalbach-Mann parameters. The minimum and maximum energies may then be determined by the interpolated secondary energy distribution at a given incident neutron energy.

C. Numerical Form of the Neutron Slowing-Down Equation

With the bounds of integration determined and using the GKQ method for treating the transfer source, the Neutron Slowing-Down Equation at a given energy E is expressed in Equation (100).

$$\phi(E) = \quad (100)$$

$$\frac{1}{\sigma_i(E)}\left[\sum_{all\ x}\left(\frac{E_{max,x} - E_{min,x}}{2}\sum_{i=1}^{n} a_i f_x(E'_i, E) + \sum_{j=1}^{n+1} b_j f_x(E'_j, E)\right) + S(E)\right]$$

The i nodes and $a_i$ weights correspond to the Gauss-Legendre estimate and the j nodes and $b_j$ weights to the higher-order Kronrod estimate. The function evaluated by GKQ at i or j for reaction x is given in Equation (101) with $g_x(E'_i, E)$ being the transfer function from $E'_i$ to E determined either from scattering kinematics or directly from the given ENDF data.

$$f_x(E'_i, E) = m_x(E'_i)\sigma_x(E'_i)g_x(E'_i, E)\phi(E'_i) \quad (101)$$

The $E'_i$ nodes are determined via Equation (102), where $x_i$ are the corresponding nodes in the range of [−1,+1] given by the selected Gauss-Kronrod pair.

$$E'_i = \frac{E_{max} - E_{min}}{2}x_i + \frac{E_{max} + E_{min}}{2} \quad (102)$$

With the exception of the flux, the values in Equation (100) and Equation (101) are all known. No numerical approximations other than those discussed in the GKQ approach have been used to this point. While a number of important assumptions were made to arrive at this slowing-down equation, this form is intended to describe the energy behavior in a reactor system for the purpose of generating group constants, not to provide a full description of neutron behavior in energy, space, and/or time.

The GKQ form of the slowing-down equation may be solved on a given PW mesh of energy points such that the resulting flux points are linearly interpolatable to within a specified numerical error. Assuming no error is introduced by the reduction of the neutron transport equation to the slowing-down form, the following are four major sources of error in the resulting PW flux.

First, error in the input nuclear data parameters. While potentially substantial, this error may not be controlled by solution of the slowing-down equation. Error also may arise from interpolation of parameters such as cross-sections, transfer probabilities, and/or multiplicity.

Second, error from the GKQ integration technique. This error may be controllable via adjustments in the bounds of integration and/or order of the GKQ estimate.

Third, error from the linearization of the PW flux. This error may be controlled by applying the appropriate energy mesh. This mesh is often best informed by the underlying nuclear data, which are also linearly interpolatable to within a given error.

Fourth, error resulting from numerical limitations of a computer. This could include floating-point precision error or truncation.

These methods may have particular applicability to fast spectrum systems where the flux at each energy is a function of only higher energy fluxes. Implementation of this PW spectrum generation methodology into a computer program is discussed below. Example algorithms used to control error in the transfer source, determine the energy mesh, process the ENDF data, etc., will be described for the implementation of these methods.

VIII. Implementation of Adaptive Quadrature Methods

A. Overview

These methods have been implemented in a computer program called PWFSG. This program demonstrates an adaptive GKQ integration transfer kernel treatment.

Figure 9:
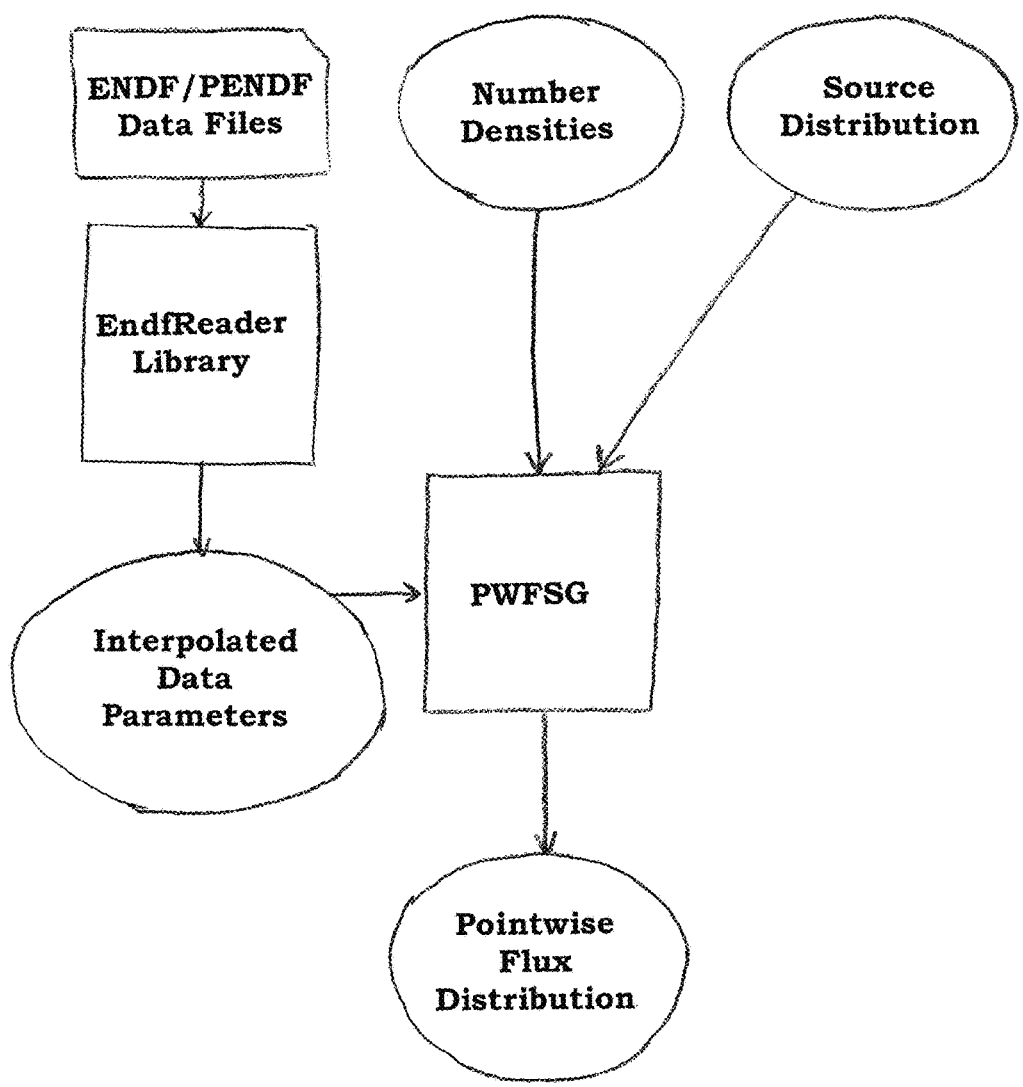
FIG. 9 is a flowchart showing overall program and/or data flow for a Pointwise Fast Spectrum Generator (PWFSG) program according to an example embodiment.

PWFSG may solve the Neutron Slowing-Down Equation in an infinite medium. The flux obtained by PWFSG may be PW and/or linearly interpolatable. FIG. 9 is a flowchart showing overall program and/or data flow for a PWFSG program according to an example embodiment (e.g., depicting inputs and outputs of PWFSG).

B. ENDF Input Data

Nuclear data, including cross-sections and energy-angular distributions, are collected and distributed by a number of institutions as Evaluated Nuclear Data Files (ENDF). PWFSG draws fundamental nuclear data from these ENDF "tapes" which are ASCII text files that follow the ENDF-6 format.

The ENDF-6 format specifies several types of 80 character lines of text, known as "cards," that are structured to facilitate reading by FORTRAN programs. The last 14 characters of each card are reserved for a four character material identifier (MAT), a two character file identifier (MF), a three character section identifier (MT), and a five character line number. These control characters are used by processing programs to determine their location in an ENDF tape. The first 66 non-control characters are the portion of the record that contains the nuclear data.

Most card types contain 6 entries of 11 character width followed by the control characters. The exception to this is the TEXT record, which contains one entry of 66 character width followed by the control characters. The mix of integer and floating point data on each card is dependent on the type of record. Control (CONT) records contain two floating point entries followed by four integer entries. The two floating point entries may contain data; the remaining integer data may be control flags or a count of the number of entries that follow.

Tabulated data may be represented in the ENDF-6 standard by LIST, TAB1, and/or TAB2 record types. These may be a series of multiple records that contain CONT records followed by floating point data. The CONT records may provide control data about the following tabulated data. The tabulated data may then be given as a simple list of values (LIST records), tabulated (x,y) data (TAB1 records), or a collection of LIST or TAB1 records at different values of an independent variable (TAB2 records).

C. Preprocessing with NJOY

In at least some instances, ENDF-6 formatted data may not be used directly in nuclear transport programs because the cross-sections are given at one temperature (typically 0 K) and the resolved resonance energy region cross-sections may be given as resonance parameters. Therefore, the computer program NJOY may be used to perform preprocessing of the ENDF data.

The first use of NJOY in PWFSG is processing the resonance data provided in the ENDF tapes. Isotopes that contain a large number of resonances (e.g., U-238) may not contain tabulated data for the entire resonance range. Instead the resonance data may be stored as resonance parameters. These parameters may be in many forms, such as Single or Multi-level Breit-Wigner, Reich-Moore, Alder-Alder, or Limited R-matrix. The purpose of resonance parameters is to keep the ENDF files more compact. A resonance parameter representation limits the required energy resolution to represent rapidly varying cross-sections around a resonance. Resonance parameters are widely used in the more recent ENDF evaluations, such as ENDF/B-VII.0, for medium and heavy mass isotopes that contain many resonances.

If a nuclear transport program, such as PWFSG, requires a PW representation of the cross-section, the resonance parameter data may be converted into tabulated, interpolatable cross-sections. The resonances also may be broadened to the temperature of the material to account for Doppler broadening.

PWFSG relies on NJOY to convert resonance parameters into Doppler-broadened, tabulated cross-sections. The NJOY modules RECONR and BROADR are used to reconstruct and broaden the resonances, respectively. The output of these modules is a PENDF (pointwise ENDF) tape that follows the ENDF-6 standard and contains linearly-interpolatable, cross-section data generated by reconstructing and broadening the resonances.

The temperatures of the isotopes input into PWFSG are not required to be consistent. NJOY may process one material to a specific temperature and another material to a different temperature. The infinite medium calculation then uses the cross-sections and number densities provided by NJOY to determine the reaction probabilities without the need to account for temperature effects. Therefore, a homogenous mixture of hot fuel may be mixed with cold coolant and simulated in PWFSG by providing the appropriate PENDF tapes.

D. ENDF Data Processing

A dynamic link library, EndfReader, was developed to facilitate the reading and interpolation of ENDF and PENDF data for PWFSG. The EndfReader library is based on accessing ENDF data using the standards provided in the ENDF-6 format specification.

The EndfReader library may read ENDF formatted records such as TEXT, CONT, LIST, TAB1, and/or TAB2. It may scan ENDF tapes and/or may break them into materials, files, and/or section objects based on the MAT, MF, and/or MT tags, respectively. These components may then be accessed by a calling program such as PWFSG. The actual ENDF data may not be processed at the time of the scan. Instead, they may be sorted into a data structure for later access to eliminate computational cost in processing large ENDF sections not used by the calling program.

Due to the dynamic storage of ENDF records, the calling program may be used to seek and rewind the ENDF tapes rather than EndfReader. A calling program may access a given section from a combination of MAT, MF, and MT number. It may then process the section's HEAD record and possibly the following CONT records to determine the number and type of records to follow. The calling program, based on the type of ENDF section being read, may make the appropriate calls to EndfReader instructing the types and number of records to process next. These method calls may cause EndfReader to seek forward in the ACSII formatted text contained in the ENDF section and create library objects representing records of type CONT, TAB1, etc. Therefore, the EndfReader class library may provide a layer of abstraction that removes the need for the calling program to process CONT, TAB1, etc. records, while the calling program may direct the reading of the records and interprets those records into physical quantities.

The library objects made available by EndfReader may offer the ability to access ENDF data directly. There also may be interpolation functionality for TAB and LIST records. TAB records, which contain tabulated two-dimensional (TAB1) or three-dimensional (TAB2) data, may be interpolated by their associated interpolation law. LIST records, which contain lists of data at given independent variables (e.g., a list of Legendre coefficients at specific energies), may be interpolated to yield a new LIST record at an interpolated independent variable.

EndfReader may support one or more of five one-dimensional interpolation laws used by ENDF: (1) constant (histogram) interpolation; (2) linear-linear interpolation; (3) linear-log interpolation; (4) log-linear interpolation; and/or (5) log-log interpolation.

EndfReader may interpolate dependent variables (e.g., cross-section) using the appropriate interpolation law at a given independent variable (e.g., energy). These dependent variables may be a single value (e.g., cross-section at an energy) or a set of values (e.g., Legendre Coefficients at an energy). This functionality may allow EndfReader to present continuous data to the calling program.

A PWFSG calculation may spend a significant portion of its processing time on the interpolation of cross-sections, transfer probabilities, etc. To improve the efficiency of this interpolation, a binary search algorithm may be implemented in EndfReader.

A binary search algorithm may operate on sorted lists of data by comparing the middle of the list to the value sought. If the value sought is greater than the middle value of the list, then the lower half of the list may be ignored and/or the middle may become the new lower bound. If the value sought is less than the middle value of the list, then the upper half of the list may be ignored and/or the middle may become the new upper bound. This process may be performed recursively until the value sought is found. The binary search algorithm may converge logarithmically on the desired value leading to significant computational benefits when working with large sets of data.

Modifications may be made to the EndfReader binary search algorithm. Continuous values sought by the calling PWFSG program may not be the exact values tabulated in the ENDF data. Therefore, the EndfReader may seek the interval in which the value lies rather than the exact value itself. Once the algorithm has found the desired interval, interpolation may be performed on the ENDF data using the normal interpolation procedure.

E. Inputs

To perform the infinite medium slowing-down calculation, PWFSG may require continuous nuclear data (e.g., cross-sections, transfer probabilities, etc.), the relative number densities of the isotopes in the system, and/or the source distribution. Since the solution may be for an infinite medium, no geometrical information may be required. FIG. 9 depicts inputs of PWFSG. Interpolated data parameters may include, for example, cross-sections, transfer probabilities, etc.

The continuous nuclear data for PWFSG are provided through the EndfReader library. The source distribution and number densities must be specified in user input. When resonance parameters are used or the cross-sections require broadening to a specific temperature, EndfReader may require a PENDF tape processed by NJOY in addition to the original ENDF tape.

F. Solution Algorithm

Figure 10:
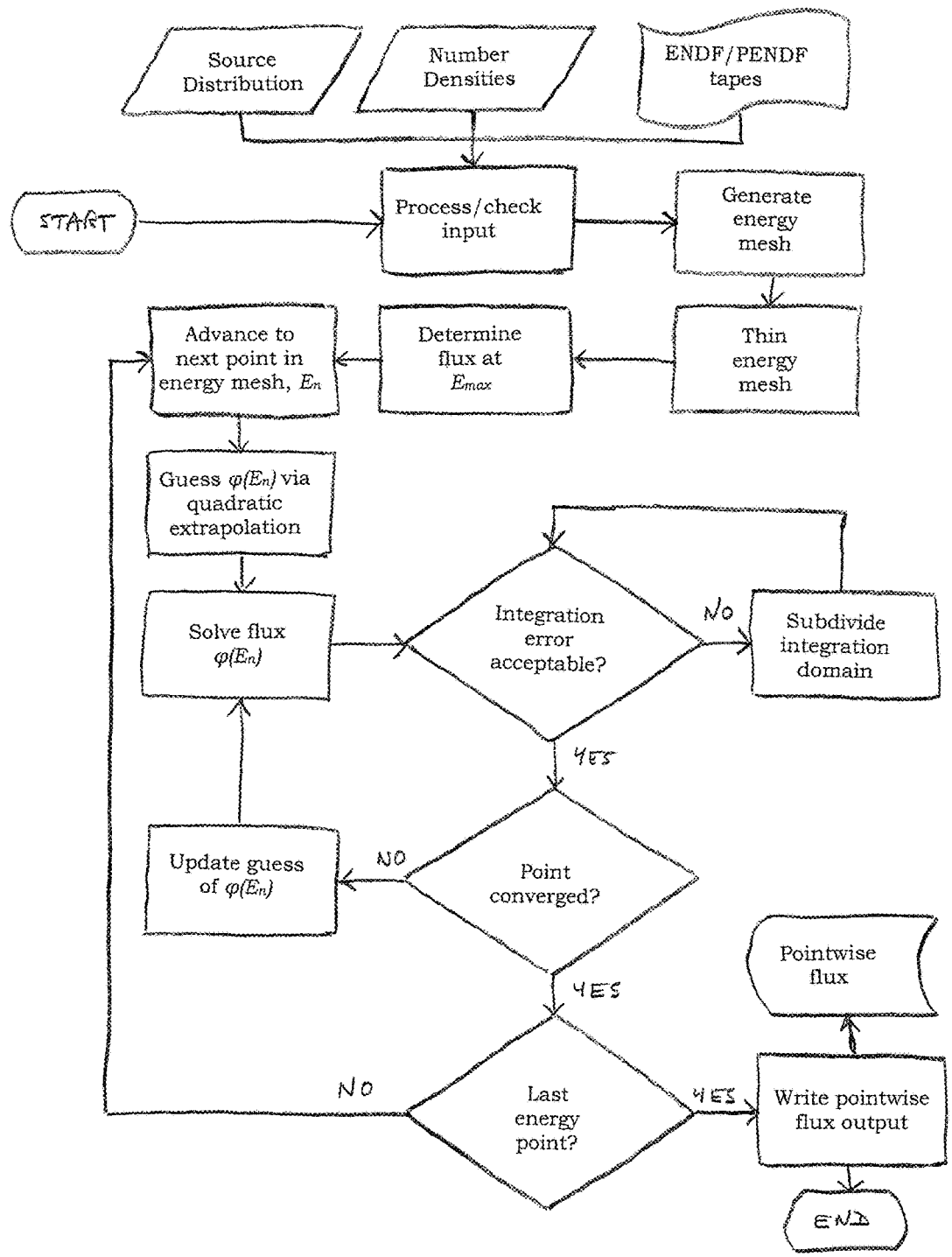
FIG. 10 is a flowchart showing a PWFSG solution algorithm according to the example embodiment.

FIG. 10 is a flowchart showing a PWFSG solution algorithm according to the example embodiment. PWFSG may begin with ENDF data, PENDF data, and/or a given source distribution. The PWFSG solution procedure may begin at the highest source energy and/or may solve for the flux directly using, for example, Equation (103).

$$\phi(E_{max}) = S(E_{max})/\sigma_t(E_{max}) \tag{103}$$

The flux may be solved directly at $E_{max}$ because no other flux values are needed (i.e., the transfer kernel is zero).

PWFSG may assume that the source is not coupled to the flux, as in an eigenvalue calculation. PWFSG may only be able to handle fixed source calculations, although the input source may be a fission spectrum. Similar considerations may be true for thermal scattering treatment.

Once the first flux point is determined, the flux solution algorithm progresses to lower energies. Each successive flux point is determined by the numerical form of the slowing-down equation with GKQ integration, as discussed above. The form of the slowing-down equation used in PWFSG may be shown in Equation (104), Equation (105), and/or Equation (106), where the subscript k refers to isotope, subscript x to reaction, and subscript n to energy point.

$$\phi(E_n) = \sum_{all\ k} \frac{1}{\sigma_{t,k}(E_n)} \left[ \sum_{all\ x} \left( \frac{\Delta E_{x,k}}{2} \sum_{i=1}^{n} a_i f_{x,k}(E'_i, E_n) + \sum_{j=1}^{n+1} b_j f_{x,k}(E'_j, E_n) \right) + S(E_n) \right] \tag{104}$$

$$f_{x,k}(E'_i, E_n) = m_{x,k}(E'_i)\sigma_{x,k}(E'_i)g_{x,k}(E'_i, E_n)\phi(E'_i) \tag{105}$$

$$\Delta E_{x,k} = E_{max,x,k} - E_{min,x,k} \tag{106}$$

The total cross-section at $E_n$ may be interpolated via EndfReader. To calculate the transfer source, EndfReader may interpolate the transfer cross-section, multiplicity, and/or transfer probability for each reaction included in the ENDF evaluation to the appropriate node given by the Gauss-Kronrod pair. PWFSG may use the nodes of the ($G_7$, $K_{15}$) pair given in FIG. 8 to determine the energies, $E'_i$ or $E'_j$, for these evaluations. The flux term given in Equation (105) may be determined by interpolation of the previously solved flux points.

The GKQ method may be used in Equation (104) to calculate the transfer source. The function evaluations of Equation (105) may constitute the node values, with $a_i$ and $b_j$ being the weighting coefficients.

For each reaction, the GKQ method may be used to calculate the neutron transfer source to $E_n$. The GKQ method may provide an error estimate for the integration of the transfer source. If the error is above a set tolerance, the integration range for the GKQ treatment is divided (e.g., in half, although as known to a PHOSITA, many other approaches are possible) and treated as two separate regions. The intervals may be continually subdivided until the integration error is below the given tolerance.

Figure 11:
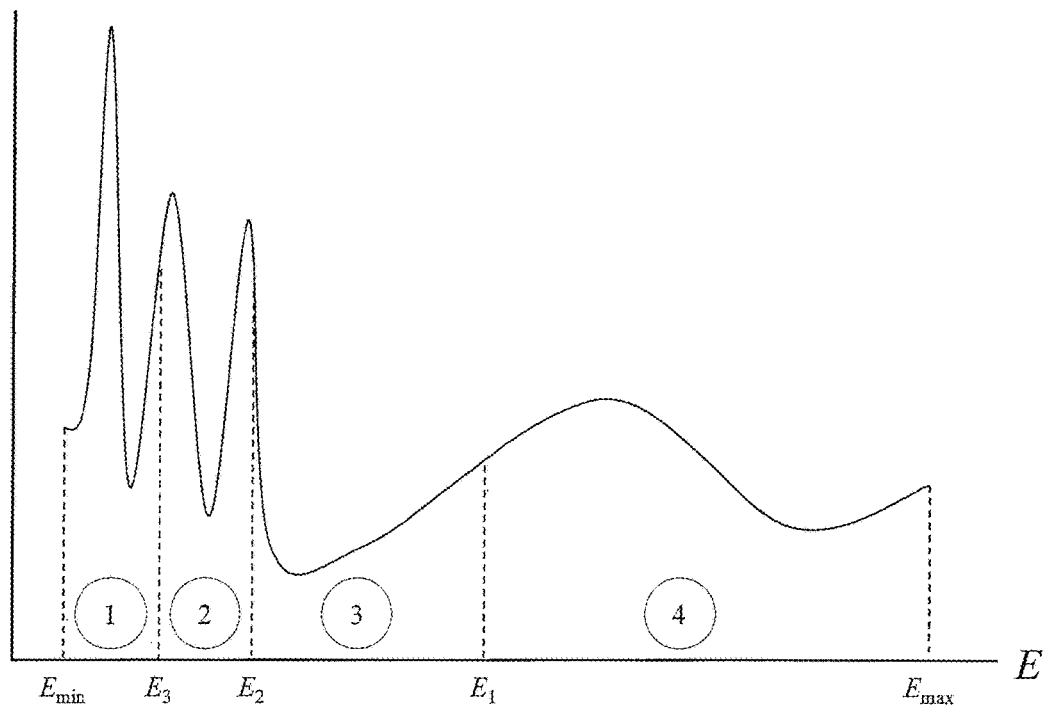
FIG. 11 is a graph showing how a GKQ algorithm may subdivide integration bounds until error is acceptable according to the example embodiment.

FIG. 11 is a graph showing how a GKQ algorithm may subdivide integration bounds until error is acceptable according to the example embodiment. For example, the GKQ algorithm may first attempt integration between $E_{min}$ and $E_{max}$. If that error is unacceptable, the GKQ algorithm may attempt integration from $E_{min}$ to $E_1$ and $E_1$ to $E_{max}$, where $E_1$ may be the halfway point between $E_{min}$ and $E_{max}$. The error in integration from $E_1$ to $E_{max}$ (region 4) may be acceptable and the subdividing and integration in that region may cease. If the error in integration from $E_{min}$ to $E_1$ is not acceptable, the subdividing and integration may continue (e.g., $E_{min}$ to $E_2$ and $E_2$ to $E_1$; then $E_{min}$ to $E_3$ and $E_3$ to $E_2$, yielding regions 1, 2, and 3) until the error in integration in all regions is acceptable.

The energy mesh used for PWFSG is based on the total cross-section of the system. First, a union of all the total cross-section evaluation energies for every isotope in the system is generated. Following the creation of a union mesh, the total cross-section at each point in the union mesh is calculated by summing the macroscopic cross-sections.

After the creation of the union mesh, the mesh may be thinned by removing any unnecessary points. During the mesh thinning process, an energy point may be removed if the total cross-section value at that point may be calculated via linear interpolation within a given error. This thinning may reduce the number of transport calculations significantly. For example, the energy mesh of U-238 may contain 129,402 points when processed with the RECONR and BROADR modules of NJOY to an error tolerance of 0.1%. The thinning process of PWFSG using an error tolerance of 0.1% may yield an energy mesh of 43,247 points (67% reduction). If a less stringent tolerance of 1% is used, the number of mesh points may be reduced even further to 21,924 points (83% reduction). The results of the thinning process in CENTRM may yield a similar reduction. The choice of error tolerance may be a balance of accuracy versus computational time. Such a choice may be left to the discretion of the user.

An example of an exception to the thinning may be determined by the criterion in Equation (107) and/or Equation (108).

$$\gamma(\Delta E_{max}) \geq E_{n+1} - E_n \quad (107)$$

$$\Delta E_{max} = E\left(\frac{1}{\alpha_{max}} - 1\right) \quad (108)$$

Equation (108) may give the maximum possible energy change via an elastic scattering event. Elastic scattering reactions may cause less energy change in the incident neutron than inelastic scatter and other reactions. The criterion of Equation (107) states that the difference between the current energy point and the next energy point may be less than some fraction, $\gamma$, of the maximum possible energy loss by elastic scatter. This may ensure that changes in the flux due to energy transfer also may be included and not just those due to the total cross-section.

While PWFSG thins the energy mesh, it may test the criterion of Equation (107). If the test fails, a new energy point may be added at $\gamma(\Delta E_{max})$. For example, for the U-238 energy mesh, a total of 7158 points may be added to the energy mesh. These points may be included in the aforementioned thinning results.

Each isotope in the summation term of Equation (104) contributes separately to the overall transfer source. The summation of the neutron transfer from each individual isotope results in the total transfer to the present energy, $E_n$. Due to the number of interpolations and GKQ evaluations, this transfer probability calculation may be the most computationally intensive portion of the PWFSG calculation.

In PWFSG, the transfer source summation term is broken into different process threads. For multi-core processing each core computes the transfer source for a given isotope. The threads rejoin to sum the total transfer source which is used for the flux calculation.

For cases where there are only a few isotopes, this parallelization does not yield any appreciable speedup. However, for cases with many isotopes, speedups of greater than 30% have been observed.

The GKQ procedure used during the PWFSG solution may require a flux at a point between $E_n$ and $E_{n+1}$. Linear interpolation may be used to obtain the flux for the GKQ procedure. In this case, the flux may not be known at $E_n$, so an interpolation may not be performed between $E_n$ and $E_{n+1}$.

Figure 12:
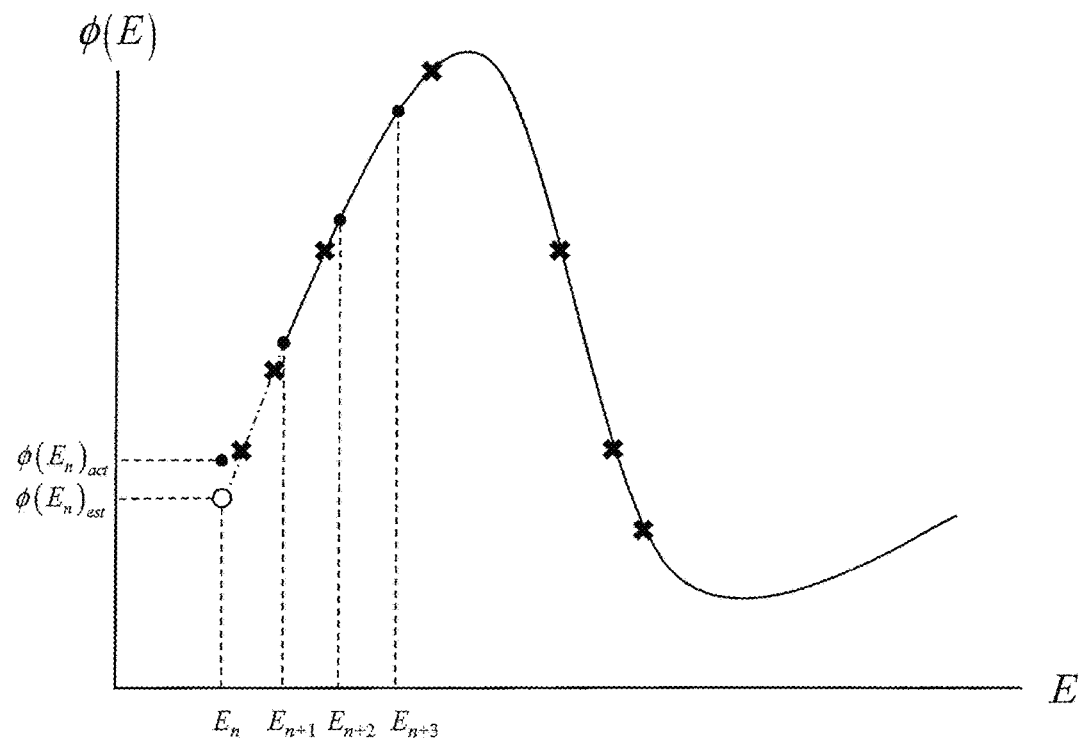
FIG. 12 is a graph showing a flux estimation-iteration procedure used in a PWFSG according to the example embodiment.

FIG. 12 is a graph showing a flux estimation-iteration procedure used in a PWFSG according to the example embodiment. The flux estimation-iteration procedure may be used in PWFSG to predict fluxes between $E_n$ and $E_{n+1}$. Prior to solving the flux at $E_n$, the flux at $E_n$ may be predicted by a quadratic extrapolation. A quadratic fit to the last three solution points ($E_{n+1}$, $E_{n+2}$, and $E_{n+3}$) may be generated and the flux at $E_n$ may be estimated via this quadratic fit (shown in FIG. 12 as $\varphi(E_n)_{est}$). The actual flux at $E_n$ may then be solved using the normal PWFSG procedure given in Equation (104) and Equation (105), with the result compared to the estimate. If the difference is below a given error, the solution procedure continues to the next point. If the error is not acceptable, the estimate is replaced with the value calculated via Equation (104) and Equation (105). This process is repeated until the value of the flux at $E_n$ converges on the actual value (shown in FIG. 12 as $\varphi(E_n)_{act}$).

Only one or two nodes may lie within the interval of $E_n$ to $E_{n+1}$. These points also may be the lowest weight points from the GKQ algorithm (see FIG. 8). Therefore, only one or two iterations may be needed for convergence. When the solution is near the source energy, there may be few higher energy flux values to draw from, so a greater than average number of iterations may be performed.

In addition to the extrapolation/iteration procedure, an additional check is performed to ensure convergence. In the event that the error starts to increase and the solution begins to diverge an extra energy point is inserted halfway between $E_n$ and $E_{n+1}$. The solution procedure restarts with this new energy point as $E_n$.

G. Outputs

The output of PWFSG may be a linearly-interpolatable PW flux. This flux may represent a continuous function in energy and/or may be used directly to produce group constants, according to Equation (109) below.

$$\sigma_{x,g} = \frac{\int_{E_{g-1}}^{E_g} dE \sigma_x(E)\phi(E)}{\int_{E_{g-1}}^{E_g} dE\phi(E)} \quad (109)$$

An accurate flux energy spectrum will result in accurate energy dependence in the resulting group constants. PWFSG may produce this flux spectrum with high accuracy in energy using the GKQ integration procedure for the transfer source. PWFSG may then be coupled with another process to account for spatial effects as needed.

IX. PWFSG Validation

A. Overview

To quantify the utility of the GKQ algorithm, the PWFSG program was executed with three example cases and the results compared to those of other solution techniques. PWFSG results were compared to the high-fidelity Monte Carlo program, MCNP 5.1.51, and another deterministic spectrum generation program, Continuous Energy Transport Module (CENTRM). CENTRM uses a hybrid of PW and multigroup (MG) flux solutions combined with a sub-moment expansion of the scattering source.

The selected example problems are intended to represent an SFR. The first example problem is an infinite medium of U-238. The second is a homogenized infinite medium with isotopic compositions representing a typical SFR pin. The third example is an infinite medium with isotopic compositions representing recycled nuclear fuel from an LWR placed in an SFR.

All MCNP cases simulated 5 billion particle histories using custom weight-windows for particle population control. The weight-window treatment was included to reduce MCNP stochastic error by controlling particle population in the resonance region.

The PWFSG and MCNP cases were executed on an 8-way Intel® Xeon® X5550 2.67 GHz processor that supported symmetric multi-processing and hyperthreading. This architecture allowed for up to 16 separate processes to be executed in parallel. MCNP utilized this architecture by running particle histories in parallel. PWFSG used this architecture in a more limited sense by calculating the transfer source for different isotopes on separate process threads; however, this speedup was only realized on cases with multiple isotopes. CENTRM did not support any parallelization and was run on Intel® Core™ Duo 2.00 GHz architecture with SCALE utility scripts.

PWFSG and CENTRM only support fixed source distributions. To facilitate program-to-program comparison, every system was modeled with a fixed fission source distribution representing the energy distribution of fission neutrons from Pu-239. This spectrum is given by the Watt fission distribution shown in Equation (110), where E is given in units of MeV.

$$S(E) = C\exp(-E/a)\sinh[(bE)^{1/2}] \quad (110)$$

For Pu-239, the parameters a and b are 0.966 and 2.842, respectively, with C as an arbitrary scaling factor. The fission neutron production in MCNP was disabled using the NONU card, with the above analytic expression specified on the MCNP SDEF card.

Figure 13:
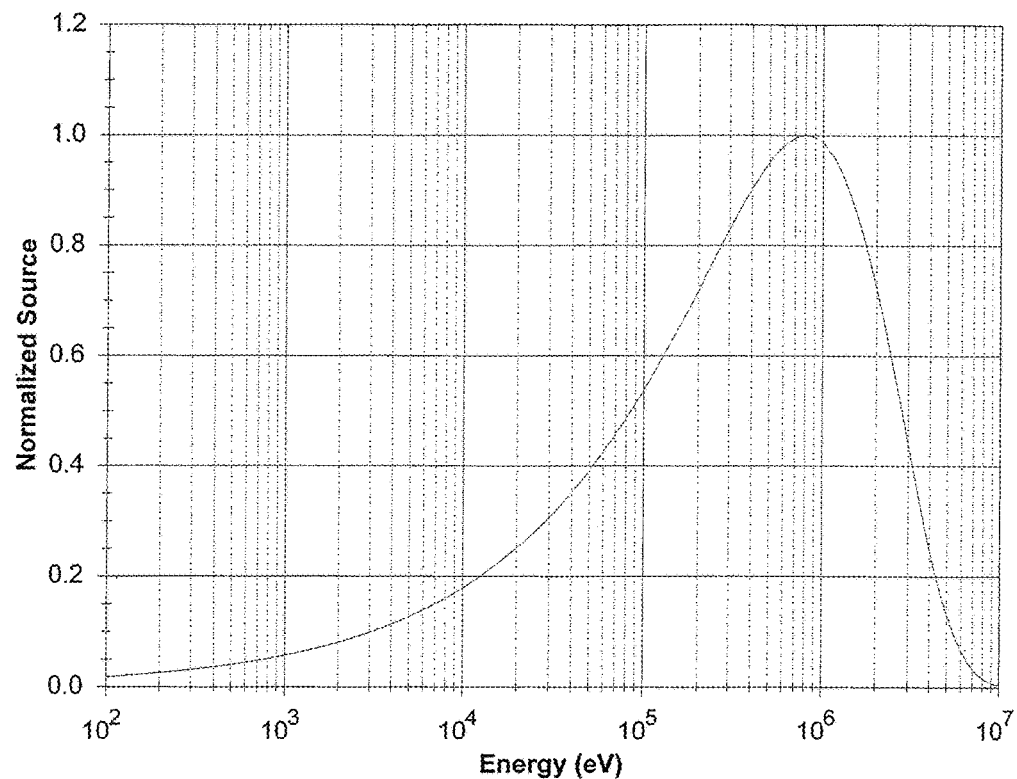
FIG. 13 is a graph showing a source distribution for Pu-239.

FIG. 13 is a graph showing a source distribution for Pu-239. The source distribution may be generated, for example, from a Watt fission spectrum with fitting parameters intended to match the fission neutron distribution from Pu-239.

CENTRM requires the neutron source to be given group-wise. Equation (110) was integrated over the 238 SCALE energy group structure and the integral of the source over each energy group was input into CENTRM as required in section F18.5 of *CENTRM: A One-Dimensional Neutron Transport Code for Computing Point-wise Energy Spectra* by Williams et al., Vol. II, Sect. F18, ORNL/TM-2005/39/V6, ORNL (2009).

PWFSG was developed with a source input feature similar to MCNP. The type of fixed source spectrum and any spectrum-specific parameters are specified in the input. PWFSG then uses the analytic expression for the described fixed source spectrum. For this case, the Watt spectrum with the same a and b parameters were given in the input, causing PWFSG to calculate the source at a given energy via Equation (110).

All three programs used ENDF/B-VII.0 nuclear data in their calculation process. PWFSG used the native ENDF/B-VII.0 files and PENDF files produced by NJOY. ACE tables, also created by using NJOY from ENDF/B-VII.0 data files, were used in MCNP. CENTRM uses the appropriate SCALE modules to pre-process the ENDF/B-VII.0 data into the required format. In particular, the CENTRM process involved the execution of the Bondarenko AMPX Interpolator (BONAMI) module, to generate the shielding MG cross-sections as well as Code to Read And Write Data for Discretized solution (CRAWDAD) to generate the PW libraries used by CENTRM.

The same energy mesh was used in all three programs so that quantitative comparison of the different spectra was possible. PWFSG and CENTRM use a similar algorithm for determining the appropriate energy mesh, while MCNP requires the energy mesh to be input prior to execution. To obtain the same mesh for all three programs, PWFSG was run first to generate an energy mesh. This mesh was input into MCNP. Any differences in the CENTRM energy mesh were adapted to the PWFSG energy mesh via linear interpolation. This adaption is possible because "a linear variation of the flux between energy points is assumed" in CENTRM, as noted in Section F18.1.1 of *CENTRM: A One-Dimensional Neutron Transport Code for Computing Point-wise Energy Spectra* by Williams et al., Vol. II, Sect. F18, ORNL/TM-2005/39/V6, ORNL (2009).

Each program has a different internal procedure for normalizing the flux spectrum; therefore, each output spectrum must be scaled so that program-to-program comparisons may be made. Once all three spectra where normalized appropriately, the residual errors between PWFSG and MCNP and between CENTRM and MCNP were calculated.

The MCNP spectrum is assumed to be the true spectrum due to the high-fidelity of the Monte Carlo method, the thorough verification and validation of MCNP, and 5 billion particle histories tracked.

The MCNP flux values were divided by their respective energy mesh interval size and scaled by an arbitrary value to place most of the flux values between 0 and 100, as shown in Equation (110). Dividing by the energy mesh interval size was necessary because MCNP flux values are integrated over the energy mesh during tallying. This yields flux values in units of 1/cm²-s. This division converts the integrated MCNP flux to its PW equivalent with units of 1/cm²-eV-s.

$$\phi'_{i,MCNP} = C \frac{\phi_{i,MCNP}}{(E_{i,MCNP} - E_{i-1,MCNP})} \quad (111)$$

The PWFSG and CENTRM results were then scaled and shifted to obtain the closest fit to the MCNP results. The scaling and shifting of flux energy spectrum is possible because the spectrum is simply a weighting function for the generation of group constants. This scaling and shifting will not have an impact on the resulting group constants because the weighting spectrum is normalized during the group constant generation process (See Equation (109)).

The flux points from PWFSG and CENTRM were scaled and shifted, as in Equation (112), using constant values of A and B so that the spectral shape was preserved.

$$\phi'_i = A\phi_i + B \quad (112)$$

The constants A and B were determined by minimizing the sums of the squares, $S_r$, of the residuals between MCNP and the respective program as in Equation (113).

$$S_r = \sum_i (\phi_{i,MCNP} - \phi_{i,PWFSG/CENTRM})^2 \quad (113)$$

This minimization was performed using a nonlinear Generalized Reduced Gradient (GRG) optimization algorithm, subject to two constraints. First, the flux must remain positive over the region of comparison. Second, the mean of the residuals must be zero.

The standard deviation of the residuals gives a measure of the variation of a program's results about the MCNP data for the cases studied. For comparison between CENTRM and PWFSG results, coefficients of determination ($r^2$) were calculated as in Equation (114). An $S_t$ parameter was calculated as in Equation (115).

$$r^2 = \frac{S_t - S_r}{S_t} \quad (114)$$

$$S_t = \sum_i (\phi_{1,MCNP} - \overline{\phi}_{MCNP})^2 \quad (115)$$

The $S_t$ parameter is a measure of the total variation in the measured data. The purpose of the regression model is to then explain this variation with a functional dependence (e.g., a linear function). In this application of regression analysis, the MCNP results take the role of the experimental data, with the model taken as the results from PWFSG or CENTRM.

An $r^2$ value of 100% would indicate that a PWFSG or CENTRM model exactly matches the MCNP data and explains all of the variation observed in MCNP. The $r^2$ value is normalized by $S_t$ allowing for comparison between the different cases.

An improvement factor, F, was calculated via Equation (116).

$$F = \frac{(1-r^2)_{CENTRM}}{(1-r^2)_{PWFSG}} \quad (116)$$

This improvement factor quantifies the improvement of the PWFSG match to the MCNP results compared to CENTRM.

B. U-238 Infinite Medium Case

The first example case is an infinite medium of U-238. The use of a single isotope in this case is intended to give a straightforward comparison of PWFSG to CENTRM and MCNP. Only one isotope influences the cross-section and energy transfer behavior in the system, which allows for more direct inference on what is affecting the flux spectra calculated by the three programs.

The infinite medium of U-238 is modeled at a temperature of 900 K with temperature-appropriate cross-sections. A number density of 1.0 was input into all the programs. For a single isotope in an infinite medium, the number density only scales the final spectrum and does not affect its shape.

Figure 15:
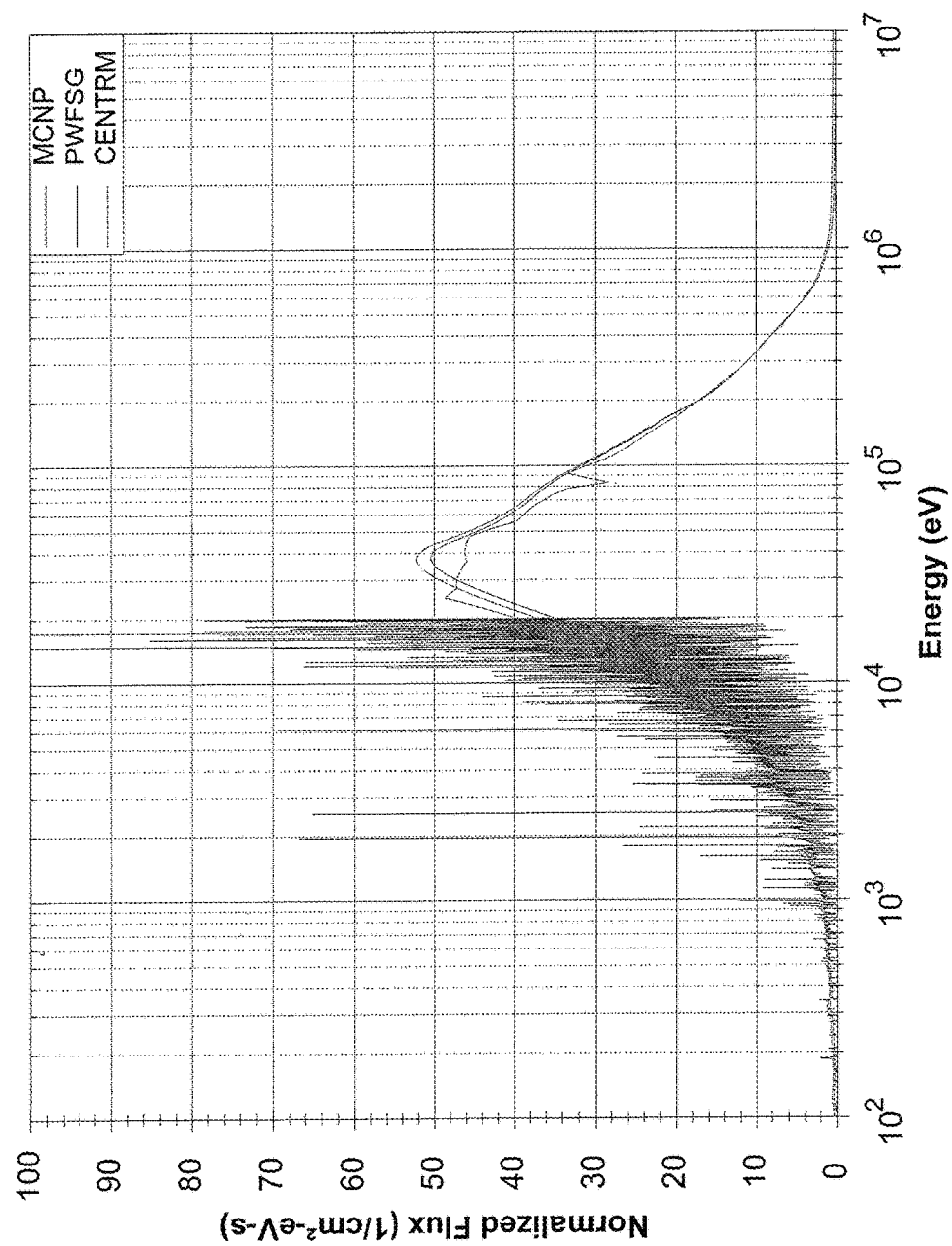
FIG. 15 is a graph showing the normalized spectra for the U-238 infinite medium case of FIG. 14.
Figure 16:
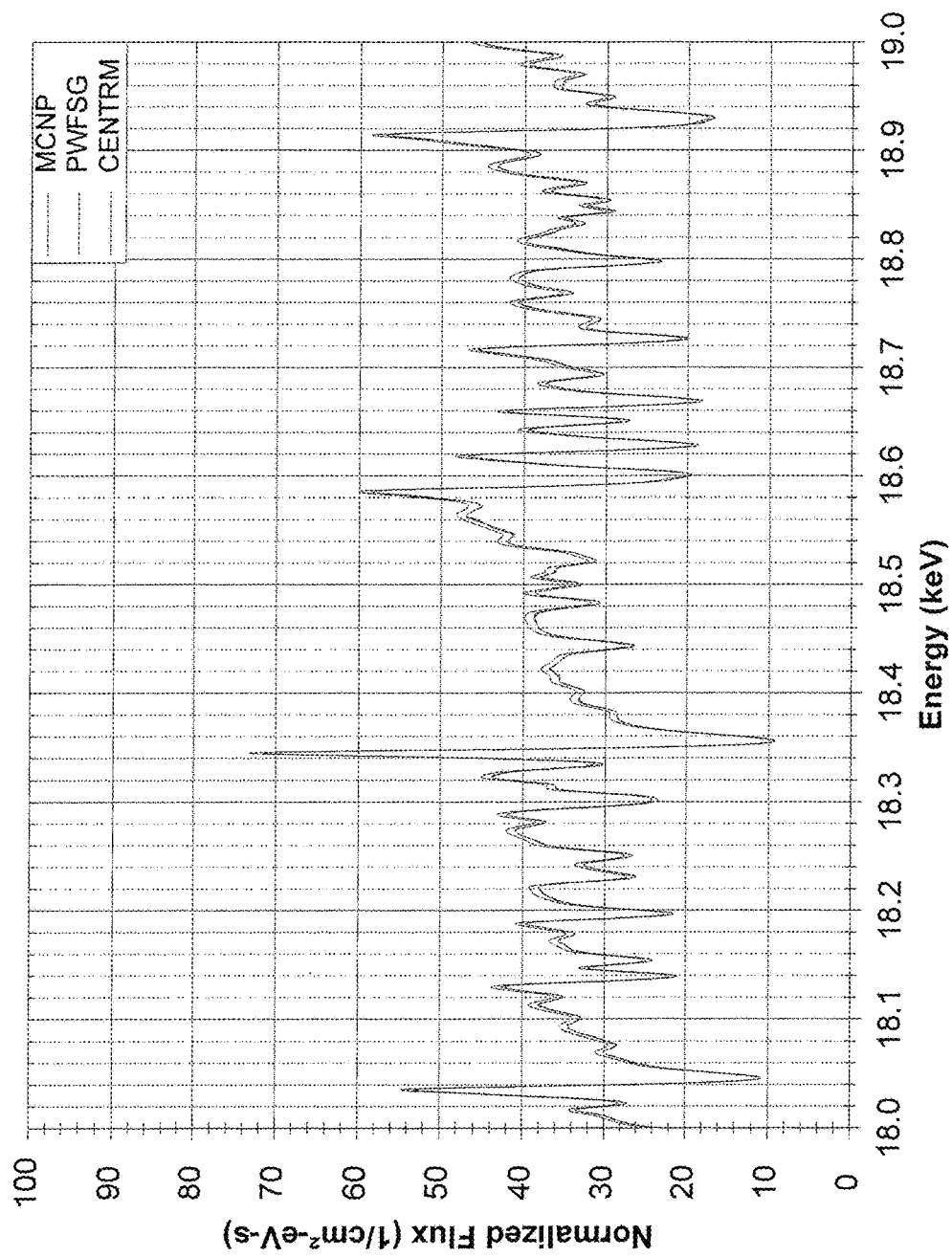
FIG. 16 is a graph showing the normalized spectra for the U-238 infinite medium case of FIG. 14 in the resonance region between 18 keV and 19 keV.

FIG. 14 is a table showing required execution times for three programs corresponding to the U-238 infinite medium case. CENTRM and PWFSG executed in just a few minutes while MCNP required almost two days. FIG. 15 is a graph showing the normalized spectra for the U-238 infinite medium case of FIG. 14. FIG. 16 is a graph showing the normalized spectra for the U-238 infinite medium case of FIG. 14 in the resonance region between 18 keV and 19 keV.

Figure 17:
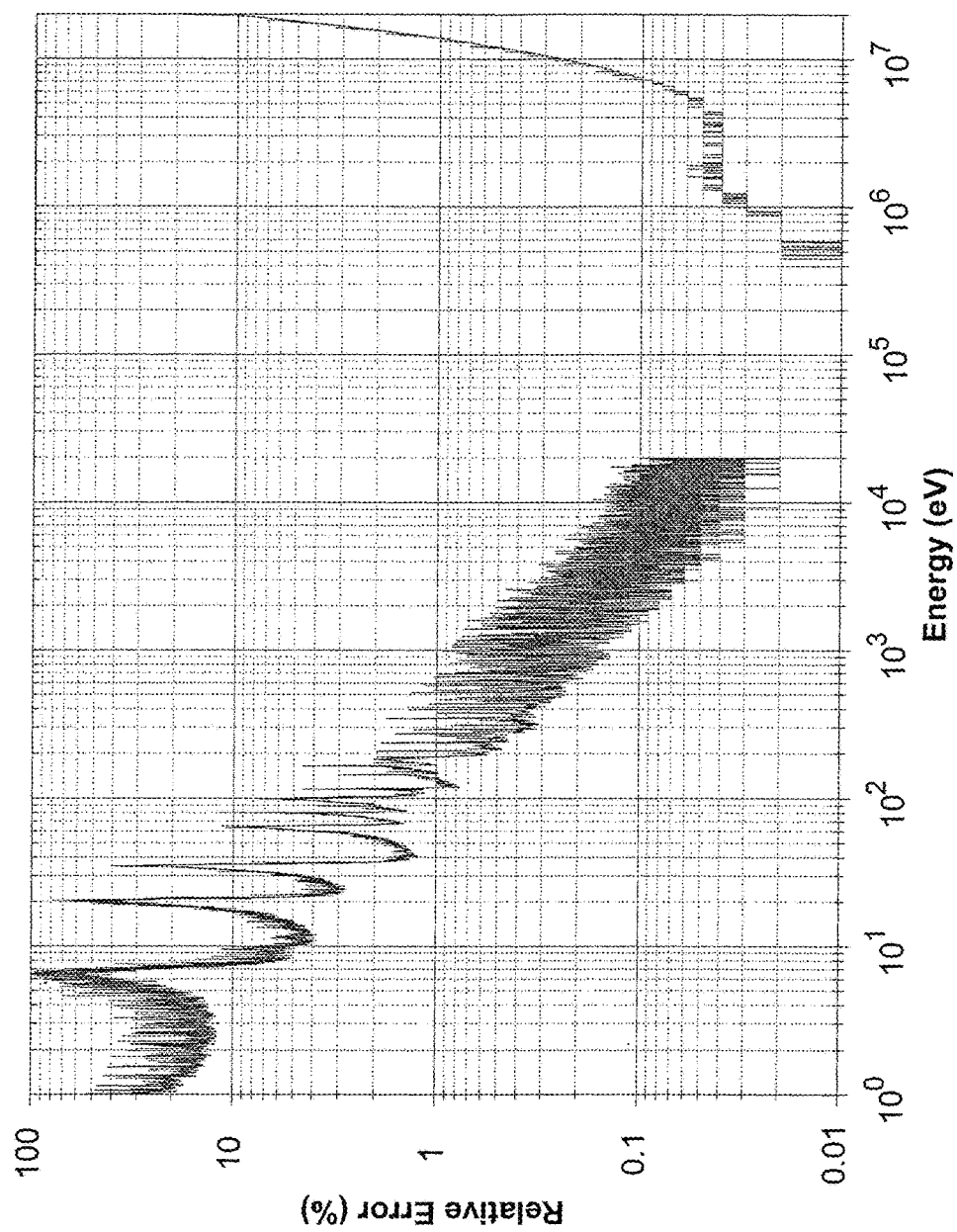
FIG. 17 is a graph showing statistical relative error for a MCNP program for the U-238 infinite medium case.

FIG. 17 is a graph showing statistical relative error for the MCNP program for the U-238 infinite medium case (MCNP output truncates results below 0.01%, resulting in a "flat" value of 0.01 between 20 keV and 300 keV). The comparison of the flux spectra was truncated to between 1 keV and 10 MeV. This energy range includes the majority of the flux peak, as shown in FIG. 15, and had MCNP relative error below 1%.

Figure 18:
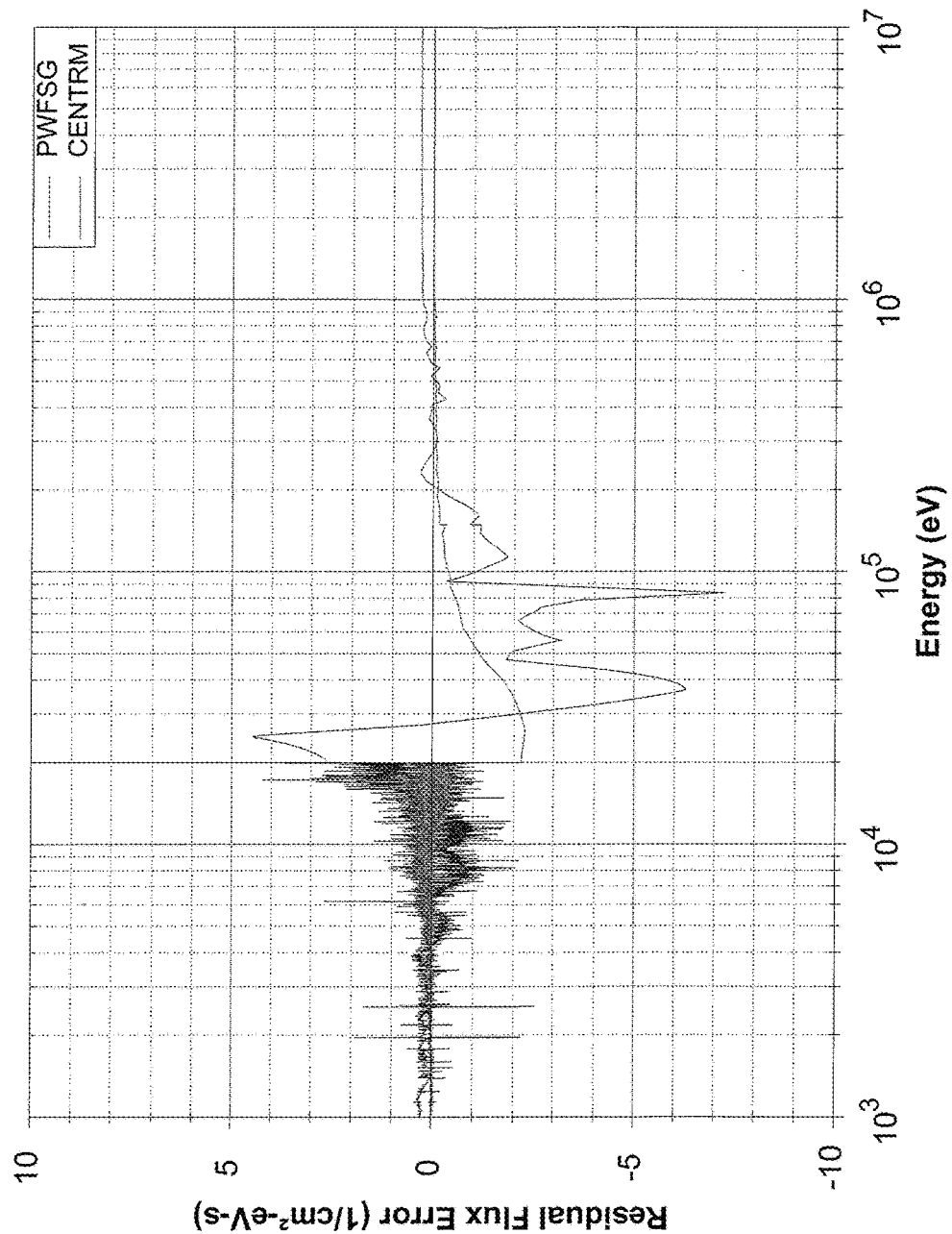
FIG. 18 is a graph showing residual flux error for PWFSG and CENTRM residuals compared to MCNP for the U-238 infinite medium case.

Generally there is good agreement among the three programs. FIG. 18 is a graph showing residual flux error for PWFSG and CENTRM residuals (i.e., absolute error) compared to MCNP for the U-238 infinite medium case. FIG. 19 is a table showing the standard deviation of the residuals, the $r^2$ values, and the corresponding $1-r^2$ values (error statistics) for the U-238 infinite medium case. Both programs have $r^2$ values very close to 100%, indicating good agreement with MCNP. The improvement factor for this case was 6.4, indicating that PWFSG provides a significant improvement over CENTRM. The main region of discrepancy between the programs is in the unresolved resonance region (20 keV to 149 keV), where resonances exist but were not able to be measured experimentally.

An upper PW cutoff of 25 keV was input into CENTRM to include the resolved resonance range of U-238. Above this point, CENTRM relies on the BONAMI module of SCALE to generate the self-shielded MG cross-sections. The errors observed in CENTRM in this region are likely from the simplified Bondarenko approach in BONAMI.

Figure 20:
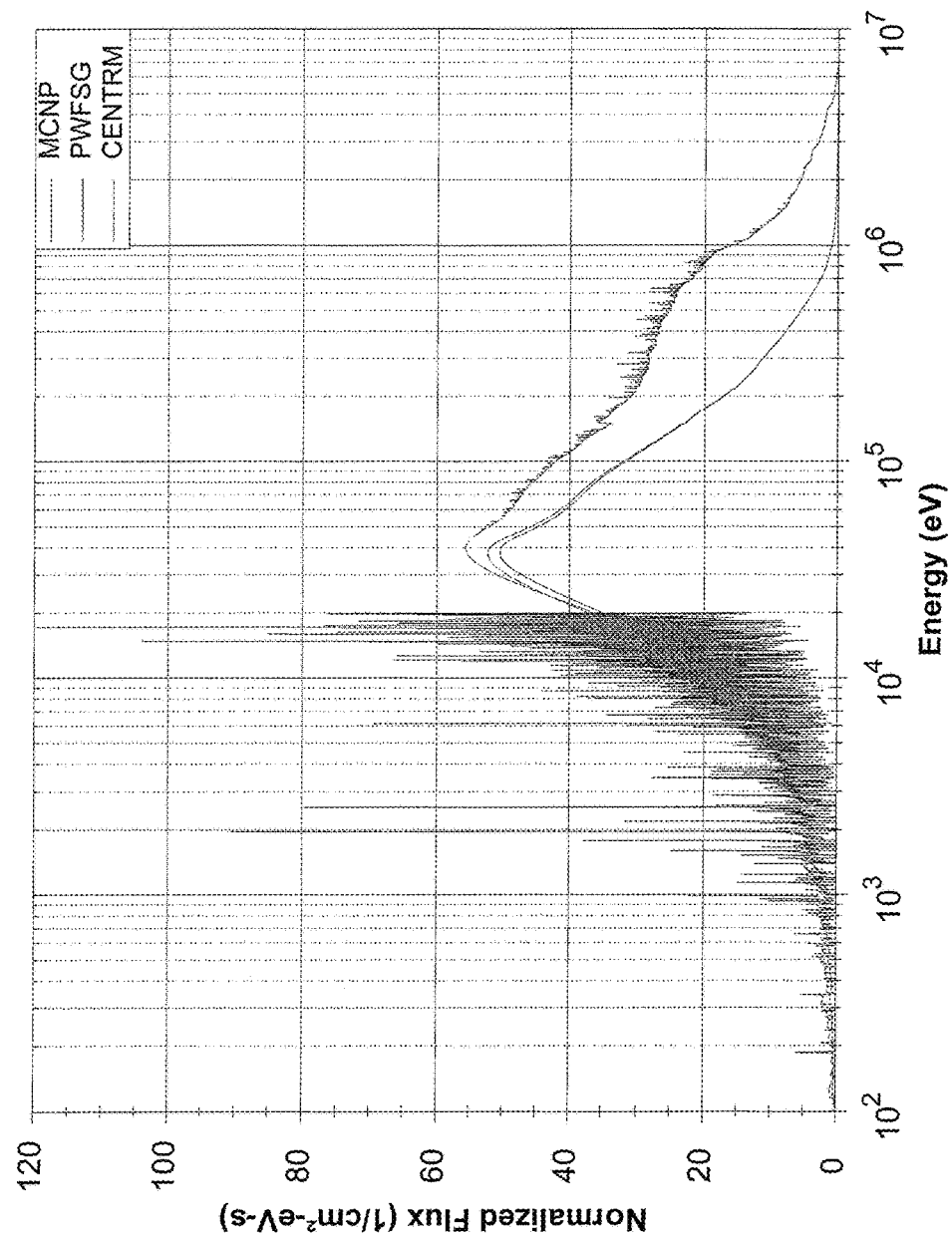
FIG. 20 is a graph showing the normalized spectra for the U-238 infinite medium case of FIG. 14, but with CENTRM extending the pointwise (PW) boundary to the upper comparison boundary of 10 MeV.

To test the contribution of the Bondarenko approach to the CENTRM results, the PW boundary was moved to the upper comparison boundary of 10 MeV. FIG. 20 is a graph showing the normalized spectra for the U-238 infinite medium case of FIG. 14, but with CENTRM extending the PW boundary to the upper comparison boundary of 10 MeV. The standard deviation of the residuals increased from 0.8240 to 4.20, the $r^2$ value decreased from 99.65% to 90.86%, and the improvement factor increased to 166.3.

There was also some non-physical variation in the CENTRM spectrum at higher energies, which may be caused by a numerical issue.

The agreement between CENTRM and MCNP for the CENTRM PW case was likely decreased due to the kinematic assumptions in CENTRM. From page F18.1.3 of the CENTRM manual it is noted that "Within the epithermal PW range, the slowing-down source due to elastic and discrete-level inelastic reactions is computed using the PW flux and the rigorous scatter kernel based upon the neutron kinematic relations for s-wave scattering. Continuum inelastic scatter is approximated by an analytical evaporation spectrum, assumed isotropic in the laboratory system."

Figure 21:
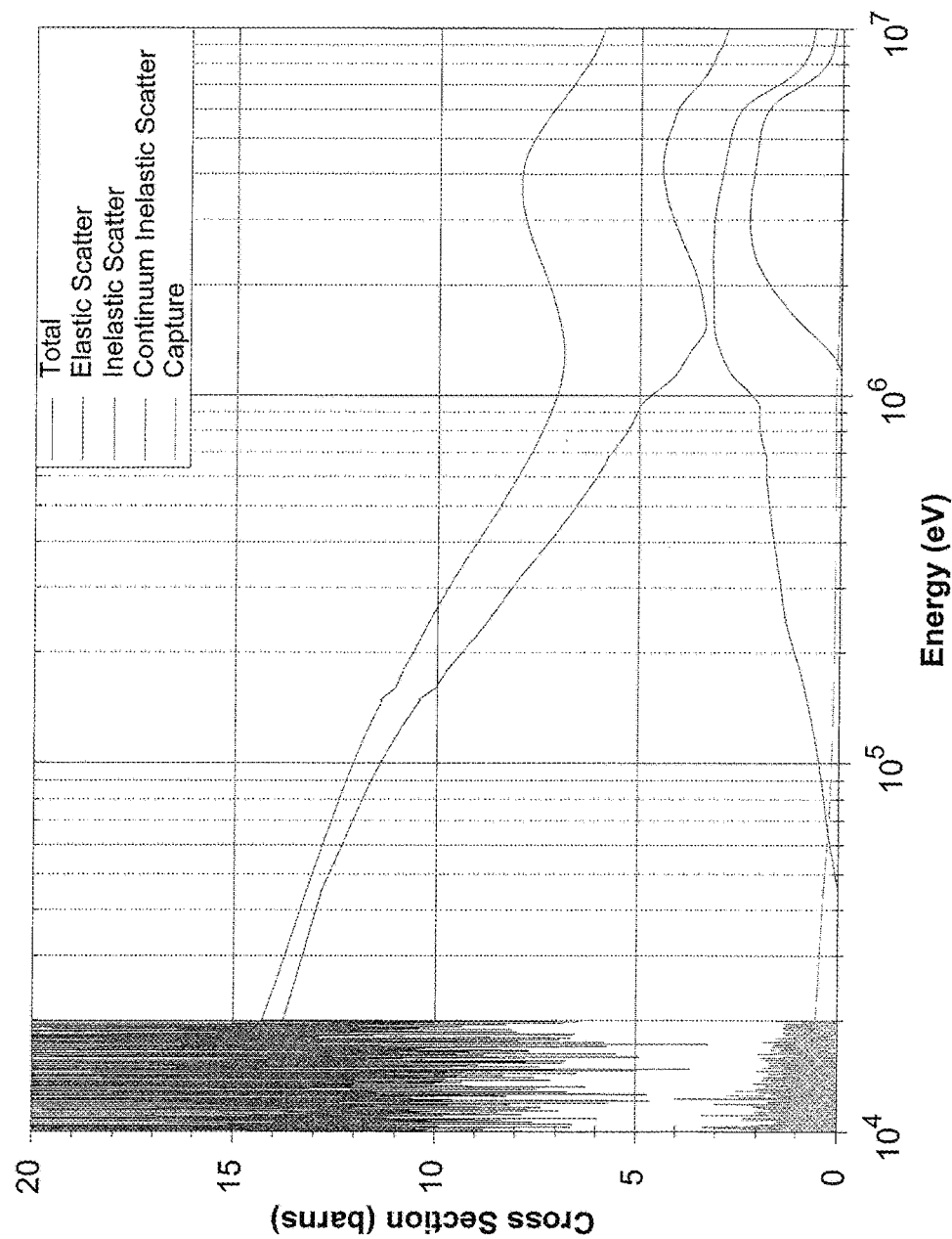
FIG. 21 is a graph showing various cross-sections for U-238 between 10 keV and 10 MeV.
Figure 22:
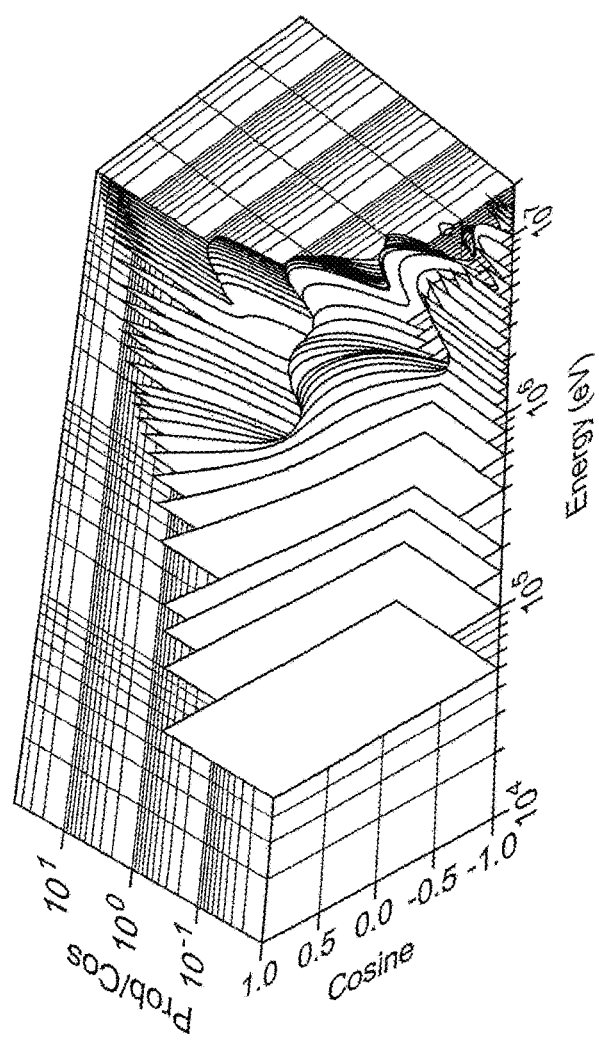
FIG. 22 is a diagram showing angular scattering distribution versus energy for U-238 under elastic scattering in a COM system.
Figure 23:
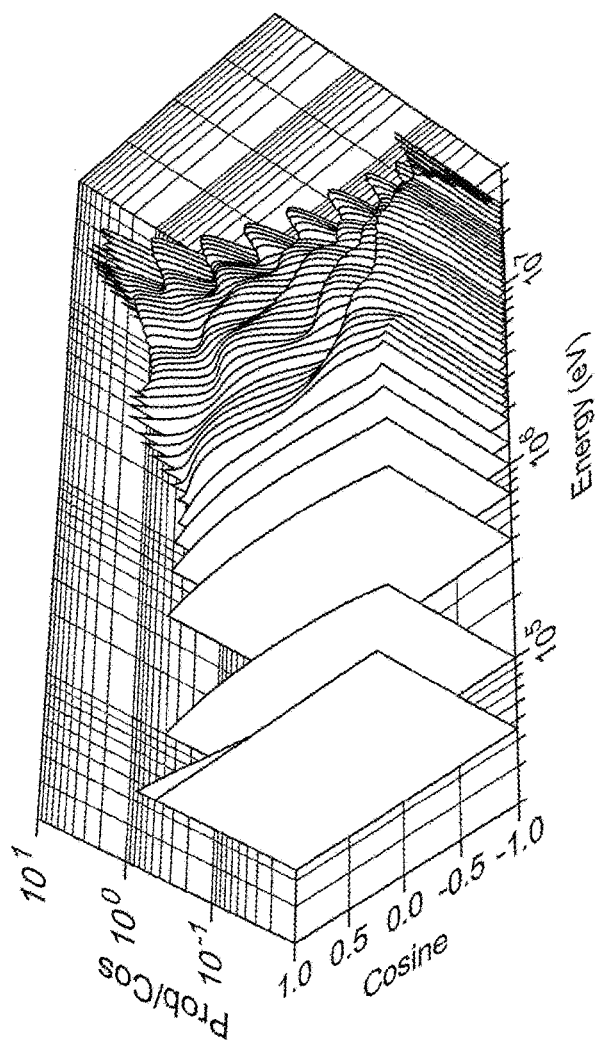
FIG. 23 is a diagram showing angular scattering distribution versus energy for U-238 under first discrete-level inelastic scattering in a COM system.

The assumptions of isotropic scattering in the COM coordinate system for elastic and discrete-level inelastic scatter (i.e., s-wave based scatter) and isotropic scattering in the laboratory system for continuum inelastic scatter may cause large errors at higher energies. FIG. 21 is a graph showing various cross-sections for U-238 between 10 keV and 10 MeV. As shown in FIG. 21, scattering generally dominates U-238 at high energies. Above 1 MeV, elastic and inelastic scattering cross-sections contribute comparably to the total cross-section. Above 2-3 MeV, almost half of the inelastic contribution is from continuum inelastic. FIG. 22 is a diagram showing angular scattering distribution versus energy for U-238 under elastic scattering in a COM system. FIG. 23 is a diagram showing angular scattering distribution versus energy for U-238 under first discrete-level inelastic scattering in a COM system. As shown in FIGS. 22 and 23, the scattering may show strong angular dependence at these energies. This strong angular dependence is not well-represented with the assumed isotropy.

PWFSG has excellent agreement with MCNP throughout the comparison energy range with an $r^2$ value of 99.95%. An examination of FIG. 18 reveals that, as with CENTRM, the main discrepancy is in the unresolved resonance energy range. PWFSG currently has no method for including unresolved resonance contributions, where MCNP uses a probability table method.

Figure 24:
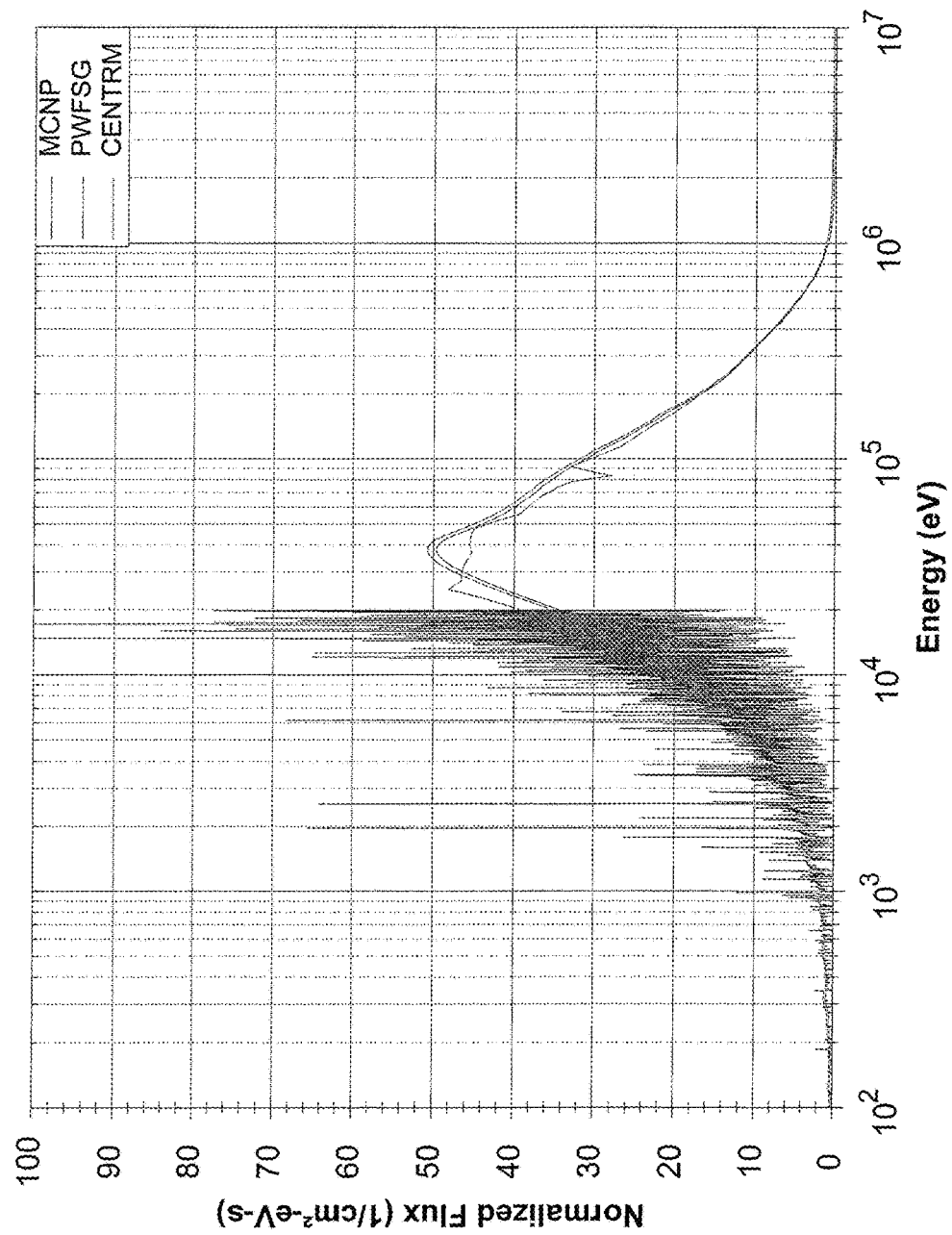
FIG. 24 is a graph showing the normalized spectra for the U-238 infinite medium case of FIG. 14, but with unresolved resonance treatment disabled in MCNP.

The infinite medium U-238 case was executed again in MCNP with the unresolved resonance probability table method disabled. FIG. 24 is a graph showing the normalized spectra for the U-238 infinite medium case of FIG. 14, but with unresolved resonance treatment disabled in MCNP. FIG. 25 is a table showing the standard deviation of the residuals, the $r^2$ values, and the corresponding $1-r^2$ values (error statistics) that summarize the results of FIG. 24 for the U-238 infinite medium case. The difference at the unresolved energies is reduced; however the $r^2$ statistic and the standard deviation are changed only slightly. The improvement factor decreased slightly to a value of 5.4.

For comparison of the differences between these two cases it is helpful to calculate the z statistic for the residuals. The z statistic for a given residual is the value of the residual minus the mean of the residuals and normalized by the standard deviation of the residuals as in Equation (117). Due to the spectrum normalization the mean of the residuals, $\bar{\varepsilon}$, is zero for this analysis.

$$z_i = \frac{\varepsilon_i - \bar{\varepsilon}}{\sigma_g} \tag{117}$$

Figure 26:
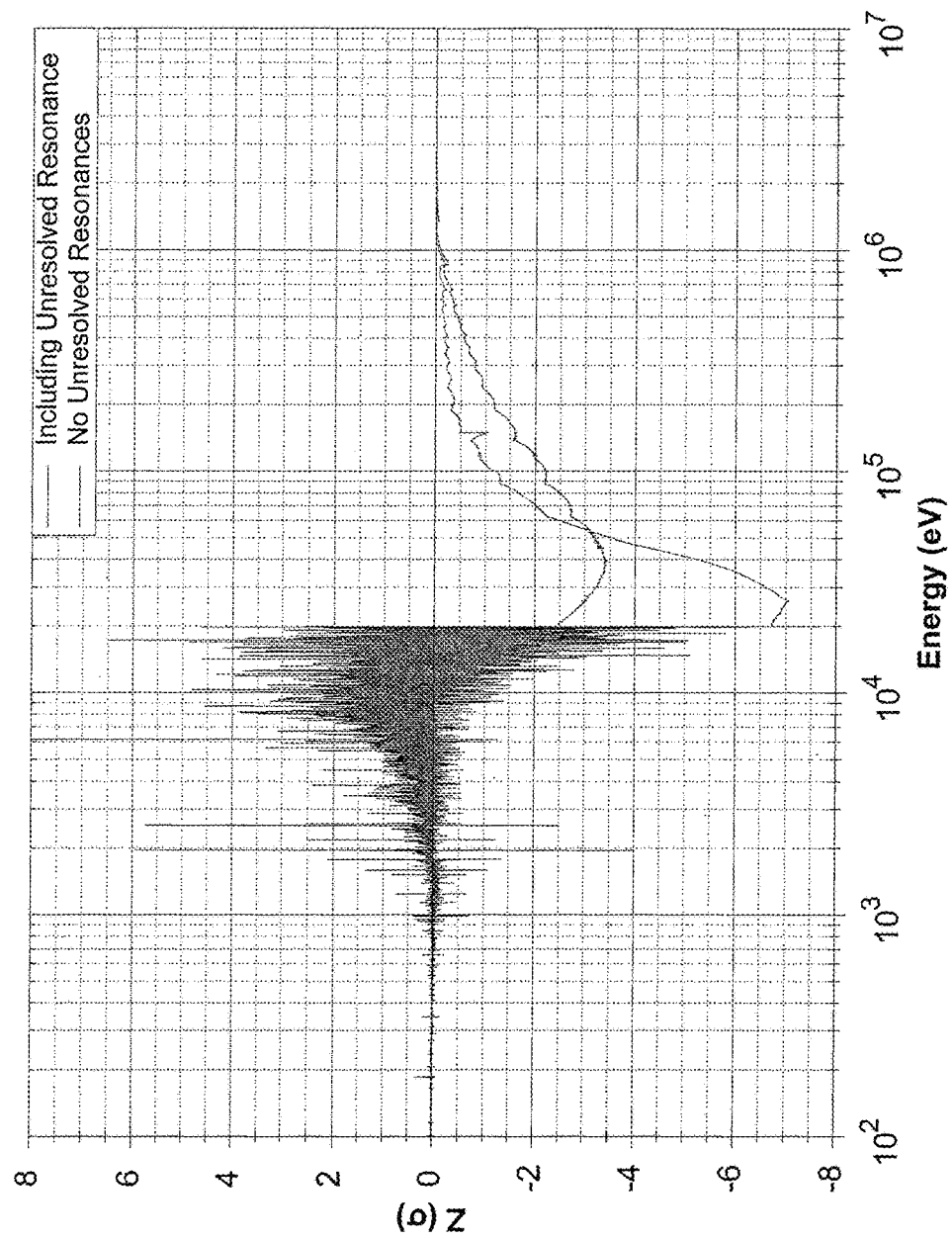
FIG. 26 is a graph showing a plot of the standardized residuals (z statistics) versus energy from PWFSG generated by comparison to MCNP with and without unresolved resonance treatment.
Figure 27:
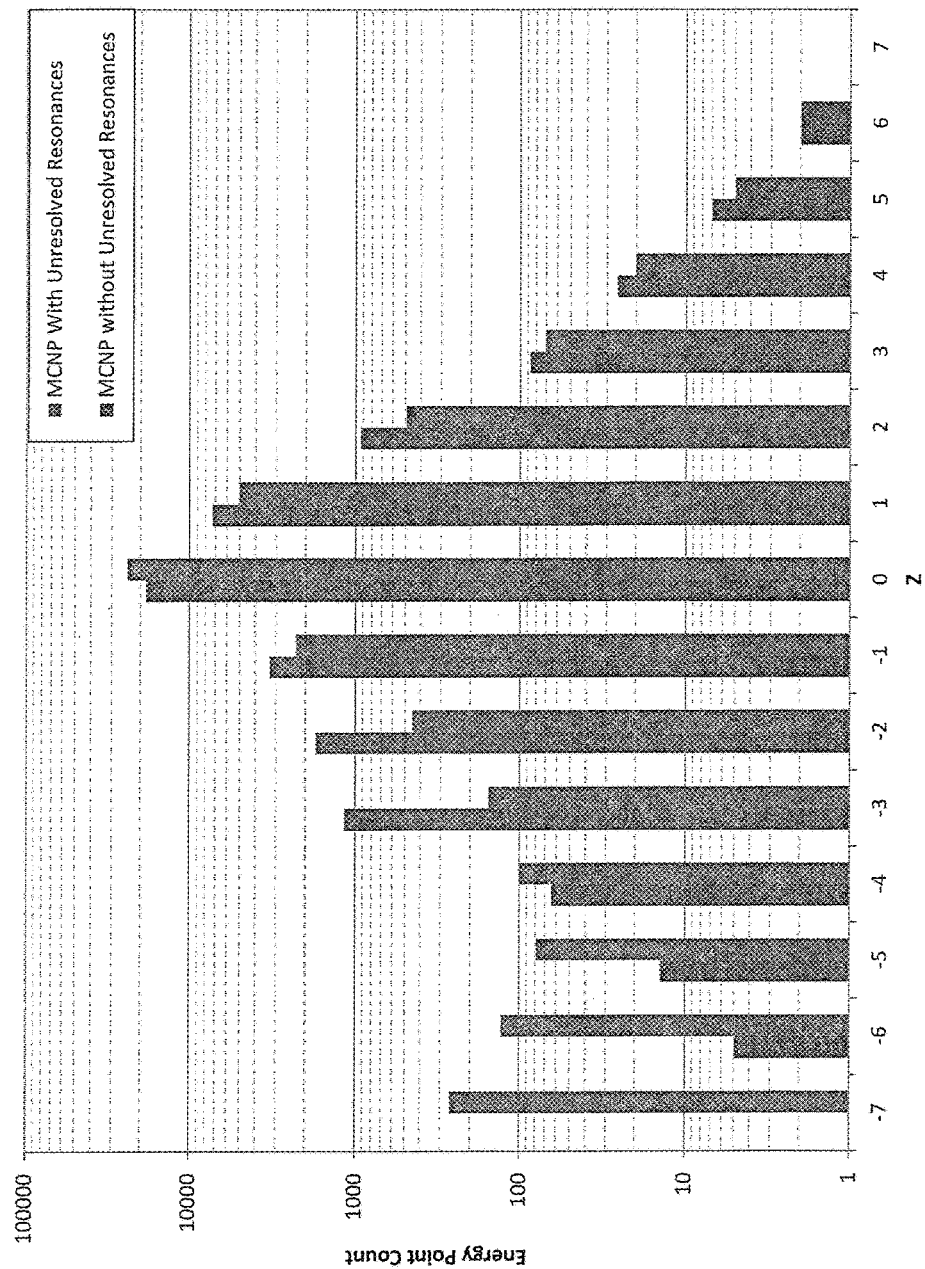
FIG. 27 is a histogram of the standardized residuals (z statistics) from PWFSG generated by comparison to MCNP with and without unresolved resonance treatment.

FIG. 26 is a graph showing a plot of the standardized residuals (z statistics) versus energy from PWFSG generated by comparison to MCNP with and without unresolved resonance treatment. FIG. 27 is a histogram of the standardized residuals (z statistics) from PWFSG generated by comparison to MCNP with and without unresolved resonance treatment. Even though the descriptive statistics do not show a distinct improvement for the no-unresolved case, it is clear from the histogram that the variation about the MCNP results is more evenly distributed for the case without unresolved resonances. The case with the unresolved resonances included has a stronger bias towards lower values that skews the histogram. Despite the lack of improvement in the $r^2$ statistic, the case without unresolved resonances seems to exhibit less bias and a more random distribution of the residuals and is thus considered a better match to the MCNP data.

Based on the results for the U-238 case as well as subsequent studies, it is concluded that both PWFSG and CENTRM provide good agreement with MCNP results, yielding $r^2$ values over 99% in their nominal usage. In this case, the main source of CENTRM error is the scattering kinematics assumptions in the PW region. The main source of error for PWFSG is due to lack of unresolved resonance treatment. Other PWFSG error is likely due to statistical variation in the MCNP results and numerical error in PWFSG.

C. SFR Fuel Cell Case

Figure 28:
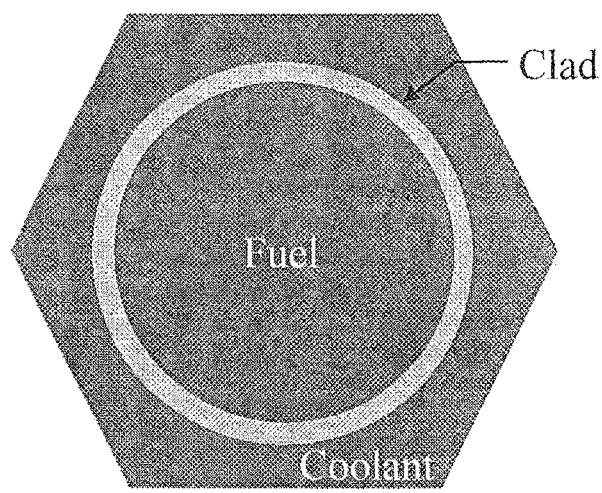
FIG. 28 is a diagram showing a sodium fast reactor (SFR) fuel cell in a hexagonal lattice.

FIG. 28 is a diagram showing an SFR fuel cell in a hexagonal lattice. This second example case provides a more realistic scenario to test the effects of multiple isotopes with different resonance energies and energy transfer behavior.

The entire fuel cell was modeled at a temperature of 900 K, because CENTRM cannot model materials in the same zone at different temperatures. PWFSG and MCNP do not share this limitation, but were also modeled at 900 K for consistency.

The fuel in the modeled SFR pin was a metallic alloy of uranium and zirconium with 10 wt % zirconium (U-10Zr), with the uranium 15% enriched in U-235. The cladding was modeled as a simplified version of HT9, a common choice for SFR cladding due to its corrosion and swelling resistant properties. The composition, based on Table 1 of *Development of Martensitic Steels for High Neutron Damage Applications* by Gelles, *J. Nucl. Mater.*, 239, 99 (1996), was simplified as 12 wt % chromium, 1 wt % molybdenum, and 87 wt % iron. The coolant was modeled as liquid sodium with a density of 0.874 g/cm³.

The theoretical densities of the metal alloys were determined using Equation (118) for a metal alloy with constituent elemental densities of $\rho_i$ and weight fractions $w_i$.

$$\frac{1}{\rho} = \frac{1}{\sum_i \frac{w_i}{\rho_i}} \tag{118}$$

The metal fuel alloy is assumed to be fabricated with this theoretical density with a gap between the fuel and cladding. Upon reaching operational temperatures, the fuel expands until making contact with the inner surface of the cladding. This expansion lowers the fuel density. The fuel density used in the number density calculations was adjusted to be 75% of the theoretical calculated from Equation (118). While this adjustment does not change the overall number of the fuel atoms (i.e., density is lowered but area fraction increases proportionally to compensate), it does serve to remove the fuel-cladding gap. This condition is more characteristic of an actual SFR fuel pin at operational temperatures and also provides a simpler model.

The fuel cell geometry and materials of FIG. 28 were homogenized into an infinite medium. The area fractions resulting from the geometry were used to scale the number densities for the fuel, cladding, and coolant. FIG. 29 is a table showing homogenized number densities of the isotopes in the SFR fuel cell.

Figure 30:
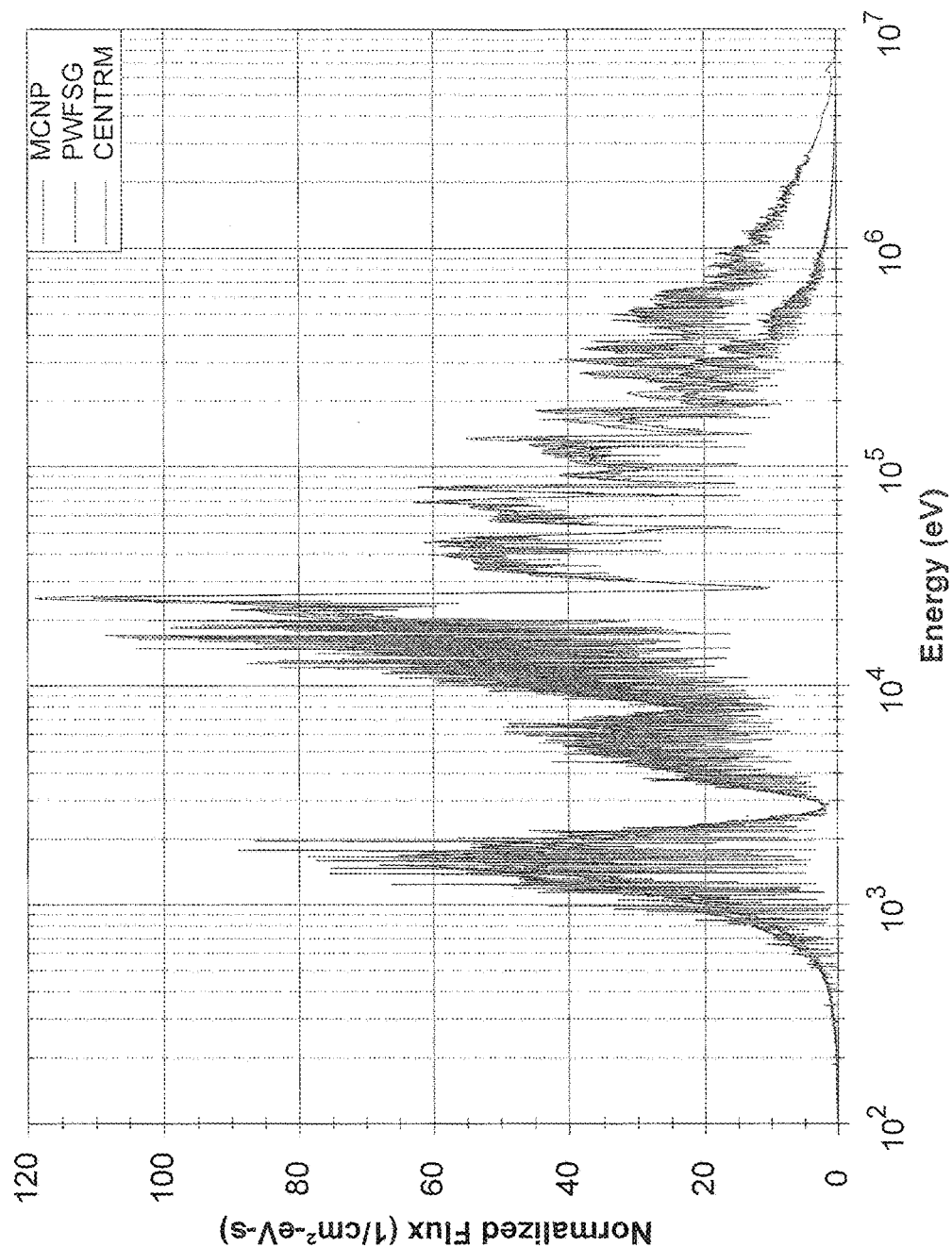
FIG. 30 is a graph showing the normalized spectra for the SFR fuel cell case.
Figure 31:
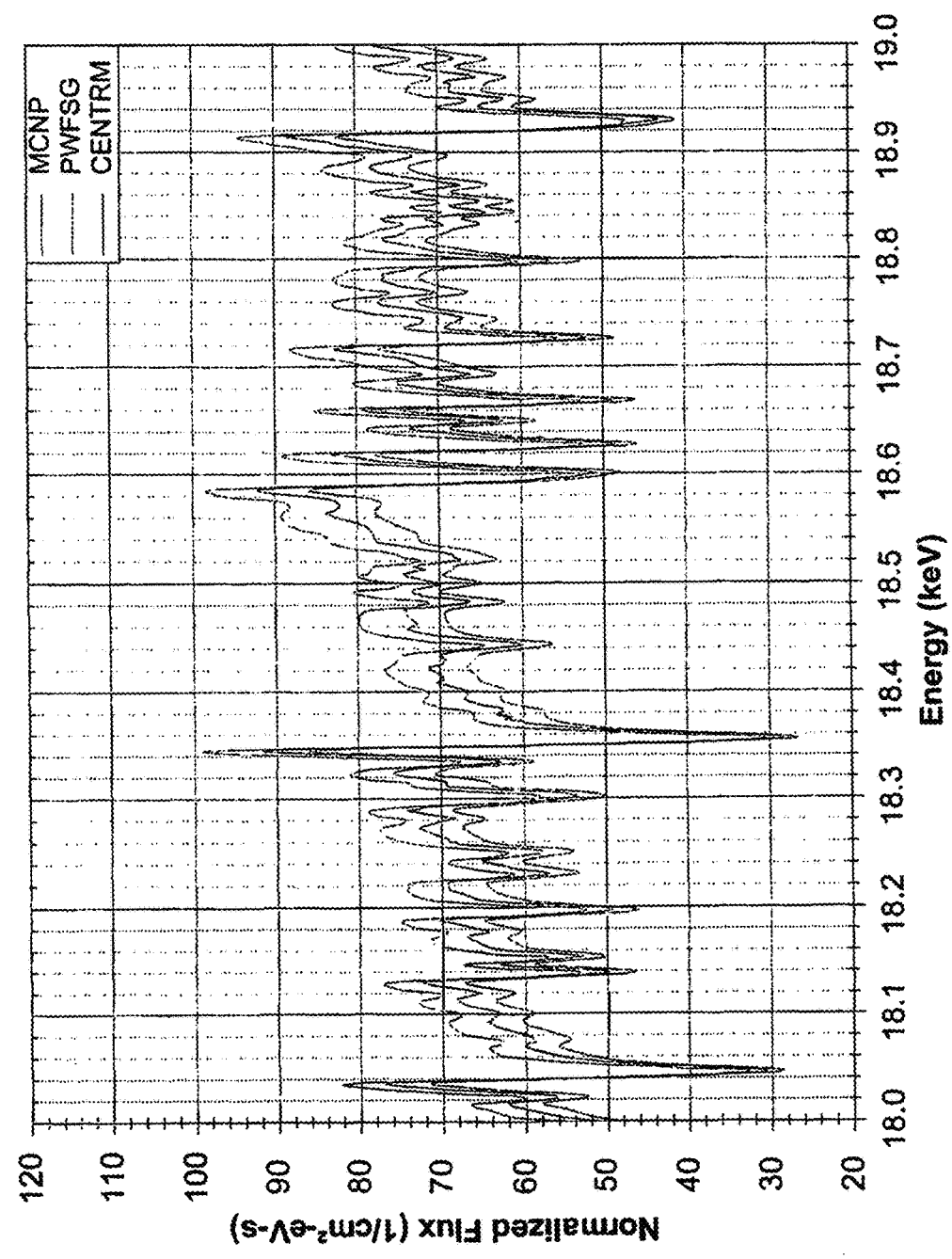
FIG. 31 is a graph showing the normalized spectra for the SFR fuel cell case of FIG. 30 in the resonance region between 18 keV and 19 keV.

The execution times required for the SFR fuel cell case are summarized with the other cases in FIG. 14. The CENTRM time included approximately 11 minutes of calculation time for CENTRM itself and the remainder in library pre-processing by BONAMI, CRAWDAD, and other SCALE utility modules. Similar to the U-238 infinite medium case, PWFSG and CENTRM required just over 10 minutes, while MCNP required almost a week of processing time. FIG. 30 is a graph showing the normalized spectra for the SFR fuel cell case. FIG. 31 is a graph showing the normalized spectra for the SFR fuel cell case of FIG. 30 in the resonance region between 18 keV and 19 keV.

Figure 32:
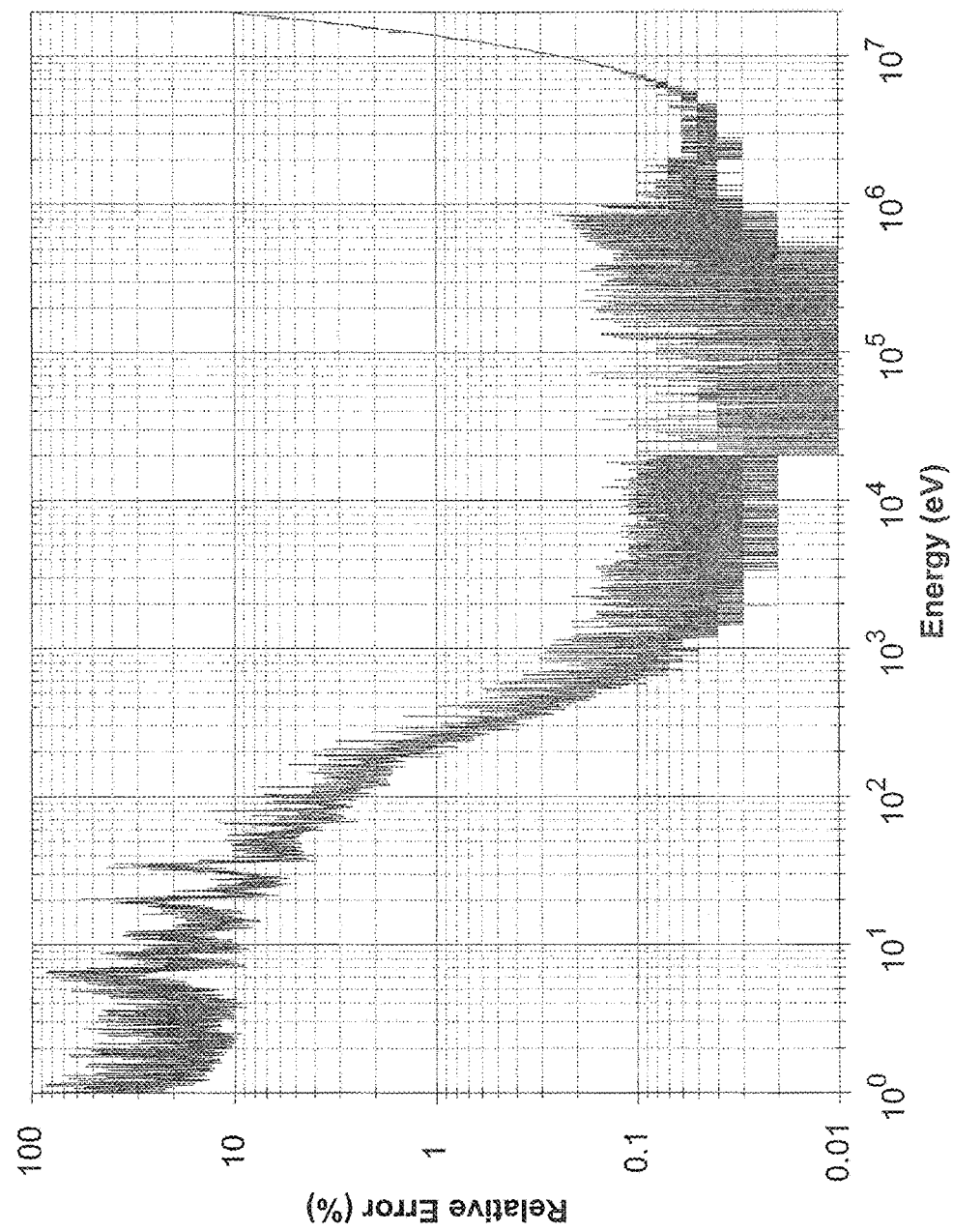
FIG. 32 is a graph showing statistical relative error for the MCNP program for the SFR fuel cell case.

FIG. 32 is a graph showing statistical relative error for the MCNP program for the SFR fuel cell case (MCNP output truncates results below 0.01%, resulting in a "flat" value of 0.01 between 20 keV and 300 keV). For this case the comparison of the flux spectra was performed between 400 eV and 10 MeV. As with the U-238 infinite medium case, this truncation was based on selecting the region with MCNP relative error below 1% while including the majority of the flux peak.

FIG. 33 is a table showing the standard deviation of the residuals, the $r^2$ values, and the corresponding $1-r^2$ values (error statistics) for the SFR fuel cell case. The agreement between MCNP and PWFSG decreased slightly from the U-238 infinite medium case, but the $r^2$ statistic indicates a good fit with a value of 98.41%. The CENTRM results show more of a discrepancy for the SFR fuel cell case with an $r^2$ of 87.54%. The improvement factor is 7.8, which indicates a greater benefit of PWFSG over CENTRM when compared to the U-238 infinite medium case.

Figure 34:
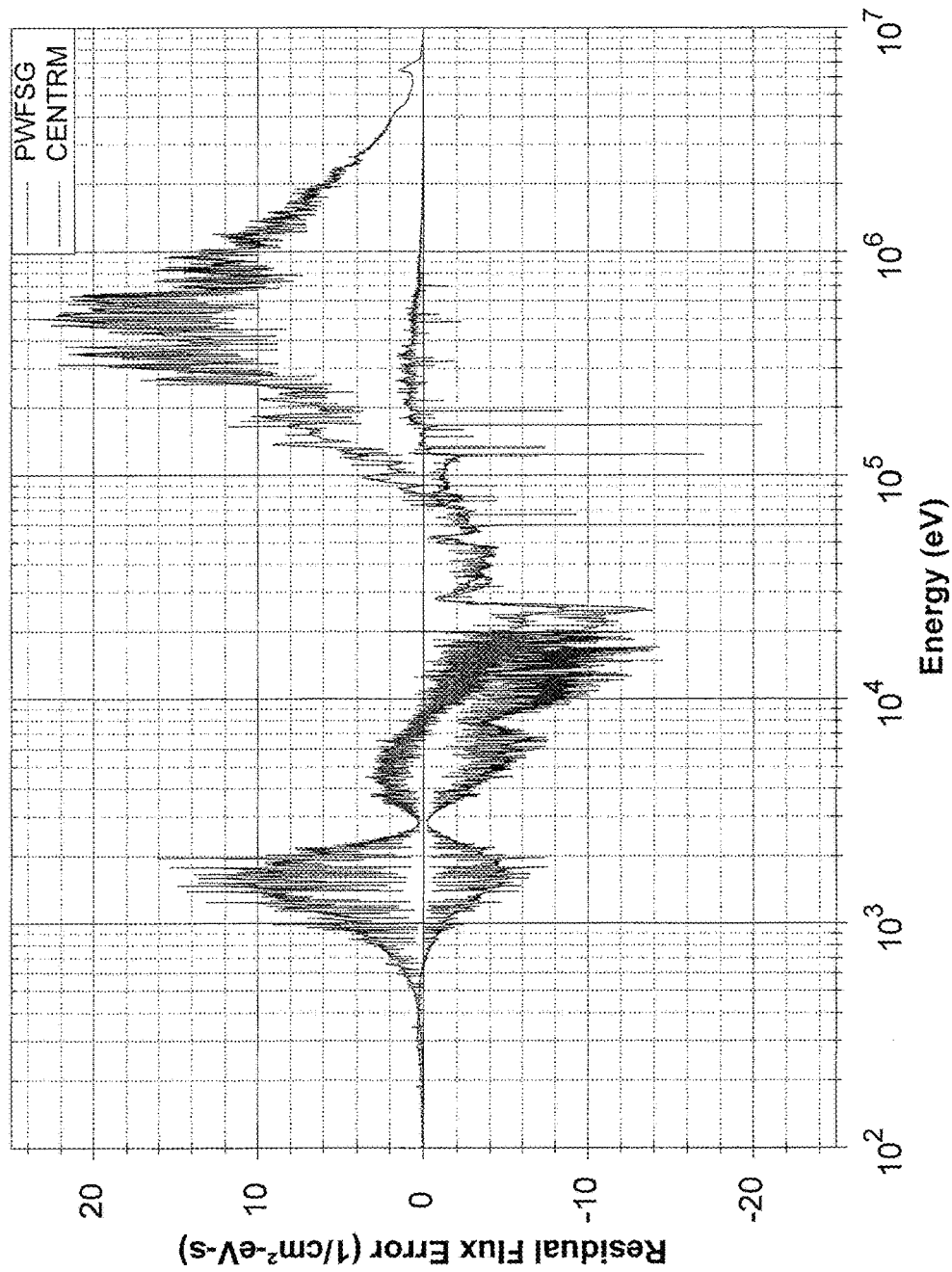
FIG. 34 is a graph showing residual flux error for PWFSG and CENTRM residuals compared to MCNP for the SFR fuel cell case.

FIG. 34 is a graph showing residual flux error for PWFSG and CENTRM residuals compared to MCNP for the SFR fuel cell case. The issues identified in the U-238 infinite medium case again contribute to error in the SFR fuel cell case. For this case, the CENTRM PW cutoff was set to 10 MeV to capture the resonance region of sodium and the structural materials. This PW cutoff caused the inclusion of a significant amount of high mass, anisotropic scattering isotopes in the PW solution between 100 keV to 10 MeV range. This inclusion caused an over-prediction by CENTRM of the flux in this range and an under-prediction in the flux values below 100 keV.

FIG. 34 suggests the error in PWFSG again derives from the lack of an unresolved resonance treatment. The flux is under-estimated in the unresolved resonance region of the uranium isotopes between 10 keV to 200 keV. This causes the neutron balance to be over-estimated, particularly in the lower energy ranges. Without an unresolved resonance treatment, PWFSG is redistributing the neutrons that would be lost in the unresolved region to the lower resonance energies.

Despite the error from the lack of unresolved resonance treatment, PWFSG still provides excellent agreement with MCNP. This example case demonstrates that PWFSG is able to effectively model a multi-isotope problem derived from a realistic SFR application.

D. UNF Fuel Cell Case

The final example case is a fuel cell with LWR UNF. This example is to test programs' abilities to simulate multiple, similar resonant materials in a mixture. Such a condition violates many of the assumptions in traditional group constant generation methods such as the Bondarenko method and the Subgroup method. The PW solution methods in PWFSG and CENTRM do not share these assumptions; MCNP relies on direct sampling of the cross-sections. Therefore, these programs should be able to accurately model the overlapping resonances.

The same area fractions and density calculations from the SFR fuel cell case were applied to the UNF fuel cell case. The difference between the two models is in the composition of the fuel alloy. The fuel is assumed to be an alloy of 70 wt % depleted uranium, 20 wt % transuranics (TRU), and 10 wt % zirconium (U-20TRU-10Zr).

The detailed TRU composition was determined from the fuel depletion simulation program, ORIGEN-S. A pressurized water reactor (PWR) fuel composition accumulated an exposure to 41,200 MWD/MTHM over three cycles. This fuel exposure was based on previous studies to determine fuel product compositions for advanced SFR designs.

The UNF fuel cell case was simplified by discarding isotopes in concentrations less than 0.0001%. The final fuel number densities were determined using the alloy weight fractions and the isotopic composition of depleted uranium with 0.2 wt % enrichment, the transuranic composition from ORIGEN-S, and the isotopic composition of zirconium.

The cladding and coolant number densities for the UNF fuel cell case remained unchanged from the SFR fuel cell case. FIG. 35 is a table showing homogenized number densities of the isotopes in the UNF fuel cell case.

The execution times required for the UNF fuel cell case by the three programs are summarized along with the other cases in FIG. 14. As with the other cases, the majority of the time needed by CENTRM was for the spectrum calculation (18.5 minutes) with the remainder in library pre-processing. CENTRM and PWFSG both required less than 20 minutes to execute, while MCNP required almost 10 days.

Figure 36:
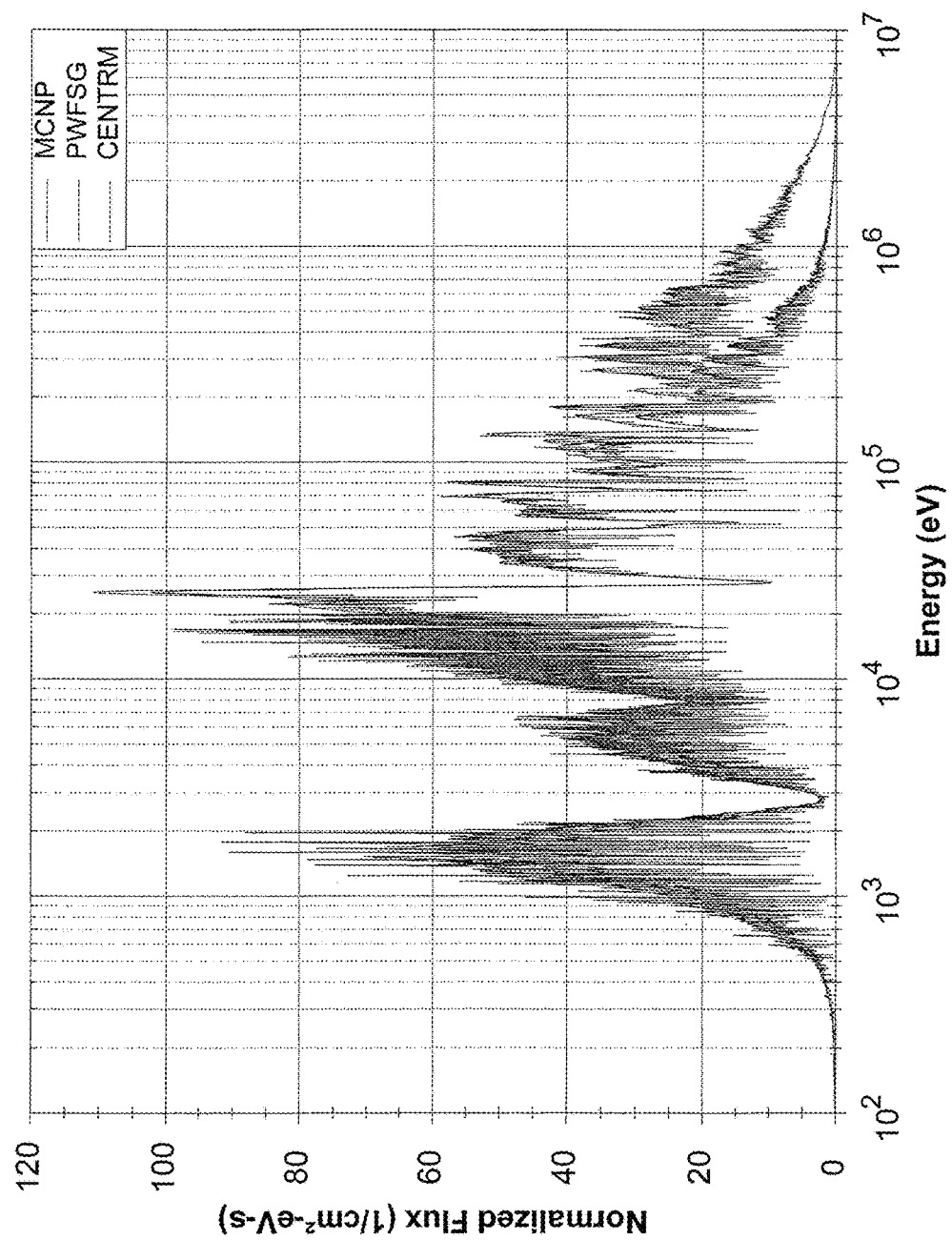
FIG. 36 is a graph showing the normalized spectra for the UNF fuel cell case.
Figure 37:
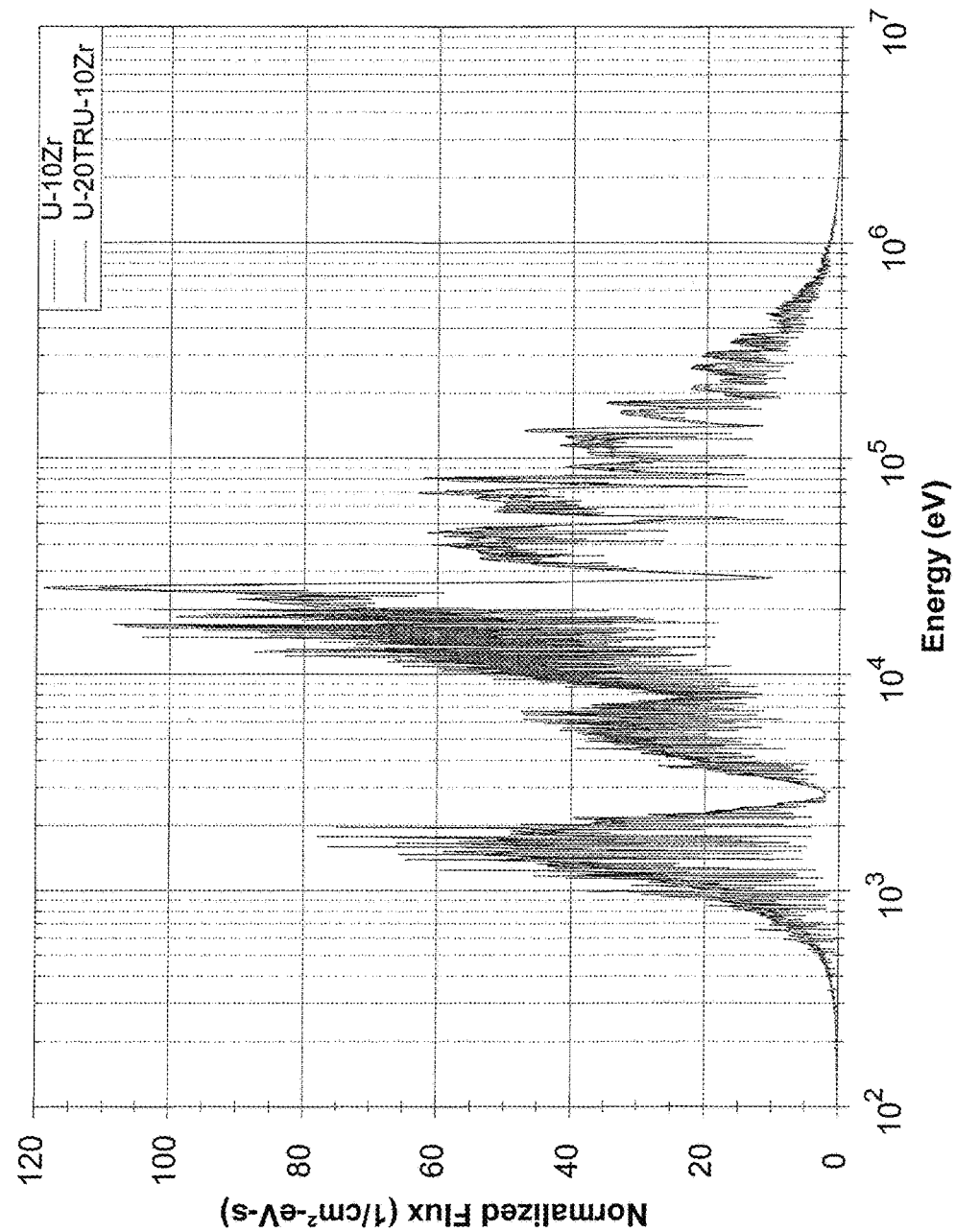
FIG. 37 is a graph showing MCNP spectra for the SFR fuel cell case with U-10Zr fuel and the UNF fuel cell case with U-20TRU-10Zr fuel.

FIG. 36 is a graph showing the normalized spectra for the UNF fuel cell case. The spectra are similar to the SFR fuel cell case spectra as the total system cross-section is still dominated by Na-23 and U-238. FIG. 37 is a graph showing MCNP spectra for the SFR fuel cell case with U-10Zr fuel and the UNF fuel cell case with U-20TRU-10Zr fuel. The inclusion of the transuranic isotopes shifts the neutron spectra to slightly lower energies and lessens the peaks and valleys in the resonances.

Figure 38:
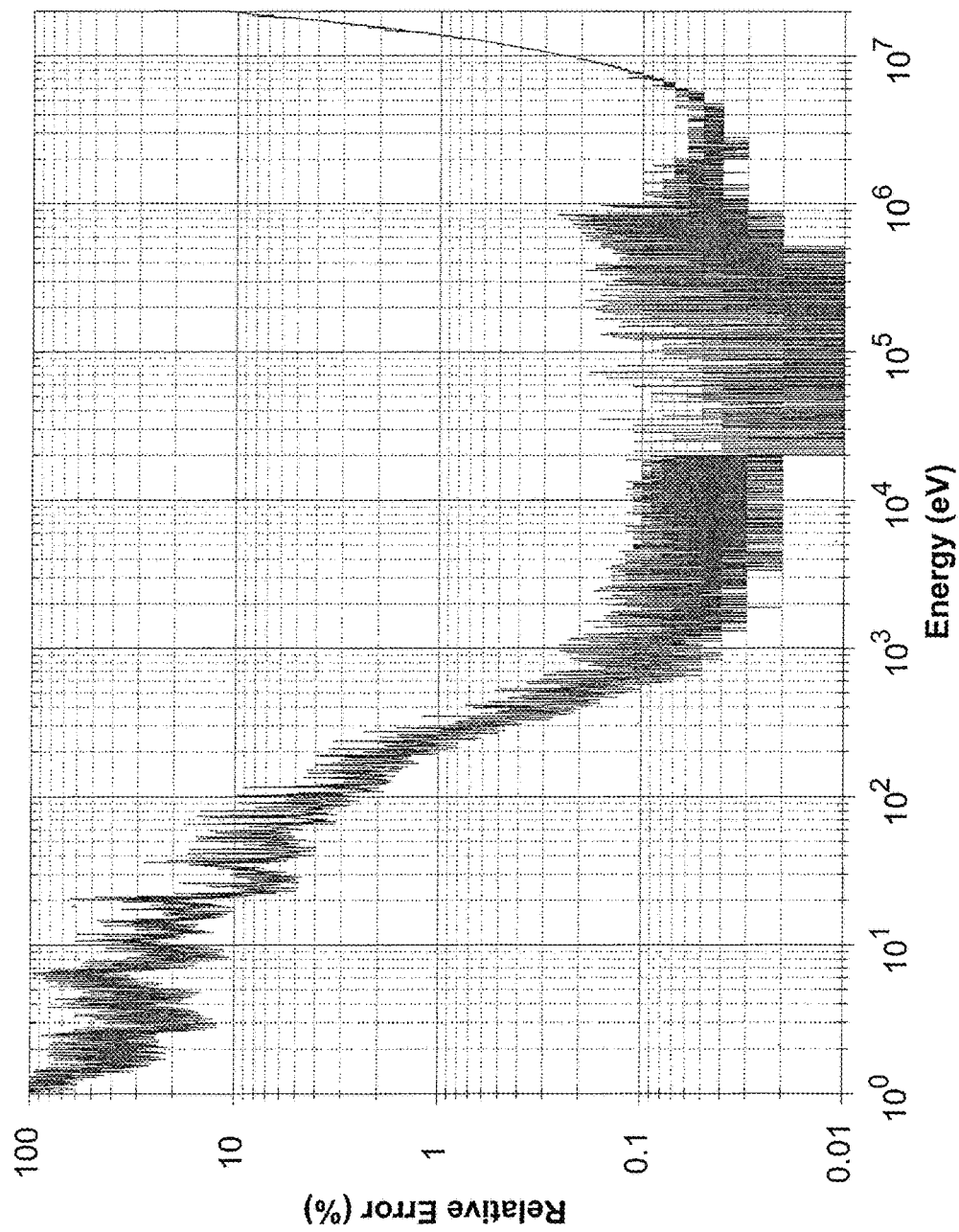
FIG. 38 is a graph showing statistical relative error for the MCNP program for the UNF fuel cell case.
Figure 40:
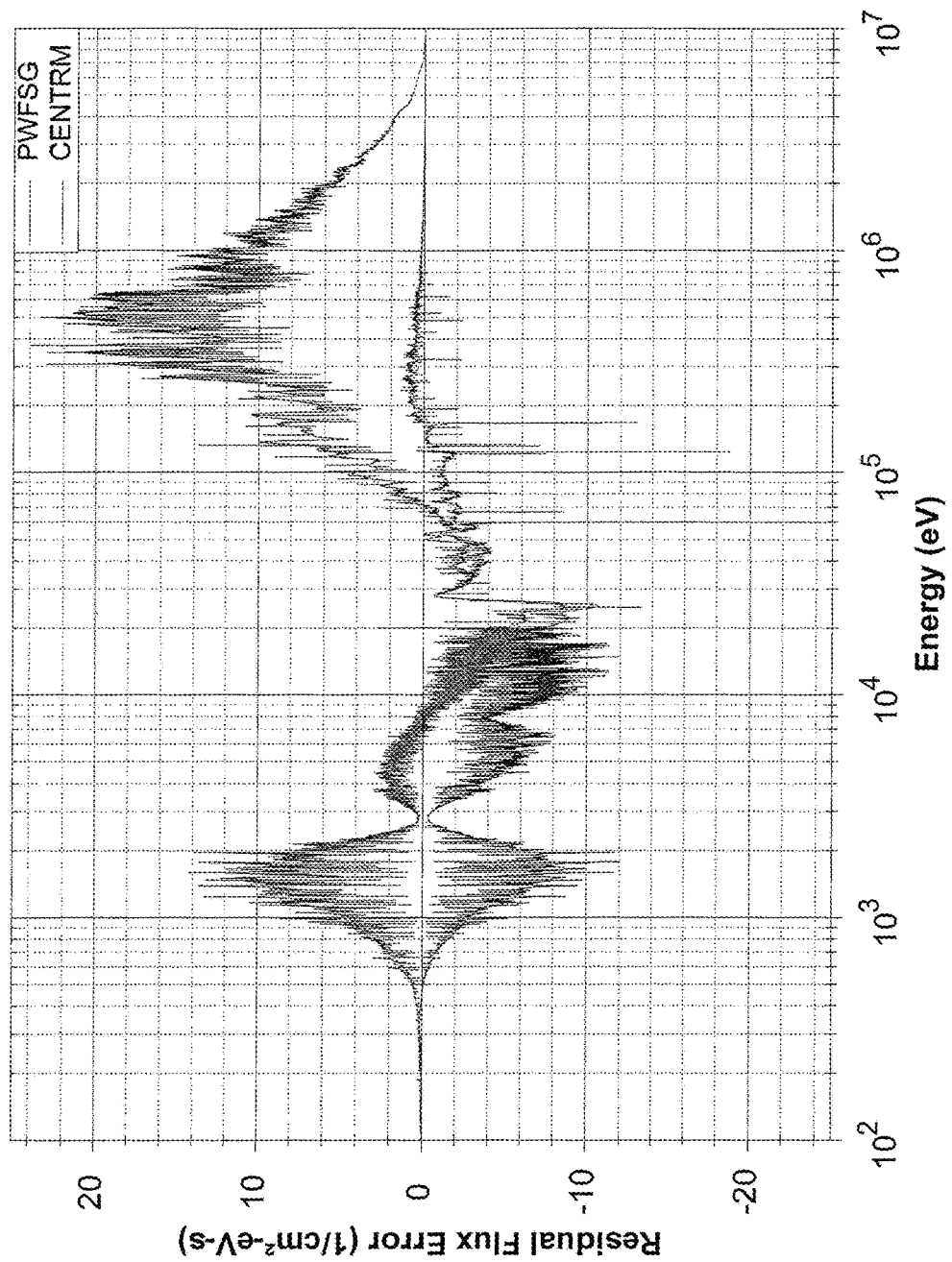
FIG. 40 is a graph showing residual flux error for PWFSG and CENTRM residuals compared to MCNP for the UNF fuel cell case.

FIG. 38 is a graph showing statistical relative error for the MCNP program for the UNF fuel cell case. As with the SFR fuel cell case, the program comparison was performed between 400 eV and 10 MeV. FIG. 39 is a table showing the standard deviation of the residuals, the $r^2$ values, and the corresponding $1-r^2$ values (error statistics) for the UNF fuel cell case. The agreement for both PWFSG and CENTRM is approximately the same as in the SFR fuel cell case, with the $r^2$ values decreasing slightly. The improvement factor is slightly less than the SFR fuel cell case with a value of 7.4. FIG. 40 is a graph showing residual flux error for PWFSG and CENTRM residuals compared to MCNP for the UNF fuel cell case. FIG. 40 confirms that the same error trends are present as in the SFR fuel cell case.

The UNF fuel cell case reveals that the inclusion of isotopes with overlapping resonances does not cause significant additional error in PWFSG or CENTRM. The PW treatment along with a rigorous scattering treatment avoids many of the deficiencies of traditional approaches when a high-fidelity neutron energy spectrum is desired.

X. Analysis of Results

The example cases discussed above demonstrate that the PW GKQ algorithm provides a robust treatment of the transfer source without a noticeable increase in the computational cost. The PWFSG results have excellent agreement with the high-fidelity Monte Carlo results, with computation time comparable to CENTRM. PWFSG reduces the residual error a factor of 6 as compared to CENTRM. FIG. 41 is a table showing improvement factors, which are a measure of the residual error decrease in PWFSG when compared to CENTRM.

Part of the computational efficiency in PWFSG is due to the scaling performance with increasing isotopes, due to parallelizing the transfer source calculation. This scaling would not be present on single-core architecture or in a model with only one isotope.

The main cause of the error in CENTRM is the kinematic assumptions in the PW solution region. These assumptions may be acceptable for LWR applications where the resonance region lies at lower energies (e.g., below 100 keV). CENTRM would then rely on the traditional Bondarenko approach (i.e., BONAMI module) at higher energies (e.g., above 100 keV). However, for SFR applications where the PW region could extend into the MeV range, the kinematic assumptions are invalid and cause significant error. The U-238 infinite medium case demonstrates that both CENTRM and PWFSG offer good agreement with MCNP when the CENTRM PW treatment was limited to below 25 keV.

The SFR and UNF fuel cell cases demonstrate that CENTRM significantly over-predicts the flux above 100 keV. Therefore, the GKQ algorithm in PWFSG offers added robustness to the transfer source term calculation.

The disclosure of *Generation of Fast Neutron Spectra Using an Adaptive Gauss-Kronrod Quadrature Algorithm*, by Brian Scott Triplett, a Dissertation Presented to the Graduate School of the University of Florida in Partial Fulfillment of the Requirements for the Degree of Doctor of Philosophy, is incorporated in this application by reference. A copy of the dissertation, with drawings in color, is attached to this patent application as filed in the U.S. Patent and Trademark Office as Appendix A.

While example embodiments have been particularly shown and described, it will be understood by those of ordinary skill in the art that various changes in form and details may be made therein without departing from the spirit and scope of the present invention as defined by the following claims.

What is claimed is:

1. A method, implemented by at least one electronic processor, for generating a pointwise fast neutron spectrum of a nuclear reactor, the method comprising:
   receiving composition data in the at least one electronic processor;
   receiving or calculating, by the at least one electronic processor, a fission source distribution, the fission source distribution including an energy distribution of fission neutrons of the nuclear reactor, the fission neutrons having a kinetic energy that is greater than or equal to 1 eV;
   receiving nuclear data in the at least one electronic processor; and
   calculating, in the at least one electronic processor, the pointwise fast neutron spectrum based on numerical integration using the composition data, the fission source distribution, and the nuclear data, the calculating including,
   generating an energy mesh that includes a finite number of energy points for the fast neutron spectrum,
   adding additional energy points to the energy mesh in order to bound an error associated with the numerical integration, and
   thinning the generated energy mesh to remove some of the finite number of energy points,
   wherein the thinning of the energy mesh improves functioning of the at least one electronic processor by allowing faster processing of the numerical integration.

2. The method of claim 1, wherein the composition data includes information related to geometry of a nuclear reactor.

3. The method of claim 1, wherein the composition data includes information related to isotopes in a nuclear reactor.

4. The method of claim 1, wherein the composition data allows calculation of number densities of isotopes in a nuclear reactor.

5. The method of claim 1, wherein the composition data is input by one or more users.

6. The method of claim 1, wherein the received fission source distribution is input by one or more users.

7. The method of claim 1, wherein the received fission source distribution includes at least one value determined by a function.

8. The method of claim 1, wherein the received fission source distribution includes at least one unknown value that is calculated via the at least one electronic processor.

9. The method of claim 1, wherein the nuclear data includes data from at least one data library.

10. The method of claim 9, wherein the at least one data library includes one or more of the Evaluated Nuclear Data Files of Brookhaven National Laboratory, the Japanese Evaluated Nuclear Data Library, the Joint Evaluated Fission and Fusion File, the Russian Evaluated Neutron Data Library, the Russian File of Evaluated Neutron Data, the Chinese Evaluated Nuclear Data Library, and the International Neutron Cross Section Standards.

11. The method of claim 1, wherein calculating the pointwise fast neutron spectrum includes interpolating the nuclear data.

12. The method of claim 1, wherein the calculation of the pointwise fast neutron spectrum starts at a highest energy of the received fission source distribution or wherein the calculation of the pointwise fast neutron spectrum starts at a highest energy of the calculated fission source distribution.

13. The method of claim 12, wherein the calculation of the pointwise fast neutron spectrum continues from the highest energy of the received fission source distribution to successively lower energies or wherein the calculation of the pointwise fast neutron spectrum continues from the highest energy of the calculated fission source distribution to the successively lower energies.

14. The method of claim 1, wherein the numerical integration uses an adaptive algorithm.

15. The method of claim 14, wherein the adaptive algorithm uses an interval subdividing technique.

16. The method of claim 1, wherein the numerical integration is based on a quadrature rule.

17. The method of claim 16, wherein the quadrature rule is a nested quadrature rule.

18. The method of claim 17, wherein the nested quadrature rule is a Gauss-Kronrod Quadrature rule.

19. The method of claim 1, further comprising:
modeling the nuclear reactor based on the calculated pointwise fast neutron spectrum.

20. The method of claim 1, further comprising:
applying the calculated pointwise fast neutron spectrum in a reactor simulation.

21. The method of claim 1, wherein the nuclear reactor is a sodium fast reactor (SFR).

22. A method, implemented by at least one electronic processor, for generating a pointwise fast neutron spectrum of a nuclear reactor, the method comprising:
receiving composition data in the at least one electronic processor;
receiving or calculating, by the at least one electronic processor, a fission source distribution, the fission source distribution including an energy distribution of fission neutrons of the nuclear reactor, the fission neutrons having a kinetic energy that is greater than or equal to 1 eV;
receiving nuclear data in the at least one electronic processor; and
calculating, in the at least one electronic processor, the pointwise fast neutron spectrum based on numerical integration using the composition data, the fission source distribution, and the nuclear data, the calculating including,
generating an energy mesh that includes a finite number of energy points for the fast neutron spectrum,
adding additional energy points to the energy mesh in order to bound an error associated with the numerical integration, and
thinning the generated energy mesh to remove some of the finite number of energy points
wherein the thinning of the energy mesh improves functioning of the at least one electronic processor by reducing computing time for the calculating of the numerical integration,
the calculating of the pointwise fast neutron spectrum starting at a highest energy of the received fission source distribution or starting at a highest energy of the calculated fission source distribution.

23. A method, implemented by at least one electronic processor, for generating a pointwise fast neutron spectrum of a nuclear reactor, the method comprising:
receiving composition data in the at least one electronic processor;
receiving or calculating, by the at least one electronic processor, a fission source distribution, the fission source distribution including an energy distribution of fission neutrons of the nuclear reactor, the fission neutrons having a kinetic energy that is greater than or equal to 1 eV;
receiving nuclear data in the at least one electronic processor; and
calculating, in the at least one electronic processor, the pointwise fast neutron spectrum based on numerical integration using the composition data, the fission source distribution, and the nuclear data, the calculating including,
generating an energy mesh that includes a finite number of energy points for the fast neutron spectrum,
adding additional energy points to the energy mesh in order to bound an error associated with the numerical integration, and
thinning the generated energy mesh to remove some of the finite number of energy points,
wherein the thinning of the energy mesh improves functioning of the at least one electronic processor by reducing computing time for the calculating of the pointwise fast neutron spectrum.

24. The method of claim 23, wherein the numerical integration uses an adaptive algorithm.

25. The method of claim 23, wherein the calculating of the pointwise fast neutron spectrum starts at a highest energy of the received fission source distribution or starts at a highest energy of the calculated fission source distribution.

* * * * *